US010067229B2

(12) United States Patent
Djordjev et al.

(10) Patent No.: US 10,067,229 B2
(45) Date of Patent: Sep. 4, 2018

(54) RECEIVE-SIDE BEAM FORMING FOR AN ULTRASONIC IMAGE SENSOR

(71) Applicant: QUALCOMM Incorporated, San Diego, CA (US)

(72) Inventors: Kostadin Dimitrov Djordjev, San Jose, CA (US); Christopher Mark William Daft, Dublin, CA (US); David William Burns, San Jose, CA (US); Ashish Hinger, Sunnyvale, CA (US); Hrishikesh Vijaykumar Panchawagh, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 14/864,555

(22) Filed: Sep. 24, 2015

(65) Prior Publication Data

US 2017/0090028 A1 Mar. 30, 2017

(51) Int. Cl.
*G01S 15/89* (2006.01)
*G01S 7/521* (2006.01)
*G06K 9/00* (2006.01)
*G01S 7/52* (2006.01)

(52) U.S. Cl.
CPC ............ *G01S 15/89* (2013.01); *G01S 7/521* (2013.01); *G01S 7/52079* (2013.01); *G01S 15/8906* (2013.01); *G01S 15/8956* (2013.01); *G06K 9/0002* (2013.01)

(58) Field of Classification Search
CPC ...... G01S 15/89; G01S 7/521; G01S 15/8906; G01S 7/52079; G01S 15/8956; G06K 9/0002
See application file for complete search history.

(56) References Cited

U.S. PATENT DOCUMENTS 8,539,837 B2   9/2013  Wong et al.
9,817,108 B2 * 11/2017  Kuo ..................... G01S 7/52017
2011/0279662 A1 * 11/2011  Schneider ............ A61B 5/1172
                                                              348/61
(Continued)

FOREIGN PATENT DOCUMENTS

WO    WO-2017052836 A1 *  3/2017  ............. G01S 15/89

OTHER PUBLICATIONS

Storheim E., et al., "Diffraction Correction in Ultrasonic Fields for Measurements of Sound Velocity in Gas. Conventional and Alternative Methods.", 34th Scandianavian Symposium on Physical Acoustics, Geilo, Norway, Jan. 30-Feb. 2, 2011, pp. 1-27.

(Continued)

*Primary Examiner* — Daniel Pihulic

(74) *Attorney, Agent, or Firm* — Weaver Austin Villeneuve & Sampson LLP

(57) ABSTRACT

Methods, systems and storage media are described, each of which may be used to generate an image of an object using ultrasonic plane waves. For example, the generated image may be of a target object positioned on a platen surface. The image may be derived from corrected output signals obtained from a plurality of selected sensor pixels. The corrected output signals may adjust for diffraction of reflected ultrasonic plane waves from a target object positioned on the platen surface. The target object may be a finger or a tip of a stylus.

30 Claims, 34 Drawing Sheets

(56) References Cited

U.S. PATENT DOCUMENTS

| | | | |
|---|---|---|---|
| 2012/0206585 A1* | 8/2012 | Schneider | G01N 29/06 |
| | | | 348/77 |
| 2013/0136321 A1 | 5/2013 | Lee et al. | |
| 2014/0312350 A1* | 10/2014 | Schneider | G01N 29/06 |
| | | | 257/66 |
| 2014/0355387 A1 | 12/2014 | Kitchens, II et al. | |
| 2014/0359757 A1 | 12/2014 | Sezan et al. | |
| 2015/0165479 A1 | 6/2015 | Lasiter et al. | |
| 2016/0132187 A1* | 5/2016 | Lu | H01L 41/047 |
| | | | 345/177 |
| 2016/0350573 A1* | 12/2016 | Kitchens, II | G06K 9/0002 |
| 2017/0082740 A1* | 3/2017 | Kitchens, II | G01S 7/539 |
| 2017/0090024 A1* | 3/2017 | Kitchens, II | G01S 7/539 |
| 2017/0090028 A1* | 3/2017 | Djordjev | G01S 15/89 |
| 2017/0110504 A1* | 4/2017 | Panchawagh | H01L 27/20 |
| 2017/0132446 A1* | 5/2017 | Schneider | G06K 9/0002 |
| 2017/0285157 A1* | 10/2017 | Kitchens, II | G01S 7/539 |

OTHER PUBLICATIONS

International Search Report and Written Opinion—PCT/US2016/046879—ISA/EPO—Oct. 28, 2016.

International Preliminary Report on Patentability—PCT/US2016/046879, The International Bureau of WIPO—Geneva, Switzerland, Jan. 12, 2017.

\* cited by examiner

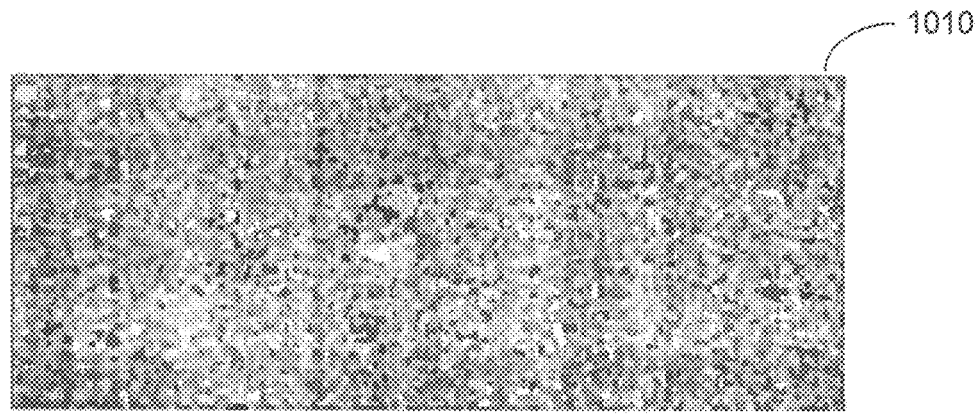
FIG. 10A — Raw Image
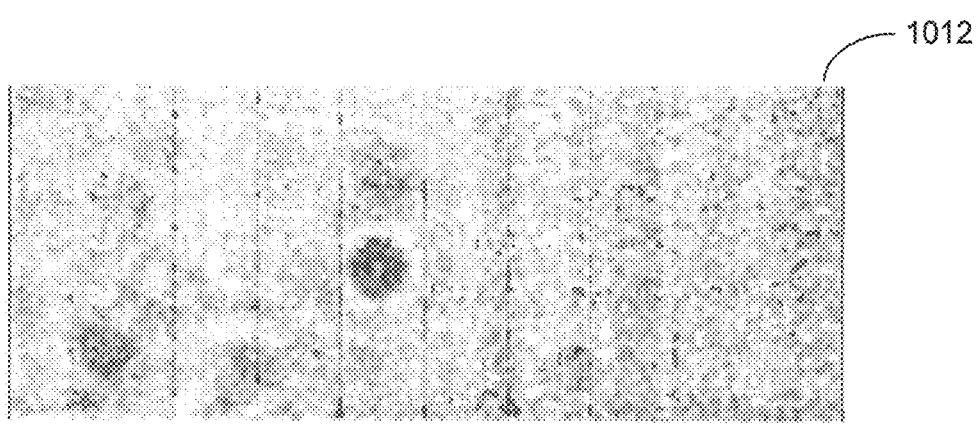
FIG. 10B — Filtered Image
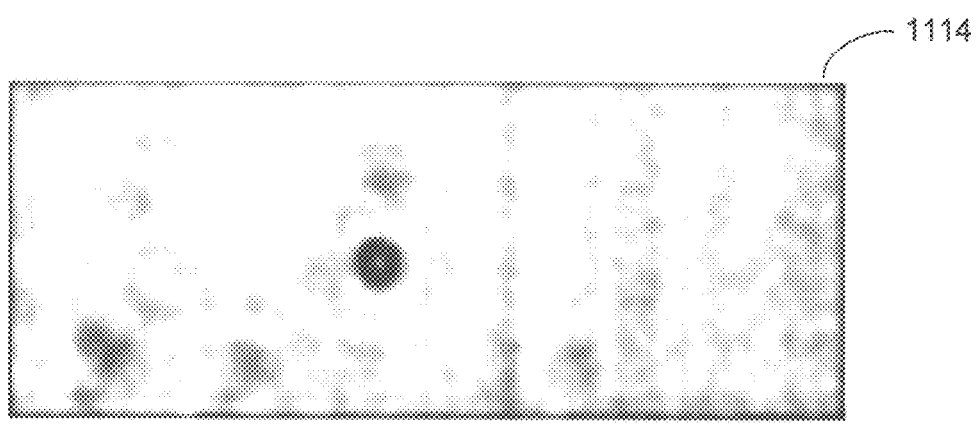
FIG. 10C — Beamformed Image

RECEIVE-SIDE BEAM FORMING FOR AN ULTRASONIC IMAGE SENSOR

FIELD OF THE DISCLOSURE

The present disclosure relates to devices and methods of phase detection and receive-side beamforming for ultrasonic imaging arrays.

BACKGROUND OF THE DISCLOSURE

Many ultrasonic imaging systems operate by transmitting ultrasonic energy from a transmitter toward a target object, and detecting that portion of the transmitted ultrasonic energy that has been reflected by the target object. Detecting the reflected ultrasonic energy may be accomplished by an array of ultrasonic receivers. Such systems exist, for example, to produce images of fingerprints corresponding to a finger that is placed on a platen.

Ideally, the ultrasonic energy that is transmitted travels straight to the target object, and any ultrasonic energy reflected by the object travels straight to a receiver. In practice, some energy does not travel so directly to and from the target object. Some of the ultrasonic energy is diffracted and some is reflected by objects other than the target object. As such, the ultrasonic energy emanating from the transmitter does not remain well-organized as the energy travels from the transmitter to the target object and then to the receivers. As the organization of the ultrasonic energy degrades, so too does the ability to generate a clear image of the target object because some of the energy detected by a particular receiver in the receiver array did not travel straight from the transmitter to the target object and then straight to that receiver. Therefore, it would be useful to have a way of mitigating the loss of clarity arising from the fact that some ultrasonic energy received at an array of receivers has not traveled straight from the transmitter to the target object, and then straight from the target object to a particular receiver in the array.

SUMMARY OF THE DISCLOSURE

This disclosure describes methods, systems and storage media that may be used to generate an image of an object using ultrasonic plane waves. For example, the generated image may be of a target object positioned on a platen surface, and may be based on corrected output signals derived from a plurality of selected sensor pixels. The corrected output signal may correct for diffraction of reflected ultrasonic plane waves from a target object positioned on the platen surface. In some implementations, the target object may be ridges of a finger or a tip of a stylus.

In one such method, a first ultrasonic plane wave is launched from a plane wave generator toward a platen surface. The first ultrasonic plane wave may include one or more cycles. A frequency of the first ultrasonic plane wave may be based on (a) a distance from the sensor array to the platen surface, and/or (b) a width of a target object positioned on the platen surface.

A first set of pixel output signals may be acquired at a first acquisition time that is delayed from the launch of the first ultrasonic plane wave by a first acquisition time delay. The first acquisition time delay may account for a distance between the selected pixel and the platen surface. Each pixel output signal from the first set of pixel output signals may represent a local magnitude at a sensor pixel array of the first ultrasonic plane wave reflected from the platen surface.

Then, a second ultrasonic plane wave may be launched from the plane wave generator toward the platen surface. The second ultrasonic plane wave may include one or more cycles. A frequency of the second ultrasonic plane wave may be based on (a) a distance from the sensor array to the platen surface, and/or (b) a width of a target object positioned on the platen surface.

A second set of pixel output signals may be acquired at a second acquisition time that is delayed from the launch of the second ultrasonic plane wave by a second acquisition time delay. The second acquisition time delay may account for a mean distance between the selected pixel and the first set of neighboring pixels near the selected pixel. Each pixel output signal from the second set of pixel output signals may represent a local magnitude at the sensor pixel array of the second ultrasonic plane wave reflected from the platen surface.

A corrected output signal for a selected pixel of the sensor pixel array may be generated based on (a) a selected output signal from the first set of pixel output signals, and (b) first-level correction signals from the second set of pixel output signals. The selected output signal corresponds to the selected pixel, and the first-level correction signals correspond to a first set of neighboring pixels near the selected pixel. Generating the corrected output signal for the selected pixel may include weighting the first-level correcting signals differently than the selected output signal.

The first acquisition time delay and the second acquisition time delay may differ so as to account for a difference in phase between the reflected first ultrasonic plane wave arriving at the selected pixel and the reflected second ultrasonic plane wave arriving at the first set of neighboring pixels.

Acquiring the first set of pixel output signals may include detecting an amplitude that represents the local magnitude of the reflected first ultrasonic plane wave during a first acquisition time window. The first acquisition time window may have a duration shorter than a period of the reflected first ultrasonic plane wave. The first acquisition time window may have a duration of at least one period of the reflected first ultrasonic plane wave. Acquiring the second set of pixel output signals may include detecting an amplitude that represents the local magnitude of the reflected second ultrasonic plane wave during a second acquisition time window.

Acquiring the first set of pixel output signals may include applying a sampling voltage to the sensor pixel array at the first acquisition time. Acquiring the second set of pixel output signals may include applying a sampling voltage to the sensor pixel array at the second acquisition time. The sampling voltages may be applied to a receiver bias electrode of the sensor pixel array. Such sampling voltages may be applied to a diode bias electrode of the sensor pixel array.

A third ultrasonic plane wave may be launched from the plane wave generator toward the platen surface, and a third set of pixel output signals may be acquired at a third acquisition time that is delayed from the launch of the third ultrasonic plane wave by a third acquisition time delay. Each pixel output signal from the third set of pixel output signals may represent a local magnitude at the sensor pixel array of the third ultrasonic plane wave reflected from the platen surface. Generating the corrected output signal for the selected pixel may be based on a weighted sum of (a) the selected output signal, (b) the first-level correction signals, and/or (c) the second-level correction signals, which may be derived from the third set of pixel output signals. The second-level correction signals may correspond to a second set of neighboring pixels near the selected pixel. The second set of neighboring pixels may have a mean distance from the selected pixel that is different than a mean distance of the first set of neighboring pixels from the selected pixel.

This disclosure describes sensor systems. One such sensor system may have an ultrasonic sensor array, a platen, an ultrasonic plane wave generator, and one or more processors in communication with the sensor pixel array. The platen has a platen surface, and the platen may be fixed to the sensor pixel array. The platen may include a coating layer having a coating surface, and that coating surface may serve as the platen surface.

The plane wave generator may be coupled to the sensor pixel array. Each pixel of the sensor pixel array may be configured to generate a pixel output signal in response to a received ultrasonic wave. The processor(s) may be configured to generate the corrected output signal based on a weighted sum of the selected output signal and the first-level correction signals. The processor(s) may be configured to generate an image of a target object positioned on the platen surface based on the corrected output signals for a plurality of selected pixels in the sensor pixel array.

The one or more processors may be configured to: initiate launching of a first ultrasonic plane wave from the plane wave generator toward the platen surface; acquire a first set of pixel output signals at a first acquisition time that is delayed from the launch of the first ultrasonic plane wave by a first acquisition time delay, each pixel output signal from the first set of pixel output signals representing a local magnitude at the sensor pixel array of the first ultrasonic plane wave reflected from the platen surface; initiate launching of a second ultrasonic plane wave from the plane wave generator toward the platen surface; acquire a second set of pixel output signals at a second acquisition time that is delayed from the launch of the second ultrasonic plane wave by a second acquisition time delay, each pixel output signal from the second set of pixel output signals representing a local magnitude at the sensor pixel array of the second ultrasonic plane wave reflected from the platen surface; and generate a corrected output signal for a selected pixel of the sensor pixel array based on (i) a selected output signal from the first set of pixel output signals, and on (ii) first-level correction signals from the second set of pixel output signals, wherein the selected output signal corresponds to the selected pixel and the first-level correction signals correspond to a first set of neighboring pixels near the selected pixel. The first set of neighboring pixels may be equidistant from the selected pixel.

Each pixel in the sensor pixel array may be electrically coupled to a local oscillator that is configured to provide a phase-locked signal during acquisition of the first set of pixel output signals and the second set of pixel output signals. The phase-locked signal used during the acquisition of the second set of pixel output signals may have substantially the same amplitude, but a different phase, compared to the phase-locked signal used during the acquisition of the first set of pixel output signals. The phase-locked signal used during the acquisition of the second set of pixel output signals may have a different amplitude and a different phase compared to the phase-locked signal used during acquisition of the first set of pixel output signals.

Generally speaking, systems described herein may be summarized as systems for generating an image. Such systems may have: means for launching a first ultrasonic plane wave toward a platen surface; means for acquiring a first set of pixel output signals at a first acquisition time that is delayed from the launch of the first ultrasonic plane wave by a first acquisition time delay, each pixel output signal from the first set of pixel output signals representing a local magnitude of the first ultrasonic plane wave reflected from the platen surface; means for launching a second ultrasonic plane wave toward the platen surface; means for acquiring a second set of pixel output signals at a second acquisition time that is delayed from the launch of the second ultrasonic plane wave by a second acquisition time delay, each pixel output signal from the second set of pixel output signals representing a local magnitude of the second ultrasonic plane wave reflected from the platen surface; and means for generating a corrected output signal for a selected pixel based on a selected output signal from the first set of pixel output signals and on first-level correction signals from the second set of pixel output signals, wherein the selected output signal corresponds to the selected pixel and the first-level correction signals correspond to a first set of neighboring pixels near the selected pixel.

This description also describes a non-transitory, computer-readable storage medium having one or more computer programs of computer readable instructions for execution by one or more processors that are in communication with a plane wave generator and a sensor pixel array to perform a method of generating an image. The computer program(s) may have instructions for: launching a first ultrasonic plane wave from the plane wave generator toward a platen surface; acquiring a first set of pixel output signals at a first acquisition time that is delayed from the launch of the first plane wave by a first acquisition time delay, each pixel output signal from the first set of pixel output signals representing a local magnitude at the sensor pixel array of the first ultrasonic plane wave reflected from the platen surface; launching a second ultrasonic plane wave from the plane wave generator toward the platen surface; acquiring a second set of pixel output signals at a second acquisition time that is delayed from the launch of the second plane wave by a second acquisition time delay, each pixel output signal from the second set of pixel output signals representing a local magnitude at the sensor pixel array of the second ultrasonic plane wave reflected from the platen surface; and generating a corrected output signal for a selected pixel from the sensor pixel array based on a selected output signal from the first set of pixel output signals and on first-level correction signals from the second set of pixel output signals, wherein the selected output signal corresponds to the selected pixel and the first-level correction signals correspond to a first set of neighboring pixels near the selected pixel.

BRIEF DESCRIPTION OF THE DRAWINGS

For a fuller understanding of the nature and objects of the disclosure, reference should be made to the accompanying drawings and the subsequent description. The disclosure will now be described by way of non-limiting examples, with reference to the attached drawings and diagrams.

FIGS. 10A-10C show acquired ultrasonic images of a stylus tip positioned on a platen surface without correction (FIG. 10A), with filtering (FIG. 10B) and with receive-side beamforming (FIG. 10C).

FURTHER DESCRIPTION OF THE DISCLOSURE

Figure 1A:
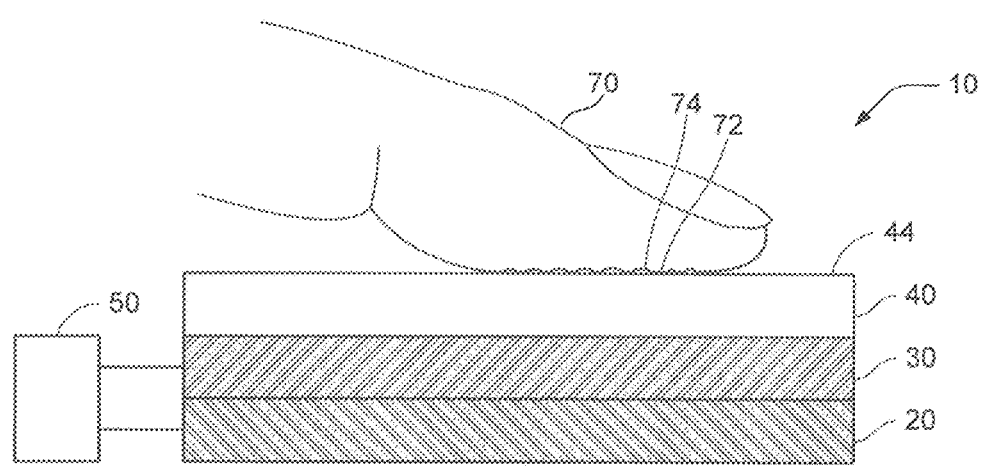
FIGS. 1A-1C illustrate an example of an ultrasonic sensor system according to aspects of the present disclosure.
Figure 1B:
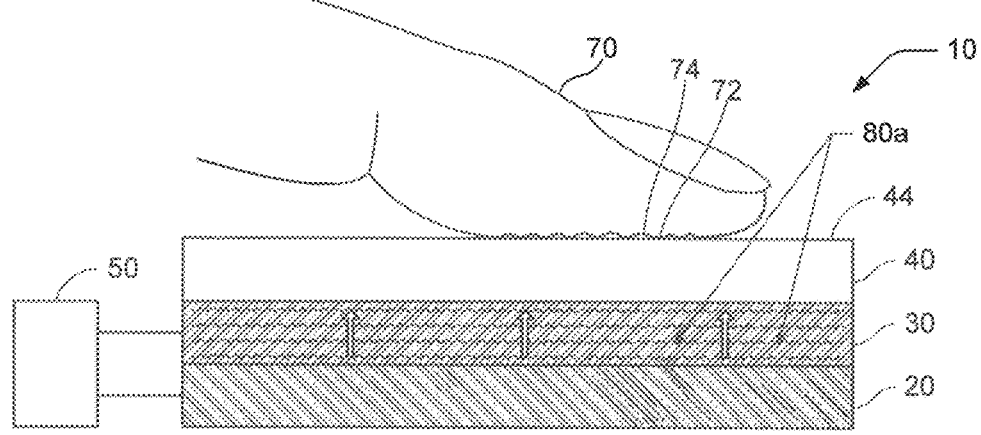
Figure 1C:
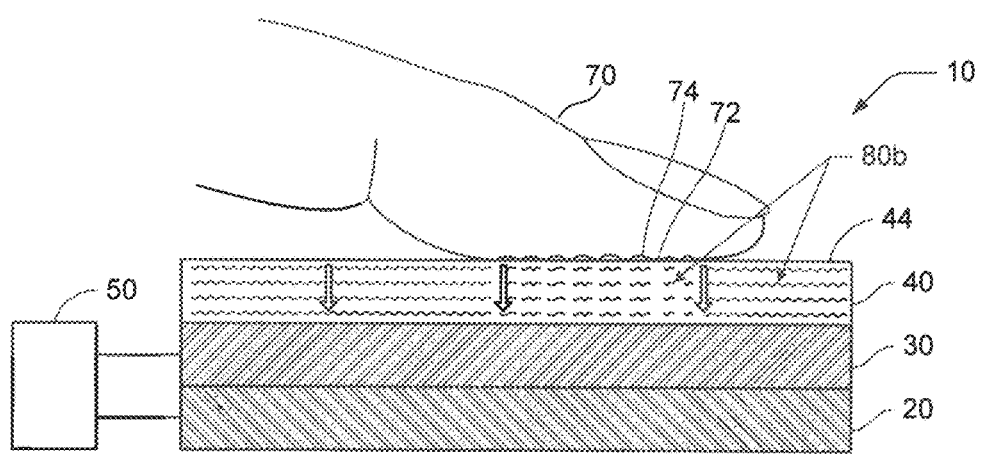

FIGS. 1A-1C illustrate an example of an ultrasonic sensor system 10 according to aspects of the present disclosure. As shown in FIG. 1A, the ultrasonic sensor system 10 may include an ultrasonic transmitter 20 and an ultrasonic receiver 30 under a platen 40. The ultrasonic transmitter 20 may be a piezoelectric transmitter that can generate ultrasonic waves 80a (see FIG. 1B). The ultrasonic receiver 30 may include a layer of a piezoelectric material and an array of pixel circuits disposed on a substrate. In operation, the ultrasonic transmitter 20 may generate one or more ultrasonic waves 80a that travel through the ultrasonic receiver 30 to an exposed surface 44 of the platen 40. At the exposed surface 44 of the platen 40, the ultrasonic energy may be transmitted, absorbed or scattered by a target object 70 that is in contact with the platen 40 such as the skin of a fingerprint ridge region 72, or reflected back toward the ultrasonic receiver 30. In locations where air contacts the exposed surface 44 of the platen 40, e.g., in valley regions 74 between fingerprint ridge regions 72, most of the ultrasonic wave will be reflected back toward the ultrasonic receiver 30 for detection (see FIG. 1C). Control electronics 50 may be coupled to the ultrasonic transmitter 20 and the ultrasonic receiver 30 and may supply timing signals that cause the ultrasonic transmitter 20 to generate and launch one or more ultrasonic waves 80a. The control electronics 50 may then receive signals from the ultrasonic receiver 30 that are indicative of reflected ultrasonic energy, such as one or more reflected ultrasonic waves 80b that may be reflected from the exposed surface 44 of the platen 40. The control electronics 50 may use output signals received from the ultrasonic receiver 30 to construct a digital image of the target object 70. In some implementations, the control electronics 50 may also, over time, successively sample the output signals to detect the presence and/or movement of the target object 70.

According to aspects of the present disclosure, the ultrasonic transmitter 20 may be a plane wave generator including a substantially planar piezoelectric transmitter layer 24. See FIG. 2. Ultrasonic waves may be generated by applying a voltage to the piezoelectric layer 24 to expand or contract the layer 24, depending upon the signal applied, thereby generating a plane wave. The voltage may be applied across the piezoelectric transmitter layer 24 via a first transmitter electrode 22 and a second transmitter electrode 26. In this fashion, an ultrasonic wave 80a may be made by changing the thickness of the layer via a piezoelectric effect. The ultrasonic wave 80a may travel toward a finger (or other object to be detected), passing through the platen 40. A portion of the wave not absorbed or transmitted by the object to be detected may be reflected so as to pass back through the platen 40 and be received by the ultrasonic receiver 30.

The ultrasonic receiver 30 may include circuitry 33 including an array of pixel circuits 36 disposed on a substrate 32 and a piezoelectric receiver layer 38. In some implementations, each pixel circuit 36 may include one or more transistors, electrical interconnect traces and, in some implementations, one or more additional circuit elements such as diodes, capacitors, and the like. See FIGS. 2-5. Each pixel circuit 36 may be configured to convert electric charge generated in the piezoelectric receiver layer 38 proximate the pixel circuit 36 into an electrical signal.

Figure 2:
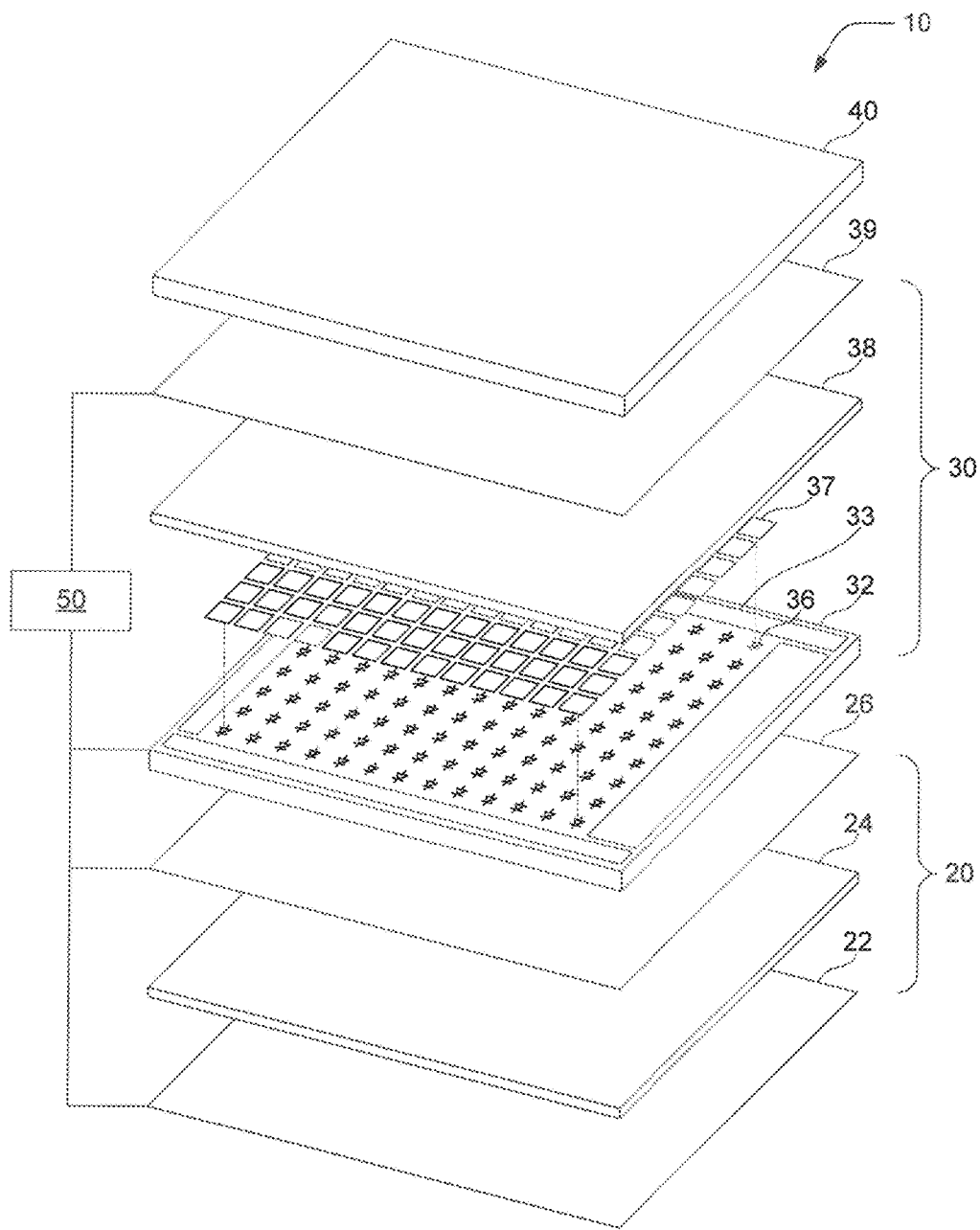
FIG. 2 shows an example of an exploded perspective view of an ultrasonic sensor system.
Figure 4:
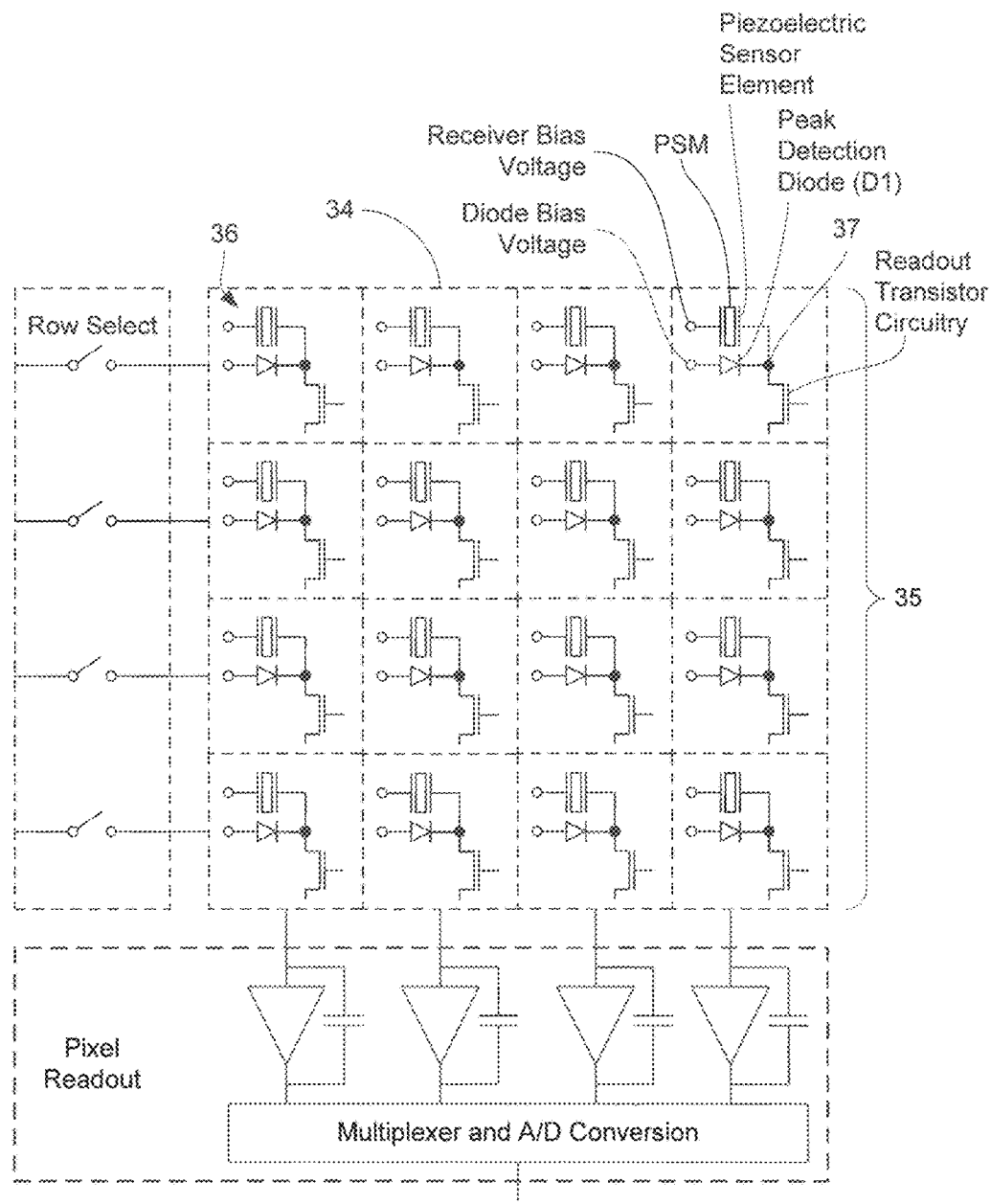
FIG. 4 representationally depicts aspects of a 4×4 pixel array of sensor pixels for an ultrasonic sensor.

In the illustrated implementation depicted in FIG. 2, a receiver bias electrode 39 may be disposed on a side of the piezoelectric receiver layer 38 proximal to platen 40. The receiver bias electrode 39 may be a metallized electrode and may be grounded or biased to control which signals are passed to the pixel circuits 36. Ultrasonic energy that is reflected from the exposed (top) surface 44 of the platen 40 may be converted into localized electrical charges by the piezoelectric receiver layer 38. These localized charges may be collected by the pixel input electrodes 37 and passed on to the underlying pixel circuits 36. The charges may be amplified or buffered by the pixel circuits 36 and provided to the control electronics 50, which may process the output signals. A simplified schematic of an example pixel circuit is shown in FIG. 4, however one of ordinary skill in the art will appreciate that many variations of and modifications to the example pixel circuit shown in the simplified schematic may be utilized.

Control electronics 50 may be electrically connected to the first transmitter electrode 22 and the second transmitter electrode 26, as well as to the receiver bias electrode 39, the pixel circuits 36 on the substrate 32, and other control and data lines associated with the sensor system 10.

FIGS. 1A-1C show an example of an arrangement of an ultrasonic transmitter 20 and receiver 30 in an ultrasonic sensor, other arrangements are possible. For example, in some implementations, the ultrasonic transmitter 20 may be above the ultrasonic receiver 30, i.e., closer to the object of detection. In some implementations, the ultrasonic sensor may include an acoustic delay layer. For example, an acoustic delay layer may be incorporated into the ultrasonic sensor system 10 between the ultrasonic transmitter 20 and the ultrasonic receiver 30. In some implementations, the substrate 32 may serve as an acoustic delay layer. In some implementations, an additional layer (not shown) positioned between the ultrasonic transmitter 20 and the ultrasonic receiver 30 may serve as an acoustic delay layer. In some implementations, the platen 40 or an additional layer (not shown) positioned between the ultrasonic receiver 30 and the platen 40 may serve as an acoustic delay layer. An acoustic delay layer may be employed to adjust the ultrasonic pulse timing, and at the same time electrically insulate the ultrasonic receiver 30 from the ultrasonic transmitter 20. The delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the target object 70 by virtue of having been reflected by the target object 70 may be made to arrive at the ultrasonic receiver 30 during a time range when it is unlikely that energy reflected from other parts of the ultrasonic sensor system 10 is arriving at the ultrasonic receiver 30.

FIG. 2 shows an example of an exploded perspective view of an ultrasonic sensor system 10 including an ultrasonic transmitter 20 and an ultrasonic receiver 30 under a platen 40. The ultrasonic transmitter 20 may include a substantially planar piezoelectric transmitter layer 24 with a first transmitter electrode 22 and a second transmitter electrode 26 disposed on each side of the piezoelectric transmitter layer 24. The first and second transmitter electrodes 22 and 26 may be metallized electrodes, for example, metal layers that coat opposing sides of the piezoelectric transmitter layer 24.

The ultrasonic receiver 30 may include an array of pixel circuits 36 disposed on a substrate 32, which also may be referred to herein as a thin-film transistor (TFT) substrate, a backplane, a panel, a sub-panel or a semiconductor substrate depending on the implementation, and a piezoelectric receiver layer 38. Each pixel circuit 36 may include a pixel input electrode 37 that electrically couples the piezoelectric receiver layer 38 to the pixel circuit 36. The piezoelectric receiver layer 38 may be in direct contact with the pixel input electrodes 37 (as with a coated or deposited process) or capacitively coupled to the pixel input electrodes 37 (as with a bonded or laminated process where a piezoelectric layer is attached with a thin adhesive layer). In some implementations, the substrate 32 may be a thin substrate of glass or plastic, on which the sensor pixel circuits 36 are fabricated. In some implementations, the substrate 32 may be silicon, single-crystal silicon or other semiconductor material, such as a silicon wafer or a silicon-on-insulator wafer. The pixel circuits 36 and other circuitry related to substrate 32 may be formed from transistors fabricated in the substrate, such as a conventional silicon device wafer. In addition to the pixel circuits 36, the substrate 32 may have additional components fabricated thereon, such as one or more conductive bond pads and connective traces.

In the illustrated implementation, a receiver bias electrode 39 may be disposed on a side of the piezoelectric receiver layer 38 proximal to platen 40, as described above with respect to FIGS. 1A-1C. Control electronics 50 may be electrically connected to the first transmitter electrode 22 and the second transmitter electrode 26, as well as with the receiver bias electrode 39, the pixel circuits 36 and other circuitry on the substrate 32. The control electronics 50 may operate substantially as discussed previously with respect to FIGS. 1A-1C.

The platen 40 may be any appropriate material that can be acoustically coupled to the receiver. Acoustically coupled materials allow the transmission of acoustic waves such as ultrasonic waves from one layer to another. Examples of materials that may be suitable for the platen may include plastic, ceramic, glass, sapphire, gorilla glass, aluminum, stainless steel, a metal, a metal alloy, polycarbonate, a polymeric material, or a metal-filled plastic. In some implementations, the platen 40 can be a cover plate, e.g., a cover glass or a lens glass for a display. Detection and imaging can be performed through relatively thick platens if desired, e.g., 1 mm and above.

Examples of piezoelectric materials that may be employed according to various implementations include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 24 and the piezoelectric receiver layer 38 may be selected so as to be suitable for generating and receiving ultrasonic waves. In one example, a PVDF piezoelectric transmitter layer 24 is approximately 28 µm thick and a PVDF-TrFE receiver layer 38 is approximately 12 µm thick. Example frequencies of the ultrasonic waves are in the range of 5 MHz to 30 MHz, with wavelengths on the order of a quarter of a millimeter or less.

Figure 3:
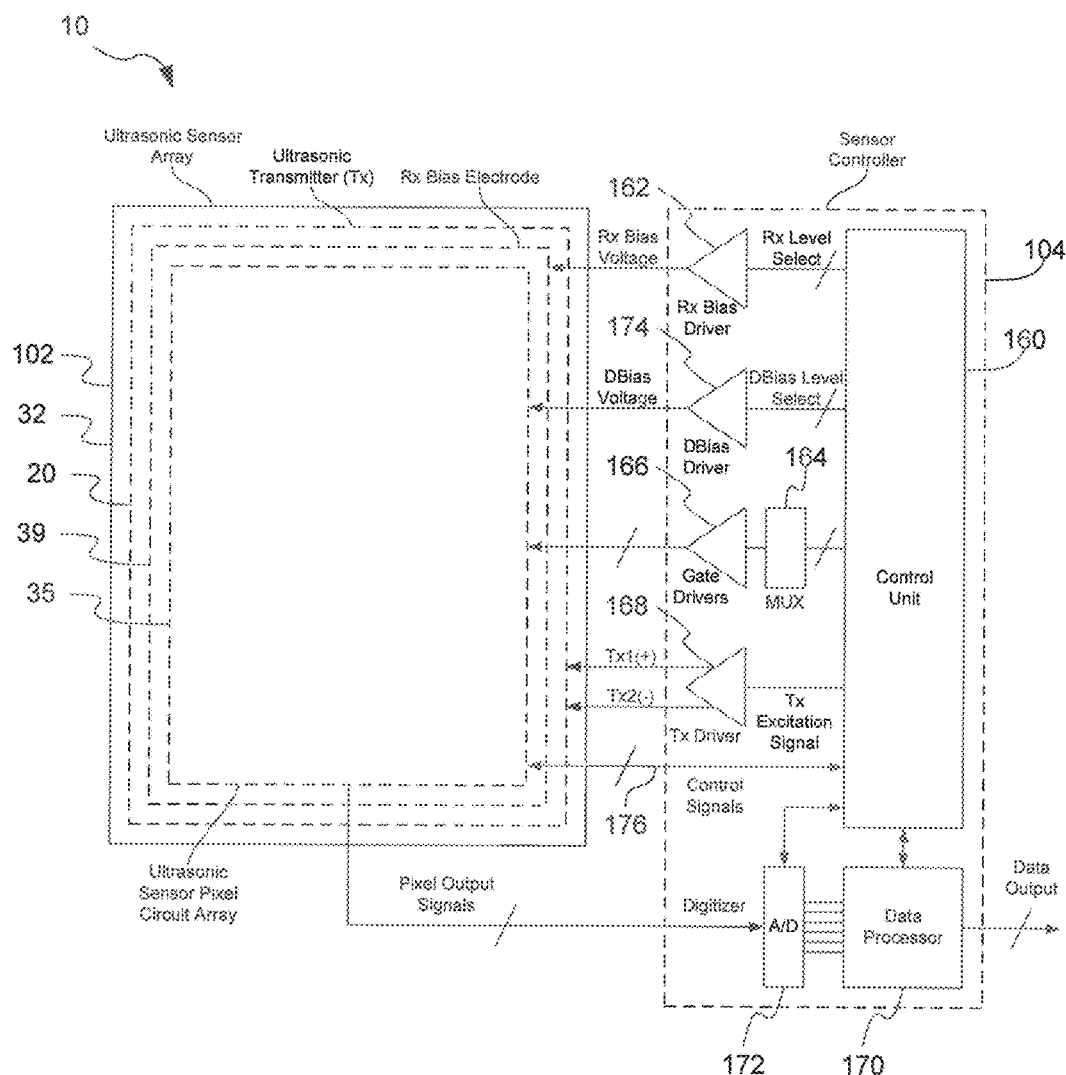
FIG. 3 illustrates a block diagram of an ultrasonic sensor system.

FIG. 3 illustrates a block diagram of an ultrasonic sensor system 10. The ultrasonic sensor system 10 may include an ultrasonic sensor array 102 with an ultrasonic transmitter 20 and TFT substrate 32 including TFT circuitry 33 including an ultrasonic sensor pixel circuit array 35. The ultrasonic transmitter 20 may be in electronic communication (for example, through one or more electronic connections) to a transmitter driver 168. In some implementations, the transmitter driver 168 may have a positive polarity output signal and a negative polarity output signal in electronic communication with one or more transmitter electrodes 22 and 26 associated the ultrasonic transmitter 20. The transmitter driver 168 may be in electronic communication with a control unit 160 of a sensor controller 104. Many of the elements shown may form part of control electronics 50 as described with respect to FIGS. 1A-1C and FIG. 2 above. The sensor controller 104 may include a control unit 160 that is configured to control various aspects of the sensor system 10, e.g., ultrasonic transmitter timing and excitation waveforms, bias voltages for the ultrasonic receiver 30 and pixel circuitry 36, pixel addressing, signal filtering and conversion, readout frame rates, and so forth. The control unit 160 may provide one or more transmitter excitation signals to the transmitter driver 168. The control unit 160 may be in electronic communication with a receiver bias driver 162 through a level select input bus. The receiver bias driver 162 may provide a receiver bias voltage to a receiver bias electrode 39 disposed on a surface of a piezoelectric receiver layer 38 that may be attached to the pixel input electrodes 37 of the sensor pixel circuits 36 (see FIG. 2). The control unit 160 may be in electronic communication with one or more demultiplexers 164. The demultiplexers 164 may be in electronic communication with a plurality of gate drivers 166. The gate drivers 166 may be in electronic communication with the sensor pixel array 35 of the ultrasonic sensor array 102. The gate drivers 166 may be positioned external to the sensor pixel array 35 or in some implementations included on the same substrate 32 as the sensor pixel array 35. The demultiplexers 164, which may be external to or included on the same substrate with the sensor pixel array 35, may be used to select specific gate drivers 166. The gate drivers 166 may select one or more rows or columns of the sensor pixel array 35. The sensor pixel array 35 may be in electronic communication with one or more digitizers 172. The digitizers 172 may convert analog pixel output signals from one or more sensor pixels 34 of the sensor pixel array 35 to digital signals suitable for further processing within a data processor 170 that may be part of or external to the sensor controller 104. The sensor controller 104 may include one or more data processors 170 that receive data from the sensor pixel array 35. The sensor controller 104 may provide data outputs to an external system or processor, such as an applications processor of a mobile device. The data processor 170 may translate the digitized data into image data of a fingerprint or format the data for further processing.

In some implementations, the control unit 160 may send a transmitter (Tx) excitation signal to a Tx driver 168 at regular intervals to cause the Tx driver 168 to excite the ultrasonic transmitter 20 and produce ultrasonic waves. The control unit 160 may send level select input signals through a receiver (Rx) bias driver 162 to bias the receiver bias electrode 39 and allow gating for ultrasonic signal detection by the sensor pixels 34. In some implementations, the control unit 160 may send level select input signals through a diode bias (DBIAS) driver 174 to the pixel circuits 36 of the sensor pixel array 35. One or more demultiplexers 164 may be used to turn on and off gate drivers 166 that cause a particular row or column of the sensor pixel array 35 to provide pixel output signals. Output signals from the pixel circuits 36 may be sent through a charge amplifier, a filter such as a resistor-capacitor (RC) filter or an anti-aliasing filter, and a digitizer 172 to the data processor 170. One or more control lines 176 may carry control signals between the sensor controller 104 and the ultrasonic sensor array 102. Note that portions of the sensor controller 104 may be included on the TFT substrate 32 and other portions may be included in an associated integrated circuit.

FIG. 4 representationally depicts aspects of a 4×4 pixel array 35 of sensor pixels 34 for an ultrasonic sensor. Each pixel 34 may be, for example, associated with a local region of piezoelectric sensor material PSM, a peak detection diode D1 and a readout transistor M3; many or all of these elements may be formed on or in the substrate 32 to form the pixel circuit 36. In practice, the local region of piezoelectric sensor material of each pixel 34 may transduce received ultrasonic energy into electrical charges. The peak detection diode D1 may register the maximum amount of charge detected by the local region of piezoelectric sensor material PSM. Each row of the pixel array 35 may then be scanned, e.g., through a row select mechanism, a gate driver, or a shift register, and the readout transistor M3 for each column may be triggered to allow the magnitude of the peak charge for each pixel 34 to be read by additional circuitry, e.g., a multiplexer and an A/D converter. The pixel circuit 36 may include one or more TFTs to allow gating, addressing, and resetting of the pixel 34.

Each pixel circuit 36 may provide information about a small portion of the object detected by the ultrasonic sensor system 10. While, for convenience of illustration, the example shown in FIG. 4 is of a relatively coarse resolution, ultrasonic sensors having a resolution on the order of 500 pixels per inch or higher may be configured with an appropriately scaled structure. The detection area of the ultrasonic sensor system 10 may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object 70.

Figure 5:
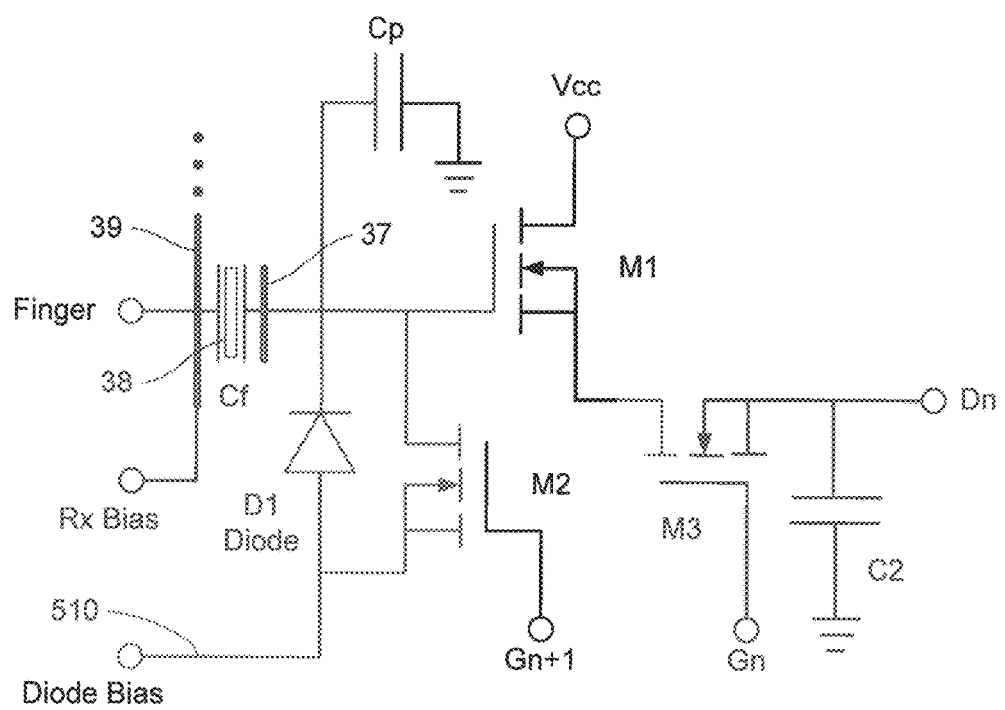
FIG. 5 illustrates an example of a sensor pixel circuit that may be included in the ultrasonic sensors of FIGS. 1-4.

FIG. 5 illustrates an example of a sensor pixel circuit 36 that may be included in the ultrasonic sensors of FIGS. 1-4. For example, the piezoelectric sensor pixel circuit 36 may be included in each sensor pixel 34 in the sensor pixel array 35 of the ultrasonic sensor array 102 shown in FIG. 3. In some implementations, each of the sensor pixels 34 in the sensor pixel array 35 may include a sensor pixel circuit 36. Because the sensor pixel circuit 36 may operate with electrically coupled piezoelectric layers such as piezoelectric receiver layer 38, the sensor pixel circuit 36 may detect local magnitudes of transmitted or reflected ultrasonic waves that pass through the piezoelectric layer.

In the example of FIG. 5, the sensor pixel circuit 36 may include a capacitor Cf, a capacitor Cp, a diode D1, a transistor M1, a transistor M2, a transistor M3, and a capacitor C2. Each of the transistors M1, M2 and M3 may correspond to an n-type metal-oxide-semiconductor (NMOS) transistor. The diode D1 may correspond to a p-n type diode or a p-i-n type (PIN) diode, and may serve as a peak-detecting or rectifying diode. The capacitor Cf denotes the capacitance of a piezoelectric film or piezoelectric receiver layer 38 associated with each sensor pixel circuit 36. For example, the capacitor Cf may denote the capacitance between the receiver bias electrode 39 and the pixel input electrode 37, with a portion of the piezoelectric receiver layer 38 being a dielectric layer positioned between the receiver bias electrode 39 and the pixel input electrode 37. The capacitor C2 represents an output capacitance (e.g., a column or row capacitance, depending on the particular configuration), and the capacitance may vary with the size and configuration of the sensor array. For example, a large 3-inch by 3-inch sensor array may have appreciably higher output capacitance C2 than a small rectangular 8 mm×3 mm sensor array due to longer electrical traces and a larger number of output transistors attached to the rows or columns. While square configurations may have substantially similar output capacitances whether row-addressed or column-addressed, rectangular configurations may have different output capacitances depending on whether the sensor array is row- or column-addressed. In the example of FIG. 5, the capacitors Cf and C2 may have capacitances of approximately 13 femtofarads (fF) and 10 picofarads (pF), respectively. It should be appreciated that the example of FIG. 5 is illustrative and that device parameters (such as capacitance values) may be selected or determined based on the particular application or layout of the pixel circuits. Alternatively, each of the transistors M1, M2 and M3 may correspond to a p-type metal-oxide-semiconductor (PMOS) transistor, with adjustments to supply voltages and voltage values as needed for operation.

The transistor M1 may be responsive to a supply voltage (Vcc) for the sensor array. The supply voltage (Vcc) may also be referred to as the "array power" (AP). The transistor M1 may serve as a source follower, allowing a signal on the gate of M1 to be transferred to the pass transistor M3 and to the output Dn when the pass transistor M3 is turned on. The diode D1 and the source follower transistor M1 may be responsive to a diode bias voltage (Diode Bias or "DBIAS"). The diode bias voltage level may be applied to the gate of M1 when the diode D1 is forward biased or when the reset transistor M2 is turned on. The reset transistor M2 may be coupled to a gate driver (Gn+1) for an adjacent (n+1) row or column of pixel circuits (not shown), and the transistor M3 may be coupled to a gate driver (Gn) for an nth row or column (not shown).

For example, the reset transistor M2 may be turned on to reset the gate voltage on transistor M1 in a row or column n when the next (n+1) row or column is read out. The gate driver voltage Gn may activate (or "turn on") the pass transistor M3 to enable the signal voltage on the gate of M1 to be read out of the sensor pixel circuit 36, while also resetting the gate of transistor M1 on a preceding (n−1) row or column (not shown). The diode D1 may be biased using a bias signal, such as the diode bias signal illustrated in FIG. 5, which may bias the diode D1 into a peak-detecting mode of operation or a rectification mode of operation, as illustrative examples. The diode bias signal may be applied to a diode bias electrode 510, such as the anode of diode D1. In some implementations, the diode bias signal may be generated by the control electronics 50 of FIG. 1 or the sensor controller 104 of FIG. 3. In other implementations, the diode bias signal may be generated at another location, such as at the ultrasonic sensor array 102 of FIG. 3.

In operation, the sensor pixel circuit 36 may be responsive to an ultrasonic wave passing through the pixel circuit, such as a reflected ultrasonic wave 80b shown in FIG. 1C. In the example of FIG. 5, the ultrasonic wave may be reflected from the target object 70 (e.g. a finger of a user or a stylus) placed on an outer surface of the sensor array. The reflection may generate a charge/voltage in accordance with a piezoelectric effect. For example, the reflection may cause dynamic tensile and compressive mechanical stresses to crystalline structures and/or ceramic structures of a piezoelectric device, such as the piezoelectric receiver layer 38, which may be coupled to the sensor pixel circuit 36. Materials suitable for the piezoelectric receiver layer 38 include polyvinylidene fluoride (PVDF) or a copolymer of PVDF and trifluoroethylene (PVDF-TrFE). The mechanical stress may generate a surface charge or voltage that can be detected by the sensor pixel circuit 36, such as by the rectifying diode D1. The rectified signal and the initial bias voltage on the gate of M1 may determine the gate voltage of transistor M1, which may be read out by turning on transistor M3 of the sensor pixel circuit 36. In the example of FIG. 5, the parasitic capacitance Cp may shunt certain alternating current (AC) signals to ground, thus filtering certain signals (e.g., high frequency noise). The sensor pixel circuit 36 may generate a pixel output signal or data output signal (Dn) for the nth row or column having a magnitude or voltage indicating a strength or magnitude of the reflected ultrasonic wave as detected by the sensor pixel circuit 36. The data output signal (Dn) may correspond to one of the data output samples of FIG. 3.

In some implementations, the receiver bias electrode 39 and the piezoelectric receiver layer 38 may be capacitively coupled to the gate of transistor M1. A capacitive voltage divider may be formed between Cf and the gate capacitance of transistor M1. Operation of the capacitive voltage divider may be further affected by the parasitic capacitances Cp and the capacitances associated with transistor M2 and diode D1. When a receiver bias voltage is applied to the receiver bias electrode 39, an M1 gate bias voltage may be generated at the gate of the transistor M1 in accordance with the capacitive voltage divider network. For example, the M1 gate bias voltage may serve to bias transistor M1 in an "on" state. In a multi-level mode of operation, a "block" value or voltage applied to the receiver bias electrode 39 may bias the diode D1 to operate in a deep reverse bias mode that may cause voltages generated by the piezoelectric layer due to a passing ultrasonic wave to be blocked; a "sample" value or voltage applied to the receiver bias electrode 39 may bias and allow the voltage on the cathode of diode D1 to operate in a forward bias mode and rectify signal voltages generated across the piezoelectric receiver layer 38; and a "hold" value or voltage applied to the receiver bias electrode 39 may bias the diode D1 to operate in a mild reverse bias mode and allow the sample voltage value on the gate of transistor M1 of sensor pixel circuit 36 to be read out when desired.

In an alternative mode of operation, multiple levels of bias voltages may be applied to the diode bias electrode 510 of FIG. 5. These diode bias values may correspond to a hold value, a block value, and a sample value to allow operation in a ready or hold mode, a block mode, and a sample mode, respectively. In an illustrative implementation, the control electronics 50 may be configured to selectively initiate a hold mode of operation, a block mode of operation, or a sample mode of operation at the ultrasonic sensor array 102 by selectively biasing the diode bias electrode 510 of the pixel circuits 36. For example, a bias voltage may have a hold value applied to the diode bias electrode 510 to cause the pixel circuits 36 to maintain a current value (e.g., to "hold" a current value). The bias voltage may have a block value applied to the diode bias electrode 510 to inhibit the pixel circuits 36 from acquiring or detecting signals (e.g., to "block" the pixel circuits 36 from acquiring or detecting signals). The bias voltage may have a sample value applied to the diode bias electrode 510 to cause the pixel circuits 36 to detect ultrasonic waves (e.g., to "sample" the ultrasonic waves). During these operational modes with DBIAS level control, the value applied to RBIAS (e.g. the receiver bias electrode 39) may be held constant (such as a ground potential) or caused to vary in some implementations. The values and timing with DBIAS methods may vary from RBIAS methods of operating the ultrasonic sensor array 102, yet the functionality may be similar or substantially similar. In other implementations, functionality of DBIAS may be different than functionality of RBIAS. Other operational modes may vary either RBIAS values, DBIAS values, or both during operation.

Thus, a TFT pixel circuit (e.g., the sensor pixel circuit 36) may include a diode (e.g., the diode D1) that is responsive to a diode bias signal (e.g., the diode bias signal of FIG. 5). The TFT pixel circuit may further include a first transistor, such as the transistor M1. The first transistor may be responsive to a receiver bias voltage via capacitive coupling. For example, a gate terminal of the first transistor may be capacitively coupled to the receiver bias electrode 39. The piezoelectric receiver layer 38 may be configured to generate a surface charge based on a reflected ultrasonic wave, such as based on the reflected ultrasonic wave 80*b*. The diode D1 and the first transistor M1 may be responsive to the surface charge to generate a particular signal. The TFT pixel circuit 36 may further include a second transistor, such as the transistor M3. The second transistor M3 may be responsive to the particular signal to generate a data output signal Dn of the TFT pixel circuit 36, such as the data output signal (Dn) of FIG. 5. The data output signal Dn may be included in the data output of FIG. 3.

FIGS. 6A-E depict cross-sectional views of an ultrasonic sensor array 102 of an ultrasonic sensor system 10 illustrating reflected ultrasonic signals from a target object 70 such as a finger or the tip of a stylus.

Figure 6A:
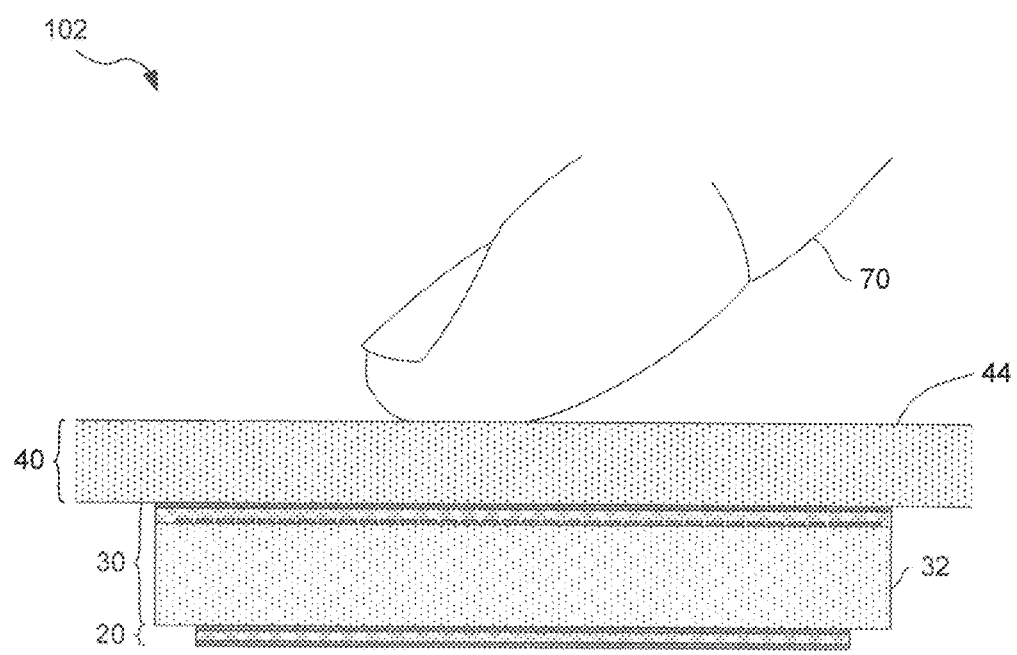
FIG. 6A illustrates a cross-sectional view of an exemplary implementation of an ultrasonic sensor array, a platen and a target object such as a finger positioned on a surface of the platen, according to aspects of the present disclosure.

FIG. 6A illustrates a cross-sectional view of an exemplary implementation of an ultrasonic sensor array 102, a platen 40 and a target object 70, such as a finger positioned on an exposed surface 44 of the platen, according to aspects of the present disclosure. In the example shown in FIG. 6A, the ultrasonic sensor array 102 may include a platen 40 serving as a cover layer, an ultrasonic receiver 30 with an overlying receiver bias electrode 39 and a TFT substrate 32 with associated TFT circuitry, and an ultrasonic transmitter 20. The ultrasonic transmitter 20 may have upper and lower electrodes disposed on each side of a piezoelectric transmitter layer.

Figure 6B:
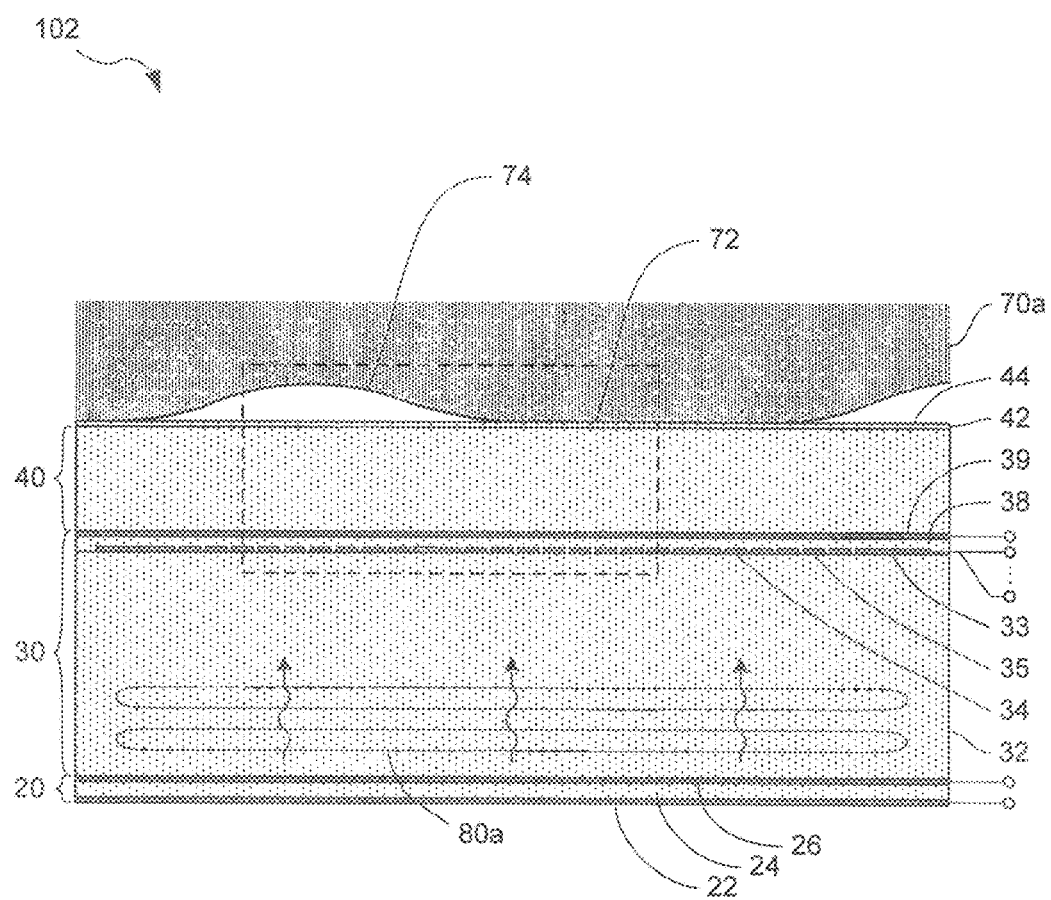
FIG. 6B illustrates a substantially planar ultrasonic plane wave launched from an ultrasonic transmitter having a piezoelectric layer positioned between transmitter electrodes that are disposed on each side of the piezoelectric layer.

FIG. 6B illustrates a substantially planar ultrasonic plane wave 80*a* launched from an ultrasonic transmitter 20 having a piezoelectric transmitter layer 24 positioned between transmitter electrodes 22 and 26 that are disposed on each side of the piezoelectric layer 24. The ultrasonic transmitter 20 may be coupled to a TFT substrate 32 having TFT circuitry 33 formed thereon. The ultrasonic transmitter 20 may launch one or more ultrasonic plane waves 80*a* through the TFT substrate 32, TFT circuitry 33 and a platen 40. In some implementations, the platen 40 may have a protective coating layer 42. In some implementations, a cover glass or cover lens of a display device may serve as a cover layer or as the platen 40. The protective coating layer 42 may be included on an outer surface of the platen 40. The coating layer 42 may serve as a smudge-resistant layer, a scratch-resistant layer, an environmentally protective layer, an acoustic impedance matching layer, an optical interference filter, or other functional layer. The coating layer 42 may include a multi-layer stack of sub-layers. In some implementations, the exposed surface of the coating layer 42 may serve as the sensor surface 44. In some implementations, the coating layer 42 may be positioned directly on the ultrasonic receiver 30 and serve as a platen 40. In some implementations, the ultrasonic sensor array 102 may be configured without a platen 40 or a coating layer 42, with the outer surface of the ultrasonic receiver 30 serving as the sensor surface 44. Note that in many implementations the sensor surface 44 corresponds to the exposed surface 44 of the platen 40 or the outer surface 44 of the coating layer 42.

A target object such as a finger 70*a* or a stylus tip may be positioned on an outer sensor surface 44 of the ultrasonic sensor array 102. Ultrasonic plane waves 80*a* traveling through the platen 40 and optional coating layer 42 may reflect off the sensor surface 44 between the ultrasonic sensor array 102 and the finger 70*a*. Valley regions 74 between ridge regions 72 of the finger 70*a* may reflect a large portion of the incident ultrasonic energy back toward the TFT circuitry 33. Ridge regions 72 of the finger 70*a* in contact with the sensor surface 44 may absorb, scatter or transmit the incident ultrasonic energy, resulting in a lower amount of ultrasonic energy reflected back toward the TFT circuitry 33. The reflected ultrasonic energy from the ridge and valley regions of the finger 70*a* may be converted by a piezoelectric receiver layer 38 positioned over a portion or all of the TFT circuitry 33 into electric charge that may be detected by an underlying sensor pixel array 35 of sensor pixels 34 of the TFT circuitry 33. A receiver bias voltage may be applied to a receiver bias electrode 39 that is positioned over the piezoelectric receiver layer 38 to allow the acquisition of image information as the reflected ultrasonic waves 80*b* (see FIG. 6C) pass through the piezoelectric receiver layer 38 and the TFT circuitry 33. Once acquired, pixel output signals from the sensor pixel array 35 may be clocked out from the TFT circuitry 33 for further processing using one or more data and control lines.

Figure 6C:
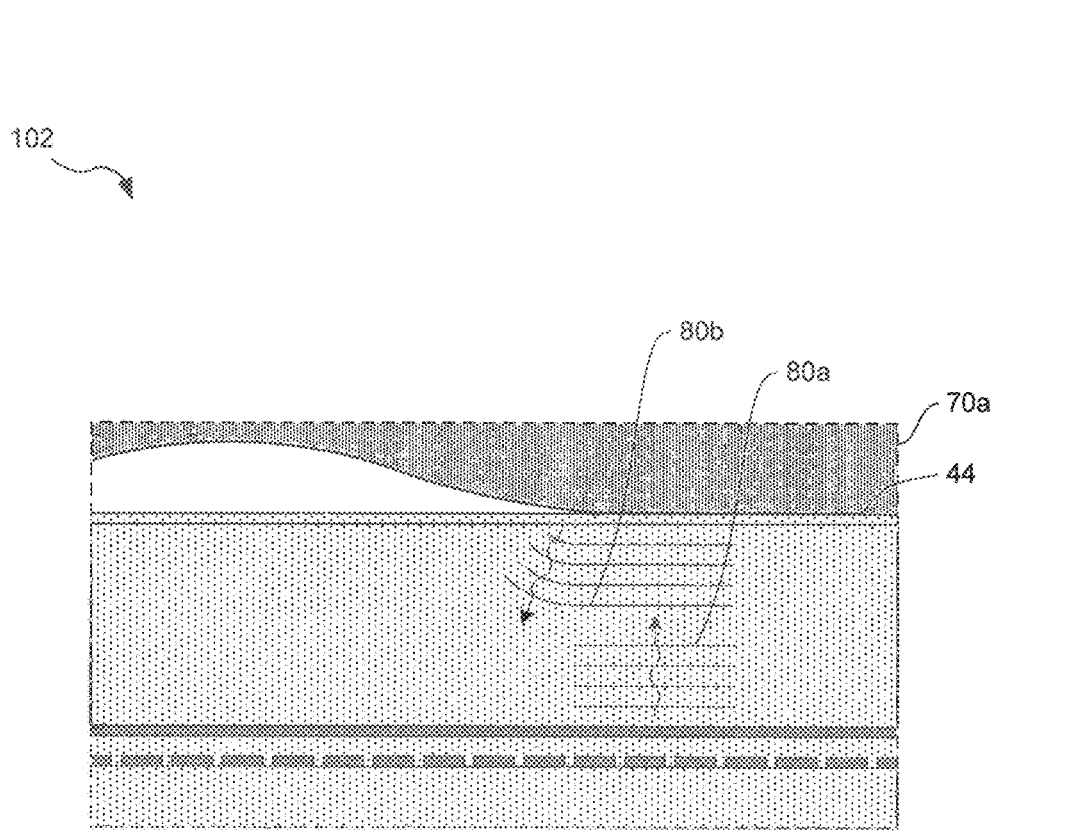
FIG. 6C shows an enlarged portion of an ultrasonic sensor array with a finger positioned on a sensor surface of the ultrasonic sensor array.

FIG. 6C shows an enlarged portion of an ultrasonic sensor array 102 with a finger 70*a* positioned on a sensor surface 44 of the ultrasonic sensor array 102, illustrating reflected ultrasonic waves 80*b* from a ridge region 72 of the finger 70*a*. Incident ultrasonic plane waves 80*a* may reflect off the sensor surface 44, with a portion of the reflected waves 80*b* reflected from an edge of the finger ridge region 72 at a higher angle and with a somewhat delayed time compared to other portions of the finger ridge region 72 of the finger 70*a*. The delayed and diffracted portion of the reflected wave 80*b* may be compensated for by acquiring pixel output signals from neighboring pixels, accounting for the phase delay and amplitude of the reflected ultrasonic waves 80*b* as measured by neighboring sensor pixels, and generating a corrected output signal for each pixel of interest in the array 102.

Figure 6D:
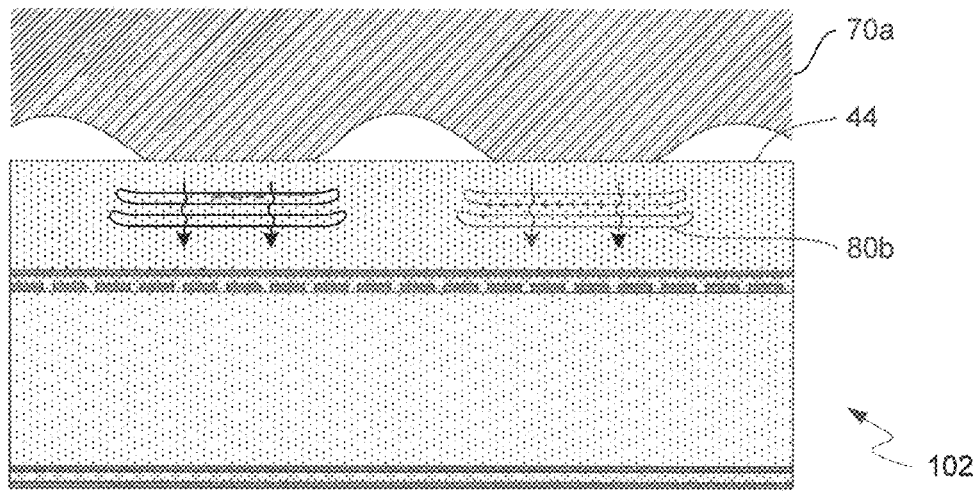
FIG. 6D depicts diffraction effects from multiple ridges of a finger positioned on a sensor surface of the ultrasonic sensor array.
Figure 6E:
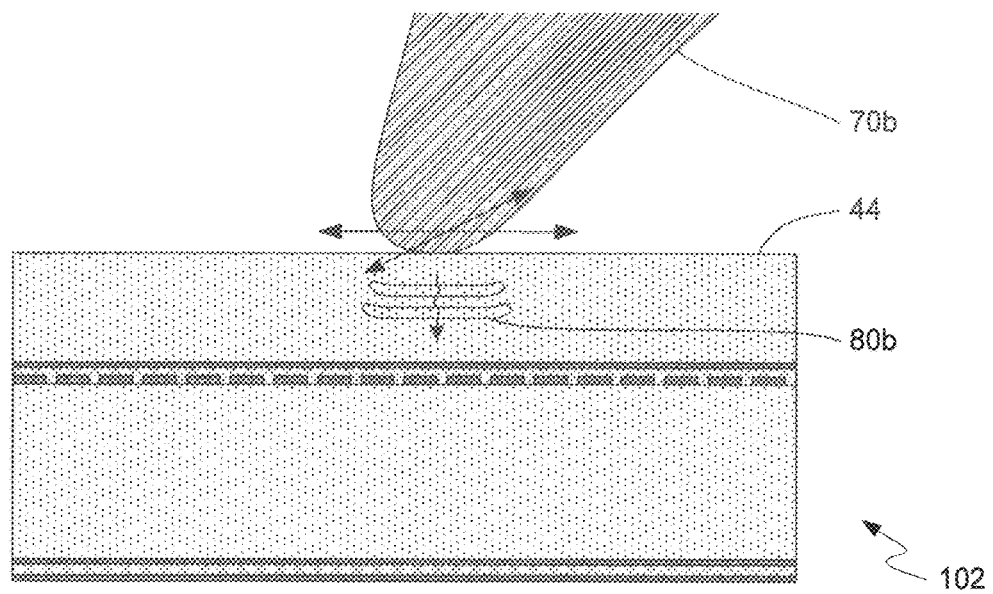
FIG. 6E depicts diffraction effects from a stylus tip of a stylus positioned on a sensor surface of the ultrasonic sensor array.

FIG. 6D depicts diffraction effects from multiple ridges of a finger 70*a* positioned on a sensor surface 44 of the ultrasonic sensor array 102. Note that diffraction effects may be minimal for ultrasonic waves 80*b* reflecting from portions of a target object that are uniform, such as the pressed ridges of a finger 70*a* or large regions of air between the ridges or outside of a touching object, yet may be significant at the edges or edge features of a target object 70 such as a finger, finger ridges, or other surface features. Note also that diffraction effects may be reduced when the platen thickness is small or non-existent. In a similar manner, FIG. 6E depicts diffraction effects of reflected ultrasonic waves 80*b* from a stylus tip of a stylus 70*b* positioned on a sensor surface 44 of the ultrasonic sensor array 102, with diffraction effects being the most pronounced near the tip of the stylus in contact with the platen surface 44.

Figure 6F:
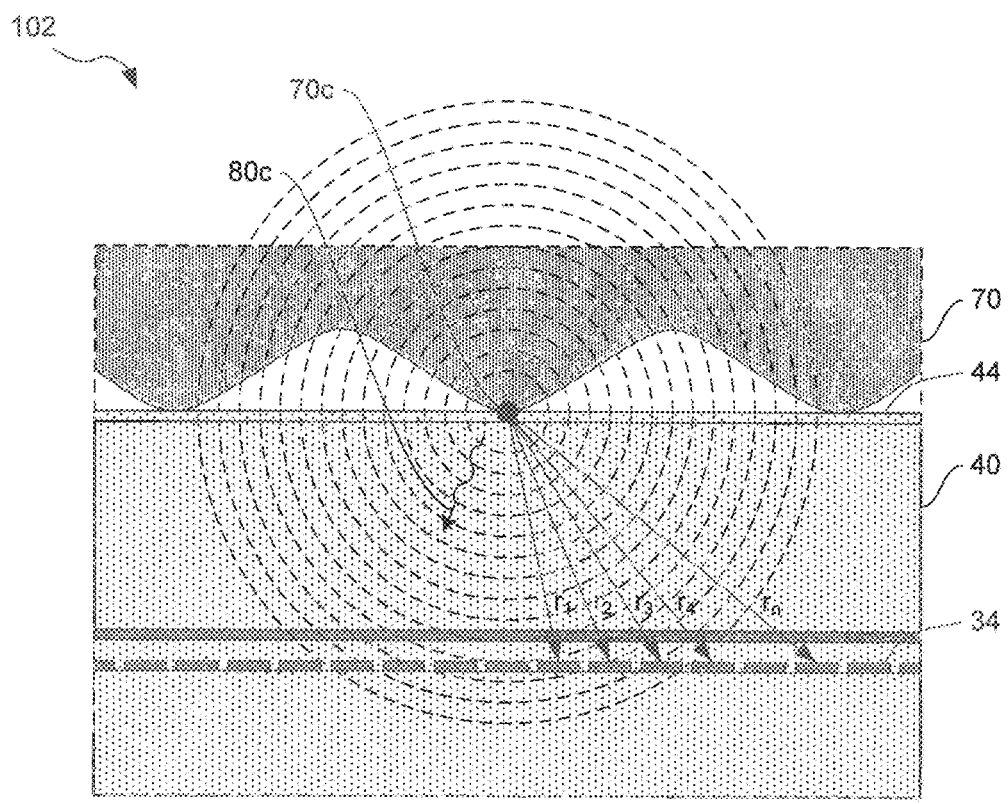
FIG. 6F illustrates spherical waves emitted from a point of a target object positioned on a sensor surface of the ultrasonic sensor array.

FIG. 6F illustrates spherical waves 80*c* emitted from a point 70*c* of a target object 70 positioned on a sensor surface 44 of the ultrasonic sensor array 102. An incident ultrasonic plane wave (not shown) may strike the point 70*c* and reflect back toward the sensor pixel 34 with an essentially spherical wavefront. Radii $r_1, r_2, r_3, \ldots r_n$ indicate distances from the point 70*c* to various sensor pixels 34, illustrating a time (phase) delay of the reflected ultrasonic wave 80*c* striking the sensor pixels 34 that varies with distance from the point 70*c*. Corrections to the pixel output signals may be made by accounting for the various phase delays of diffracted ultrasonic waves striking neighboring sensor pixels.

Figure 7A:
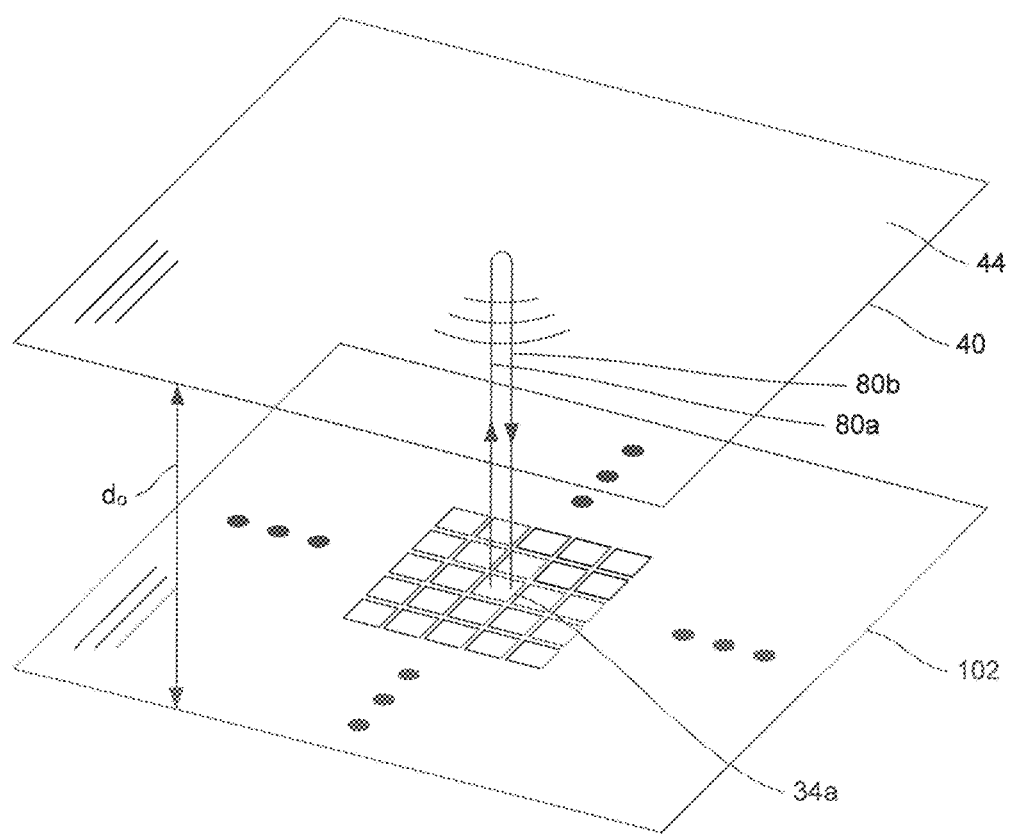
FIG. 7A depicts a reflection of an ultrasonic plane wave from a surface of a platen onto a selected pixel of an underlying ultrasonic sensor array.

FIG. 7A depicts a reflection 80*b* of an ultrasonic plane wave 80*a* from an exposed surface 44 of a platen 40 onto a selected sensor pixel 34*a* of an underlying ultrasonic sensor array 102. The separation between the platen surface 44 and the sensor pixel 34*a* may be given by distance $d_0$. A 5×5 portion of sensor pixels 34 in the sensor array 102 is shown to illustrate the concepts described herein, although limitations to a 5×5 array are not intended. The transmitted ultrasonic plane wave 80*a* may pass through the array of sensor pixels 34 and strike the exposed surface 44 of the platen 40. The reflected ultrasonic wave 80*b* may arrive at the array of sensor pixels 34, where local magnitudes of the reflected ultrasonic wave 80*b* may be detected. The first acquisition time delay prior to sampling the reflected wave 80*b* may account for the distance $d_0$ between the selected pixel 34*a* and the platen surface 44. For example, the acquisition time delay (e.g. $RGD_1$) may approximately equal the time of flight for an ultrasonic wave traversing twice the distance $d_0$, given by the product of the speed of sound in the platen 40 and twice the distance $d_0$ (plus the time through any additional layers such as coatings, matching layers or adhesive layers).

Figure 7B:
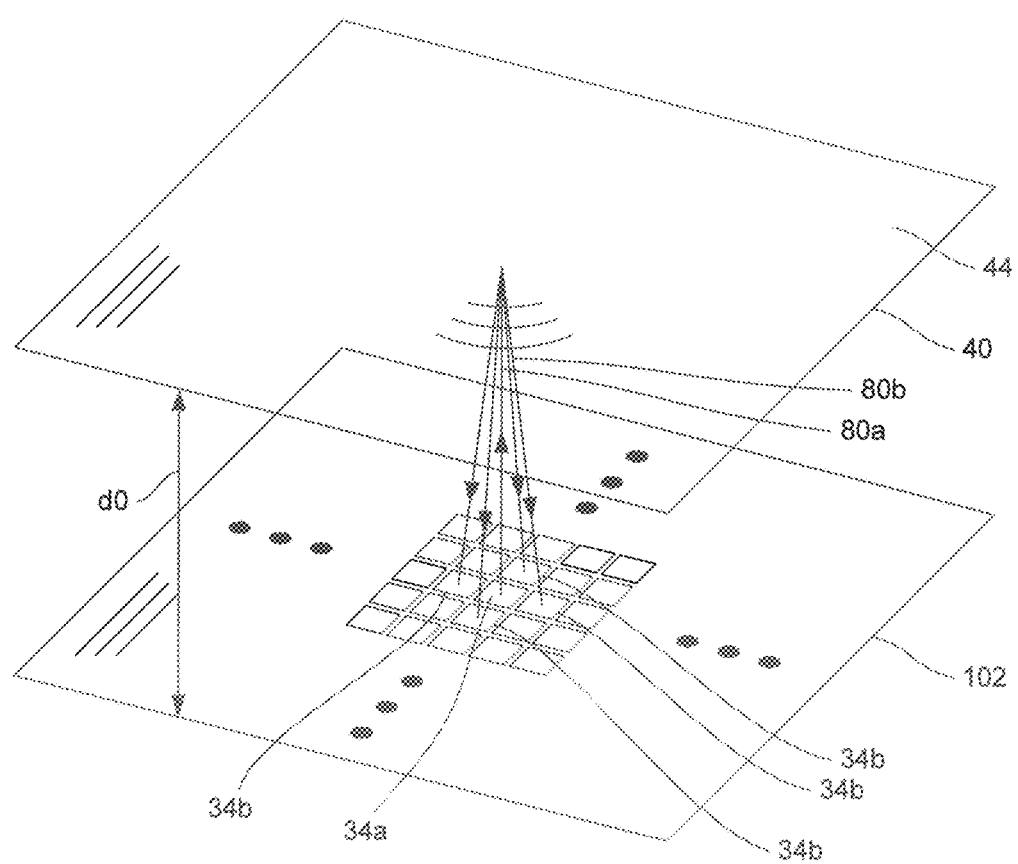
FIG. 7B depicts a reflection of an ultrasonic plane wave from a surface of a platen onto a first set of neighboring pixels near a selected pixel of an underlying ultrasonic sensor array.

FIG. 7B depicts a reflection 80*b* of an ultrasonic plane wave 80*a* from an exposed surface 44 of a platen 40 onto a first set of neighboring pixels 34*b* near a selected pixel 34*a* of an underlying ultrasonic sensor array 102. Diffraction effects may cause the reflected ultrasonic plane wave 80*b* to traverse a longer distance, and a somewhat longer acquisition time delay may be included when acquiring a second set of pixel output signals to account and compensate for the diffraction effects. For example, the second acquisition time delay may account for a mean (e.g. average) distance between a selected pixel 34*a* and a set of neighboring pixels 34*b* near the selected pixel 34*a* (the neighboring pixels 34*b* are shown as the sensor pixels adjacent to the sides of the selected pixel 34*a*). For example, the second acquisition time delay or equivalently the range gate delay (e.g. $RGD_2$) may approximately equal the time of flight for an ultrasonic wave traversing the distance $d_0$ and the hypotenuse of a triangle given by the length of legs $d_0$ and $d_1$, whereby $d_1$ is described below with respect to FIG. 7D. The first acquisition time delay and the second acquisition time delay can differ so as to account for a difference in phase between the reflected first ultrasonic plane wave arriving at the selected pixel and the reflected second ultrasonic plane wave arriving at the first set of neighboring pixels.

Figure 7C:
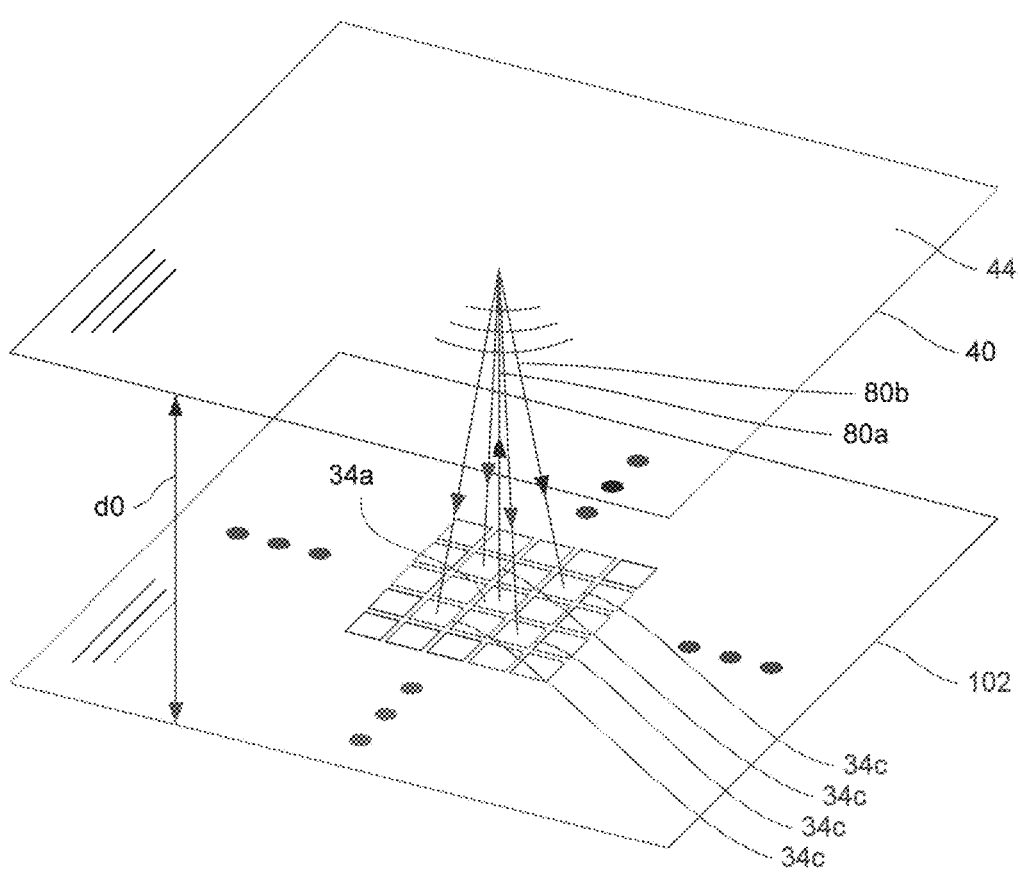
FIG. 7C depicts a reflection of an ultrasonic plane wave from a surface of a platen onto a second set of neighboring pixels near a selected pixel of an underlying ultrasonic sensor array.

FIG. 7C depicts a reflection 80*b* of an ultrasonic plane wave 80*a* from an exposed surface 44 of a platen 40 onto a second set of neighboring pixels 34*c* near a selected pixel 34*a* of an underlying ultrasonic sensor array 102. Diffraction effects may cause the reflected ultrasonic plane wave 80*b* to traverse yet a longer distance, and a longer acquisition time delay may be desired when acquiring a third set of pixel output signals to account and compensate for the diffraction effects. For example, the third acquisition time delay may account for a mean (e.g. average) distance between a selected pixel 34*a* and a second set of neighboring pixels 34*c* near the selected pixel 34*a* (the neighboring pixels 34*c* are shown as the sensor pixels in contact with the corners of the selected pixel 34*a*). For example, the third acquisition time delay (e.g. $RGD_3$) may approximately equal the time of flight for an ultrasonic wave traversing the distance $d_0$ and the hypotenuse of a triangle given by the length of legs $d_0$ and $d_2$, whereby $d_2$ is described below with respect to FIG. 7D.

Figure 7D:
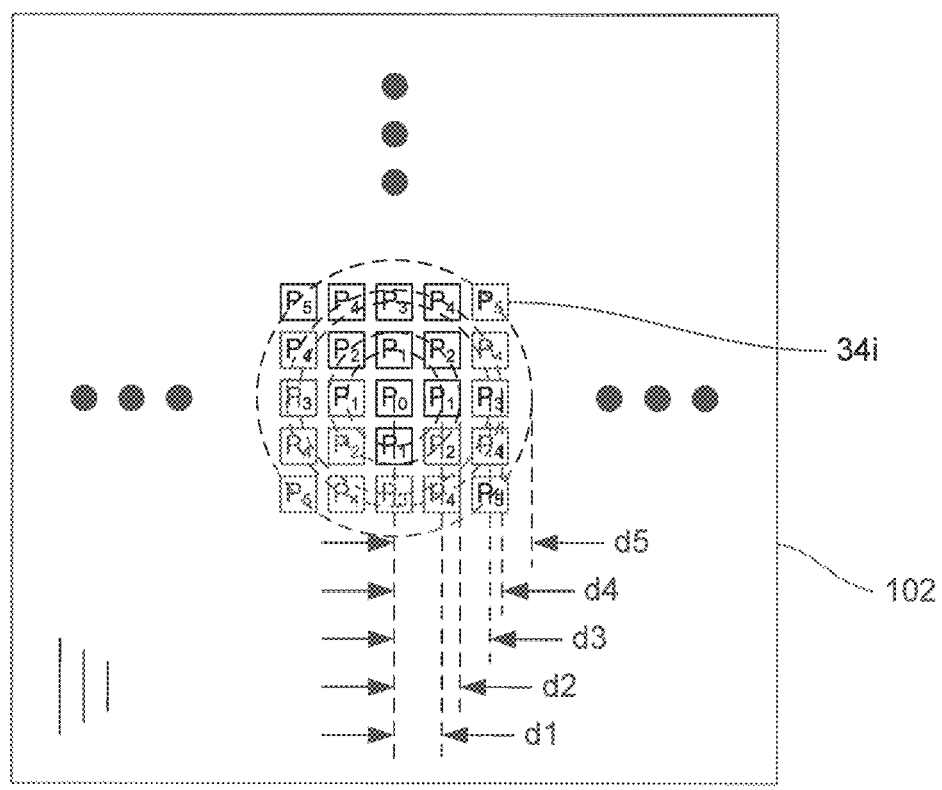
FIG. 7D illustrates a selected pixel of an ultrasonic sensor array and multiple sets of neighboring pixels near the selected pixel.

FIG. 7D illustrates a selected pixel 34*a* ($P_0$) of an ultrasonic sensor array 102 and multiple sets of neighboring pixels near the selected pixel 34*a*. The selected pixel 34*a* may be nearly any sensor pixel in the sensor array 102 and is designated $P_0$ in the figure. For illustrative purposes, a circle is shown having a radius corresponding to a distance $d_1$ from the center of the selected pixel $P_0$ to the center of the first set of neighboring pixels $P_1$, with the distance $d_1$ representing the mean (average) distance between the selected pixel $P_0$ and the first set of neighboring pixels $P_1$ (e.g., the center-to-center distance between two adjacent pixels). A second circle is shown with a radius corresponding to a distance $d_2$ from the center of the selected pixel $P_0$ to the center of the second set of neighboring pixels $P_2$, with the distance $d_2$ representing the mean (average) distance between the selected pixel $P_0$ and the second set of neighboring pixels $P_2$. Additional circles are shown with radii corresponding to distances $d_3$, $d_4$ and $d_5$ from the center of the selected pixel $P_0$ to the center of the additional sets of neighboring pixels $P_n$, with the distances $d_3$, $d_4$ and $d_5$ representing the mean distance between the selected pixel $P_0$ and the additional sets of neighboring pixels $P_3$, $P_4$ and $P_5$, respectively. This procedure may be followed to identify and assign additional sensor pixels to various sets of neighboring pixels and to allow compensation for diffraction effects.

One may note that significant corrections due to diffraction effects may be made to pixel output signals by acquiring additional sets of pixel output signals and generating corrected output signals with the sensor pixel data from neighboring sets of pixels. In some implementations, corrections may be made by acquiring pixel output signals from only one set of neighboring pixels near each selected pixel (e.g., nearest neighbors). In some implementations, corrections may be made by acquiring pixel output signals from two different sets of neighboring pixels near each selected pixel (e.g., nearest neighbors and next-nearest neighbors). In some implementations, corrections may be made by acquiring pixel output signals from three, four, five or more different sets of neighboring pixels near each selected pixel.

FIGS. 8A-8G graphically illustrate various cycles of transmitter excitation signals provided to an ultrasonic transmitter (upper graphs) and various bias levels applied to a receiver bias electrode of an ultrasonic sensor array (lower graphs) with various durations of sampling windows and various acquisition time delays to allow the acquisition of various sets of pixel output signals, for example acquisition of a first set of pixel output signals, a second set of pixel output signals, or a third set of pixel output signals. The descriptions below are generic to the various implementations disclosed herein such that description below related to launching an ultrasonic plane wave should be understood to be applicable to launching a first ultrasonic plane wave and/or second ultrasonic plane wave. Similarly, description below related to acquiring pixel output signals should be understood to be applicable to acquiring a first set of pixel output signals and/or a second set of pixel output signals. General description of acquisition time delays below should also be understood to be applicable to a first acquisition time delay and a second acquisition time delay.

Figure 8A:
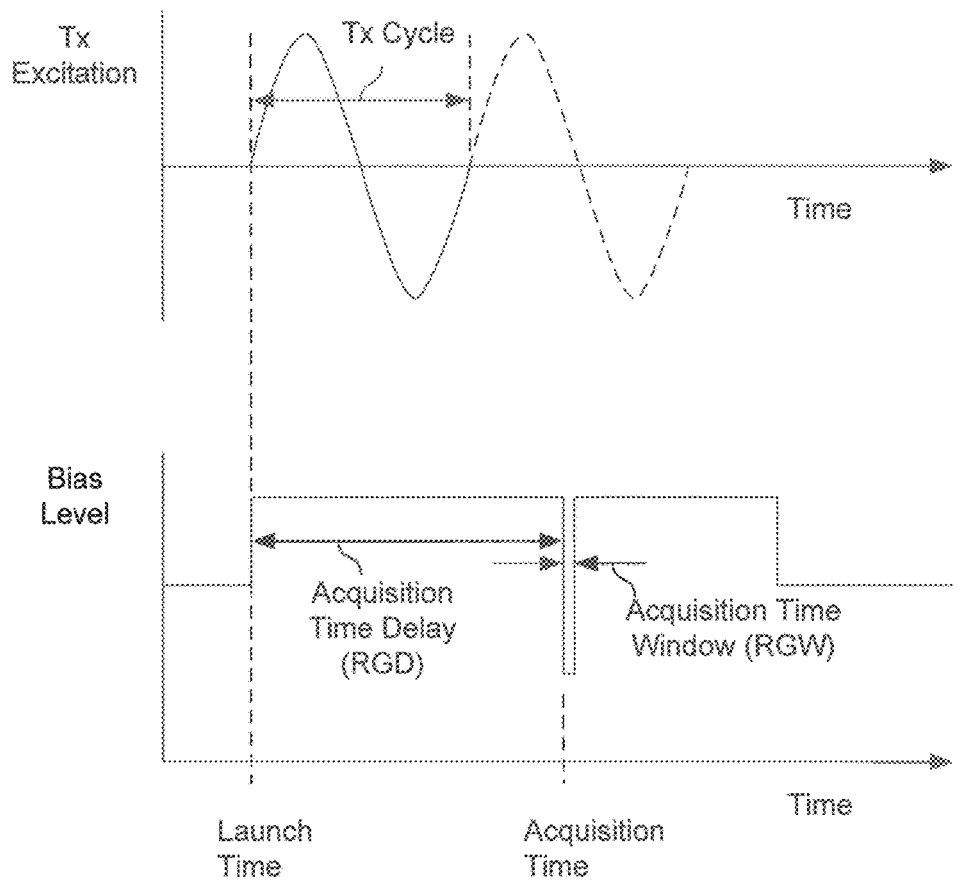
FIGS. 8A-8G graphically illustrate various cycles of transmitter excitation signals provided to an ultrasonic transmitter (upper graphs) and various bias levels applied to a receiver bias electrode of an ultrasonic sensor array (lower graphs) with various durations of sampling windows and various acquisition time delays to allow the acquisition of various sets of pixel output signals.

FIG. 8A graphically illustrates various cycles of transmitter excitation signals (upper graph) that may be provided to an ultrasonic transmitter and various bias levels (lower graph) that may be applied to a receiver bias electrode 39 of an ultrasonic sensor array 102. One or more cycles of an ultrasonic transmitter excitation signal at a predetermined frequency and scan rate may be applied to the transmitter (Tx), as shown in the top portion of the figure. One Tx cycle is shown with a solid line, while additional cycles are shown with a dashed line. In some implementations, a single transmitter excitation cycle may be used. In some implementations, multiple excitation cycles may be used, such as two cycles, three cycles, four cycles, five cycles or more. While shown as sinusoidal waveforms for illustrative purposes, the transmitter excitation signals in some implementations may be square waves, rectangular waves, partial waves, pulsed waves, multiple-frequency waves, chirped waves, low or high duty-cycle waves, variable-amplitude waves, variable-frequency waves, or other suitable waveform for driving the ultrasonic transmitter 20. During the transmission of the outgoing ultrasonic wave, a control signal may be applied to the receiver bias electrode 39 of the ultrasonic sensor array 102 corresponding to a block mode where the bias level is set to a block value so as to prevent signals from outgoing transmitted waves from being captured by the pixel circuits 36. The reflected ultrasonic signals may be captured during a sample mode, during which the bias level of the control signal applied to the receiver bias electrode 39 is set to a sample value. To prevent detection of unwanted internal reflections, the bias level applied to the receiver bias electrode 39 may be brought back to a block value for a short period of time. During a hold mode where the bias level applied to the receiver bias electrode 39 is brought to a hold value, the signals stored in each sensor pixel of the ultrasonic sensor array may be clocked out. Referring again to FIG. 8A, a first transmitter excitation signal may be applied to the ultrasonic transmitter 20 and the bias level of the sensor array set to a block value at a launch time. After an acquisition time delay, also referred to as a range-gate delay (RGD), the bias level may be brought to a sample value and held there for a duration corresponding to an acquisition time window, also referred to as a sampling window or a range-gate window (RGW). Note that the acquisition time window in some implementations may correspond to a time interval that is longer than or equal to the period of a transmitter excitation cycle or shorter than the period of a transmitter excitation cycle in other implementations. Note that the period of a transmitter excitation cycle is generally equal to the period of the corresponding transmitted and reflected ultrasonic waves. After a time interval corresponding to the acquisition time window, the bias level applied to the receiver bias electrode 39 may be brought back to the block value. After another time interval, the bias level may be brought to a hold value to allow clocking out of the pixel output signals. For example, an ultrasonic plane wave may be launched at a launch time from an ultrasonic transmitter 20 such as a plane wave generator toward a platen surface. A set of pixel output signals may be acquired at an acquisition time that is delayed from the launch of the ultrasonic plane wave by an acquisition time delay. The pixel output signals may represent local magnitudes of the ultrasonic plane wave at predetermined times after the plane wave has been reflected from the platen surface. Additional sets of pixel output signals may be acquired after launching additional ultrasonic plane waves. The pixel output signals may be acquired after the same or different acquisition time delays, and with the same or different acquisition time windows.

Figure 8B:
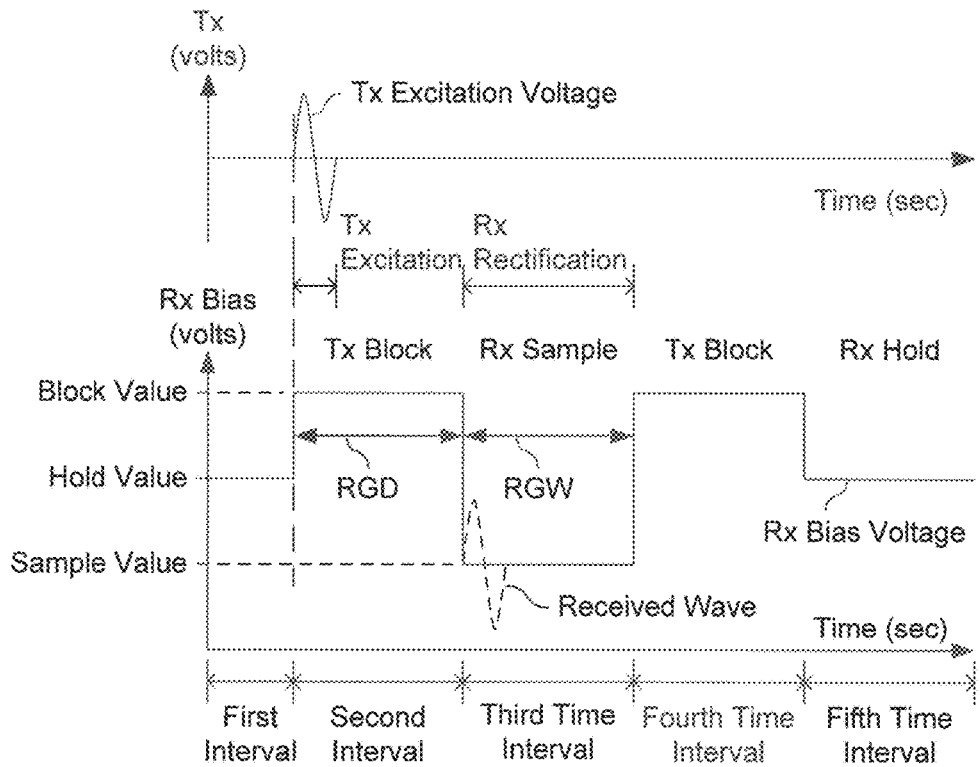

FIG. 8B graphically illustrates a single cycle of a transmitter excitation signal (upper graph) that may be provided to an ultrasonic transmitter and various bias levels that may be applied to a receiver bias electrode 39 of an ultrasonic sensor array 102 to detect a reflected wave (lower graph). After a first time interval, a transmitter excitation signal may be applied to the ultrasonic transmitter 20 to launch an ultrasonic plane wave. The bias level applied to the receiver bias electrode 39 may be changed from a hold value to a block value, which may block the pixel circuits from acquiring a signal as the ultrasonic wave passes through the pixel circuit array. After a second time interval corresponding to the acquisition time delay or equivalently the range-gate delay (RGD), the bias level applied to the receiver bias electrode 39 may be brought to a sample value to allow rectification and sampling of the local magnitude of the ultrasonic wave that has been reflected from the surface of the sensor platen 40, shown as a received wave in the figure. After a third time interval corresponding to the acquisition time window or equivalently the range-gate window (RGW), the bias level applied to the receiver bias electrode 39 may be brought back to a block value to allow for any reverberations of the ultrasonic waves in the sensor stack to die down. After a fourth time interval, the bias level applied to the receiver bias electrode 39 may be brought to a hold value, which allows the pixel output signals captured by one or more pixels in the ultrasonic sensor array to be read out. After a fifth time interval, the sequence may be repeated, allowing for additional sets of pixel output signals to be acquired.

Figure 8C:
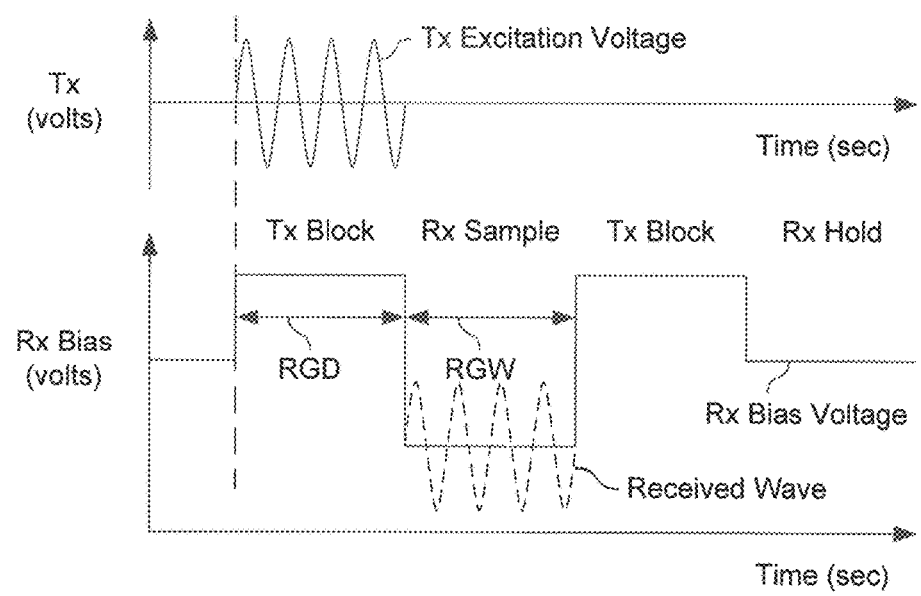

FIG. 8C graphically illustrates multiple cycles of a transmitter excitation signal (upper graph) that may be provided to an ultrasonic transmitter and various bias levels that may be applied to a receiver bias electrode 39 of an ultrasonic sensor array 102 to detect a reflected wave (lower graph). At the initiation of the transmitter excitation voltage, the receiver bias electrode 39 may be brought to a block value while multiple excitation cycles may be applied to the ultrasonic transmitter 20. At or near the end of the excitation cycles, the receiver bias electrode 39 may be brought to a sample value where sensor signals are acquired at the sensor pixels indicating the local amplitude of magnitude of the reflected ultrasonic wave. Note that the range-gate window (RGW) is shown to be wide enough to capture the largest rectified signals from any of the cycles applied to the transmitter 20. In operation, the width of the range-gate window may be equal to or larger than a period of one cycle of the transmitter excitation signal, whereas in most implementations the width of the range-gate window is appreciably shorter than a transmitter excitation cycle to allow sampling at various points along the received ultrasonic wave.

Figure 8D:
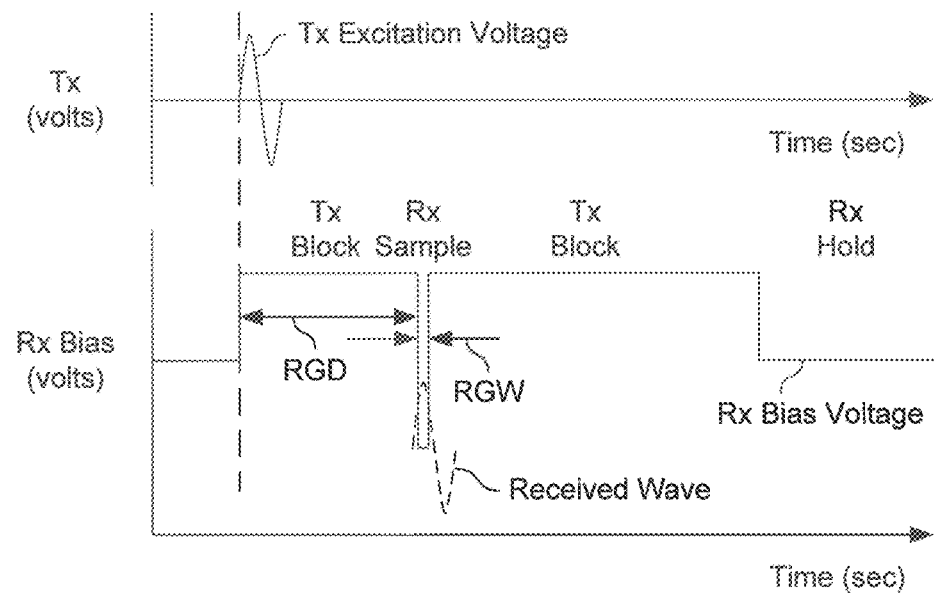
Figure 8E:
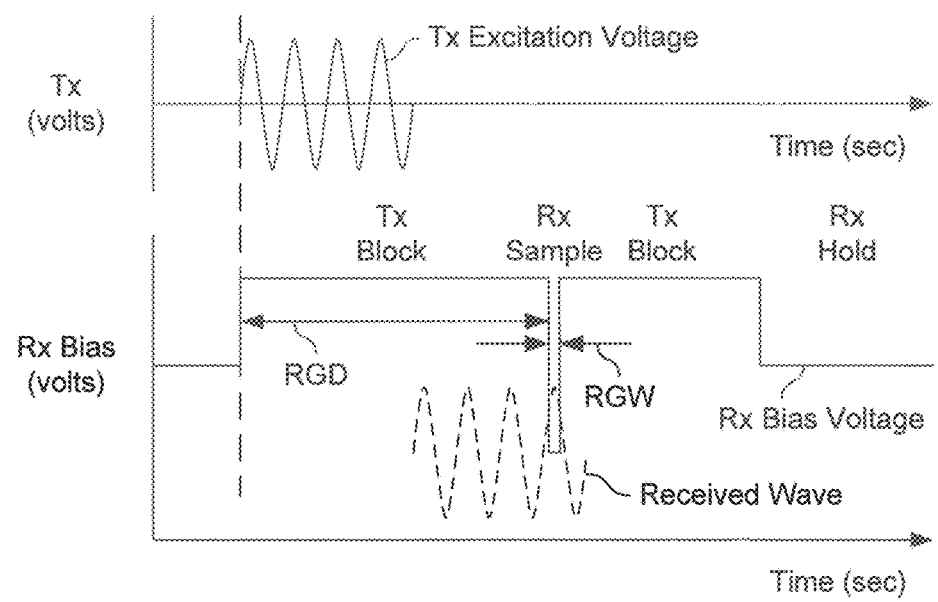

FIG. 8D graphically illustrates a single cycle of a transmitter excitation signal (upper graph) that may be provided to an ultrasonic transmitter and various bias levels (lower graph) that may be applied to a receiver bias electrode 39 of an ultrasonic sensor array 102 to detect a reflected wave, with the sampling window being much shorter than the period of one cycle of the transmitter excitation signal. In this example, only one transmitter excitation cycle is used and the range-gate window is much less than the period of the transmitter excitation cycle. In a similar manner, FIG. 8E graphically illustrates multiple cycles of a transmitter excitation signal (upper graph) provided to an ultrasonic transmitter and various bias levels (lower graph) applied to a receiver bias electrode 39 of an ultrasonic sensor array 102 to detect a reflected wave, with the sampling window being much shorter than the period of one cycle of the transmitter excitation signal.

Figure 8F:
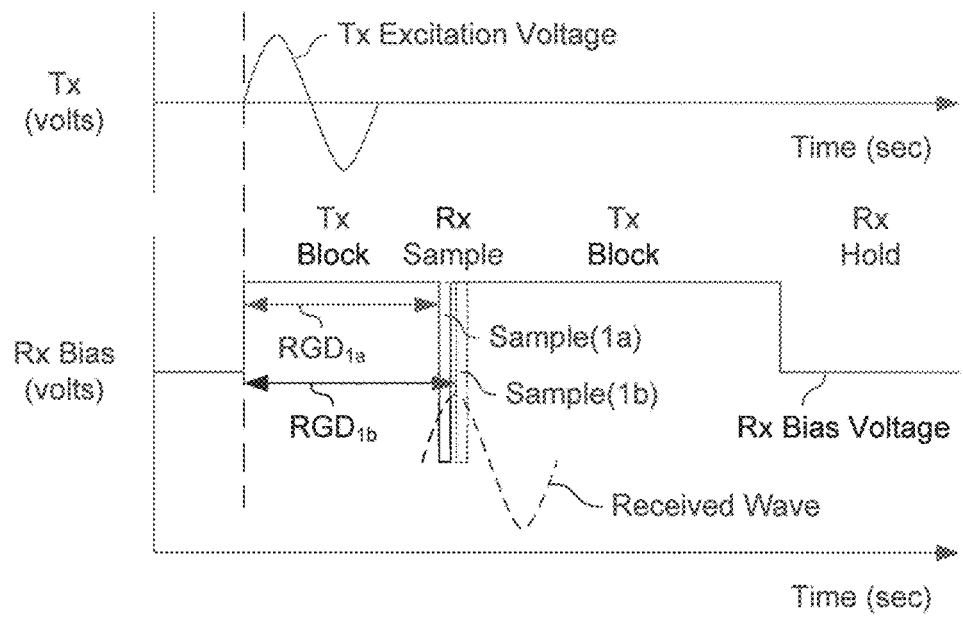

FIG. 8F graphically illustrates a cycle of a transmitter excitation signal (upper graph) that may be provided to an ultrasonic transmitter and various bias levels (lower graph) that may be applied to a receiver bias electrode of an ultrasonic sensor array to detect a reflected wave, with the sampling window being much shorter than the period of one cycle of the transmitter excitation signal and varying with time from the launch of the ultrasonic wave (two samples shown). The range-gate delay of the first sample ($RGD_{1a}$) is shorter than the range-gate delay of the second sample ($RGD_{1b}$), illustrating the acquisition of multiple sets of pixel output signals at various points along the reflected ultrasonic wave. Within each sampling window, rectification of the ultrasonic signal generally captures only the peak signal within the sampling window, which does not necessarily correspond to the peak signal of the reflected wave.

Figure 8G:
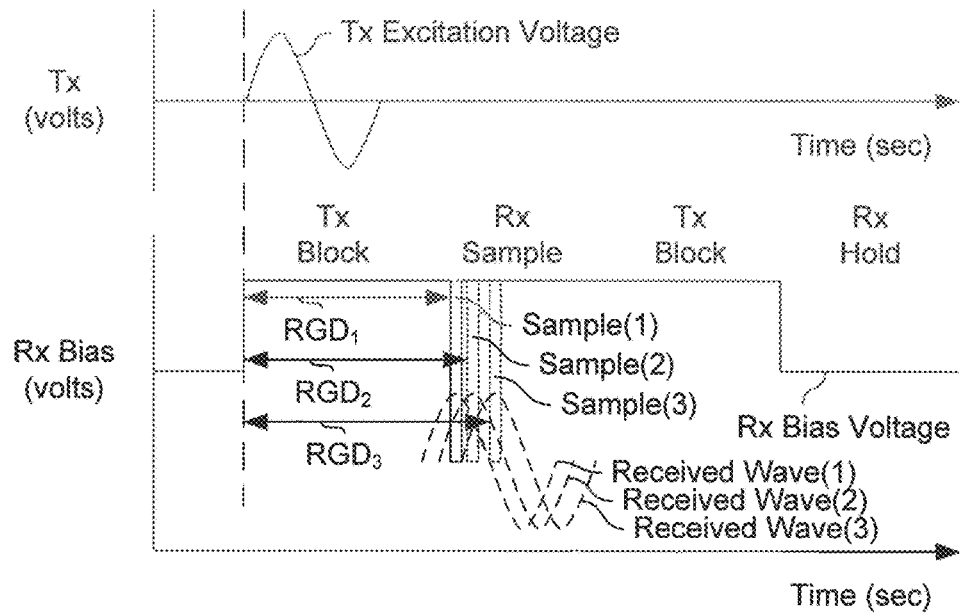

FIG. 8G graphically illustrates a cycle of a transmitter excitation signal (upper graph) that may be provided to an ultrasonic transmitter and various bias levels (lower graph) that may be applied to a receiver bias electrode of an ultrasonic sensor array to detect a reflected wave, with the sampling window being much shorter than the period of one cycle of the transmitter excitation signal and varying with time from the launch of the ultrasonic wave to detect the reception of the reflected wave from selected pixels and from sets of neighboring pixels (three samples shown). In this example, three samples of the reflected ultrasonic wave are acquired by using three different range-gate delays ($RGD_1$, $RGD_2$ and $RGD_3$).

FIGS. 8H-8L graphically illustrate various cycles of transmitter excitation signals (middle graphs) that are synchronized with an output (upper graphs) of a local oscillator and provided to an ultrasonic transmitter, and various bias levels (lower graphs) applied to a receiver bias electrode of an ultrasonic sensor array to detect a reflected wave, with various durations of sampling windows, various acquisition time delays from the launch of the ultrasonic wave, and various mixing of the local oscillator signal and the bias levels to allow the acquisition of various sets of pixel output signals.

Figure 8H:
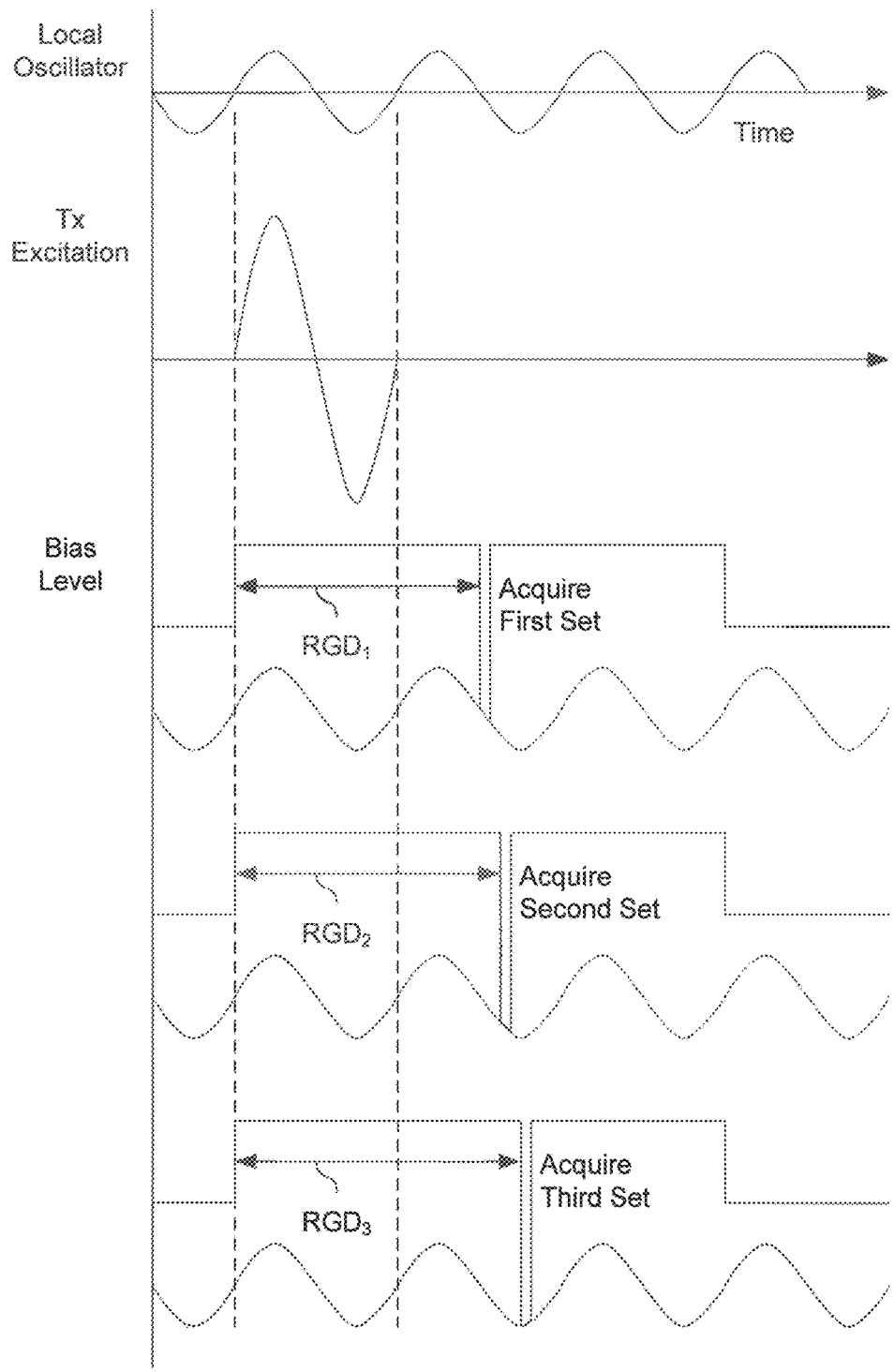
FIGS. 8H-8L graphically illustrate various cycles of transmitter excitation signals that are synchronized with an output of a local oscillator (upper graphs) and provided to an ultrasonic transmitter (middle graphs), and various bias levels applied to a receiver bias electrode of an ultrasonic sensor array to detect a reflected wave (lower graphs), with various durations of sampling windows, various acquisition time delays from the launch of the ultrasonic wave, and various mixing of the local oscillator signal and the bias levels to allow the acquisition of various sets of pixel output signals.

FIG. 8H graphically illustrates a cycle of a transmitter excitation signal (middle graph) that is synchronized with an output (upper graph) of a local oscillator and provided to an ultrasonic transmitter and various bias levels (lower graphs) applied to a receiver bias electrode of an ultrasonic sensor array to detect a reflected wave, with the sampling window being much shorter than the period of one cycle of the transmitter excitation signal and varying with time from the launch of the ultrasonic wave to acquire multiple sets of pixel output signals (three samples shown) while mixing the local oscillator signal with the bias level during the sampling. The mixed signal may be superimposed on the receiver bias electrode voltage or, in some implementations, applied to the receiver bias electrode 39 only during the sampling window. The amplitude of the local oscillator signal when mixed with the receiver bias signal may be much smaller than the transmitter excitation signal yet the two may be synchronized in time. As illustrated, multiple sets of pixel output signals may be acquired with varying range-gate delays ($RGD_1$, $RGD_2$, $RGD_3$, etc.) while sampling the reflected ultrasonic wave as mixed with a controlled amplitude and phase of the local oscillator signal.

Figure 8I:
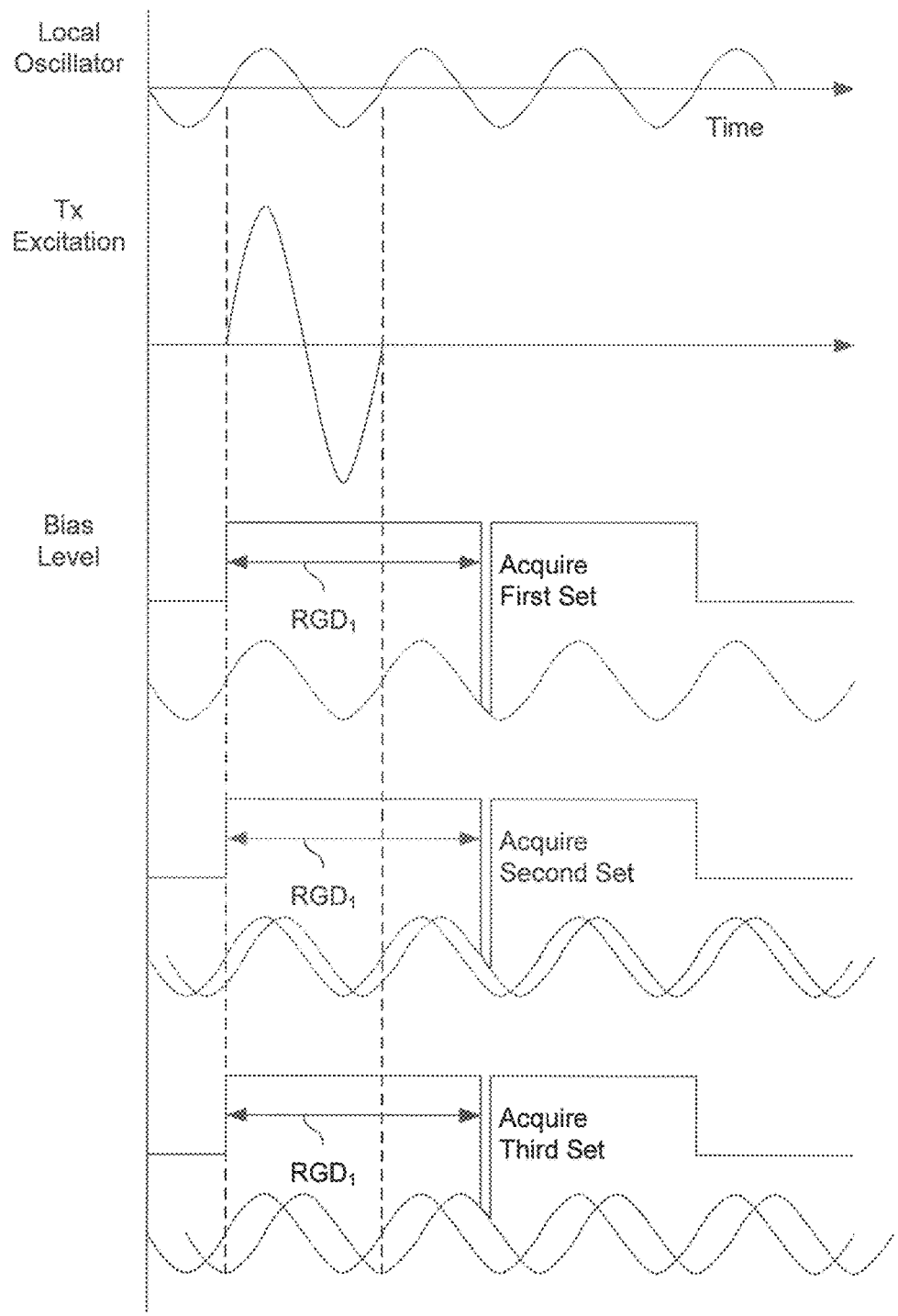

FIG. 8I graphically illustrates a cycle (middle graph) of a transmitter excitation signal that is synchronized with an output (upper graph) of a local oscillator and provided to an ultrasonic transmitter, and various bias levels (lower graphs) applied to a receiver bias electrode 39 of an ultrasonic sensor array to detect a reflected wave, with the sampling window being much shorter than the period of one cycle of the transmitter excitation signal and not varying with time from the launch of the ultrasonic wave to acquire multiple sets of pixel output signals (three sets shown) while mixing the local oscillator signal with the bias level during the sampling so that the mixed local oscillator signal has substantially the same amplitude but a different phase (delay) between the acquired sets of pixel output signals. In this example, the same range-gate delay ($RGD_1$) is applied for the acquisition of each sample, whereas the mixed local oscillator signal has the same amplitude but different phases for each sample.

Figure 8J:
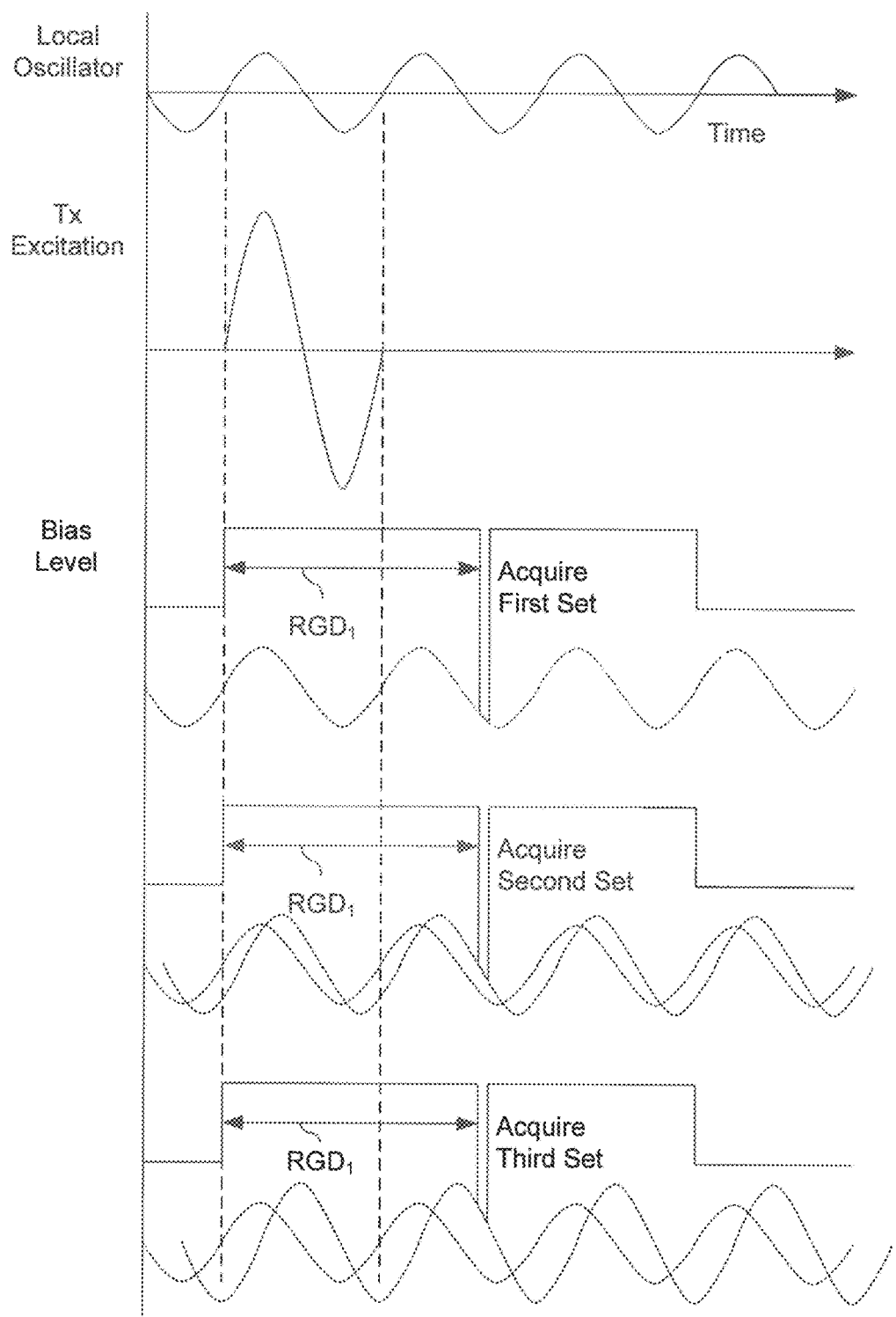

FIG. 8J graphically illustrates a cycle (middle graph) of a transmitter excitation signal that is synchronized with an output (upper graph) of a local oscillator and provided to an ultrasonic transmitter), and various bias levels (lower graphs) applied to a receiver bias electrode 39 of an ultrasonic sensor array 102 to detect a reflected wave, with the sampling window being much shorter than the period of one cycle of the transmitter excitation signal and not varying with time from the launch of the ultrasonic wave to acquire multiple sets of pixel output signals (three sets shown) while mixing the local oscillator signal with the bias level during the sampling so that the mixed local oscillator signal has a different amplitude and a different phase between the acquired sets of pixel output signals. In this example, the range-gate delay ($RGD_1$) is the same for each sample, whereas the mixed local oscillator signal has different amplitudes and different phases for each sample.

Figure 8K:
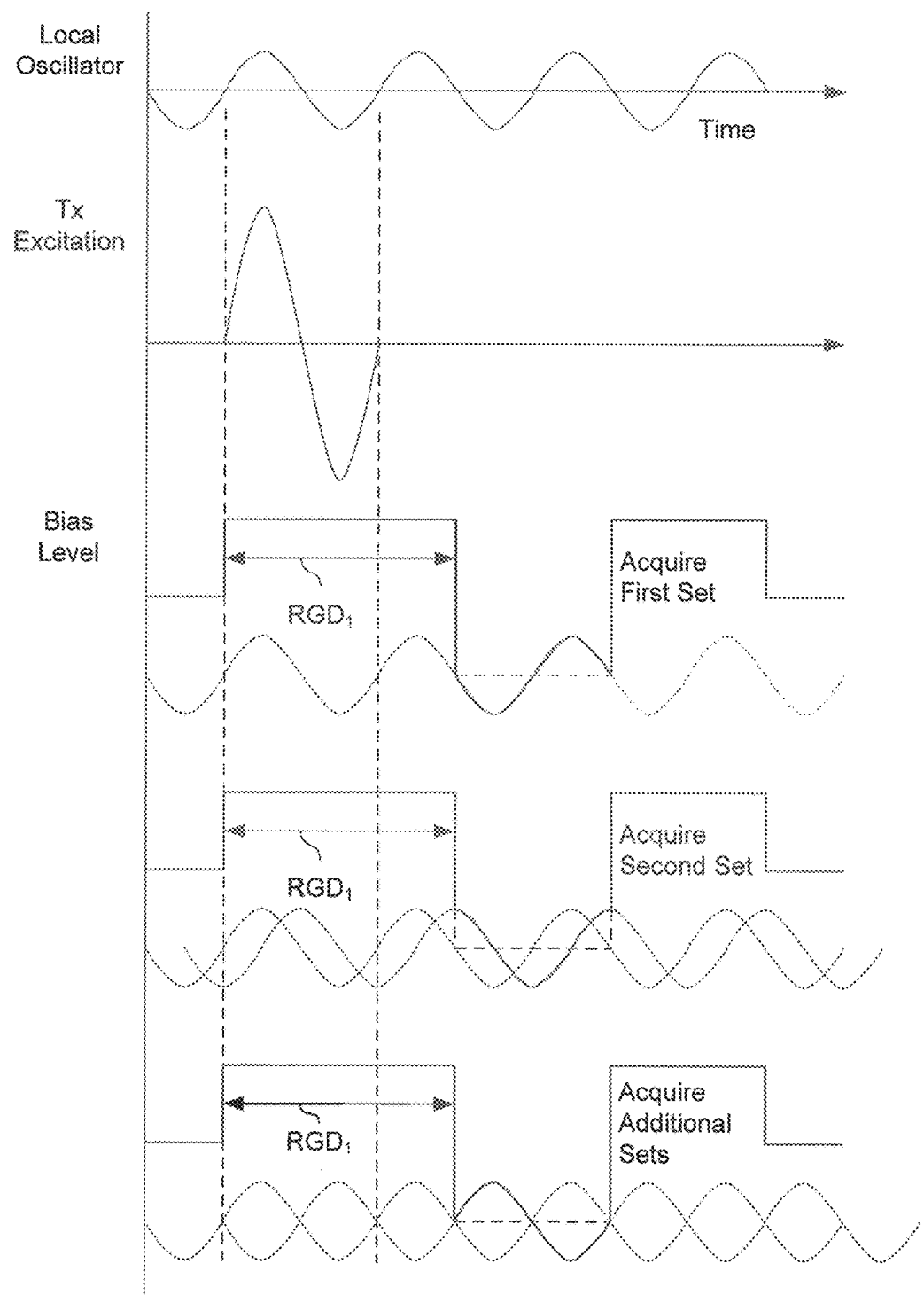

FIG. 8K graphically illustrates a cycle (middle graph) of a transmitter excitation signal that is synchronized with an output (upper graph) of a local oscillator and provided to an ultrasonic transmitter, and various bias levels (lower graphs) applied to a receiver bias electrode 39 of an ultrasonic sensor array 102 to detect a reflected wave, with the sampling window having substantially the same width as the period of one cycle of the transmitter excitation signal and not varying with time from the launch of the ultrasonic wave to acquire multiple sets of pixel output signals (three sets shown) while mixing the local oscillator signal with the bias level during the sampling so that the mixed local oscillator signal has substantially the same amplitude but a different phase between the acquired sets of pixel output signals. In this example, the range-gate delay ($RGD_1$) is the same for each sample, whereas the mixed local oscillator signal has substantially the same amplitude yet different phases for each sample (0, 90 and 180 degrees shown).

Figure 8L:
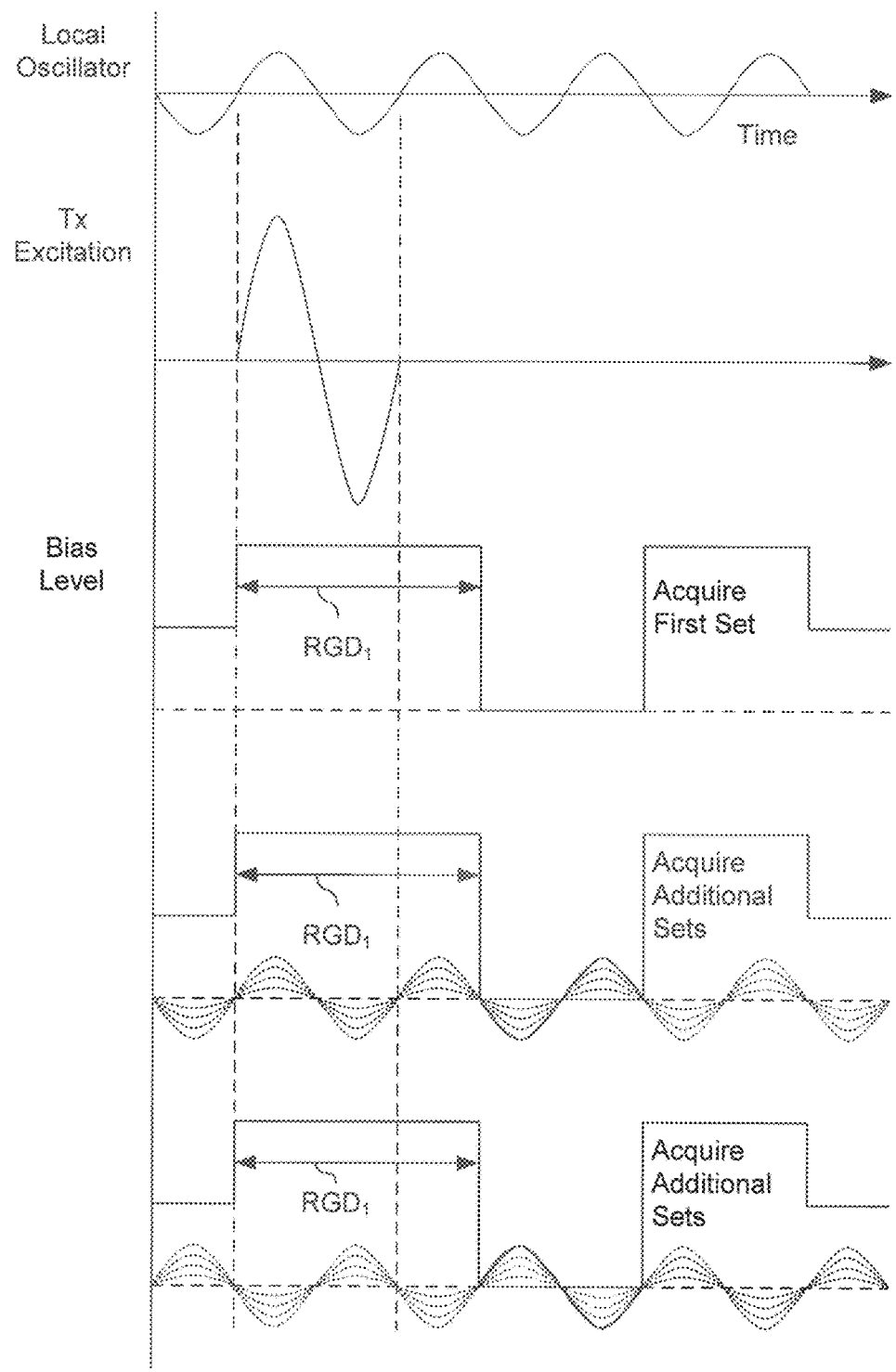

FIG. 8L graphically illustrates a cycle (middle graph) of a transmitter excitation signal that is synchronized with an output (upper graph) of a local oscillator and provided to an ultrasonic transmitter, and various bias levels (lower graphs) applied to a receiver bias electrode of an ultrasonic sensor array to detect a reflected wave, with the sampling window having substantially the same width as the period of one cycle of the transmitter excitation signal and not varying with time from the launch of the ultrasonic wave to acquire multiple sets of pixel output signals (three sets shown) while mixing the local oscillator signal with the bias level during the sampling so that the mixed local oscillator signal has different amplitudes but substantially the same phase between the acquired sets of pixel output signals. In this example, the range-gate delay ($RGD_1$) is the same for each sample, whereas the mixed local oscillator signal has different amplitudes yet the same phase for each sample.

Figure 8M:
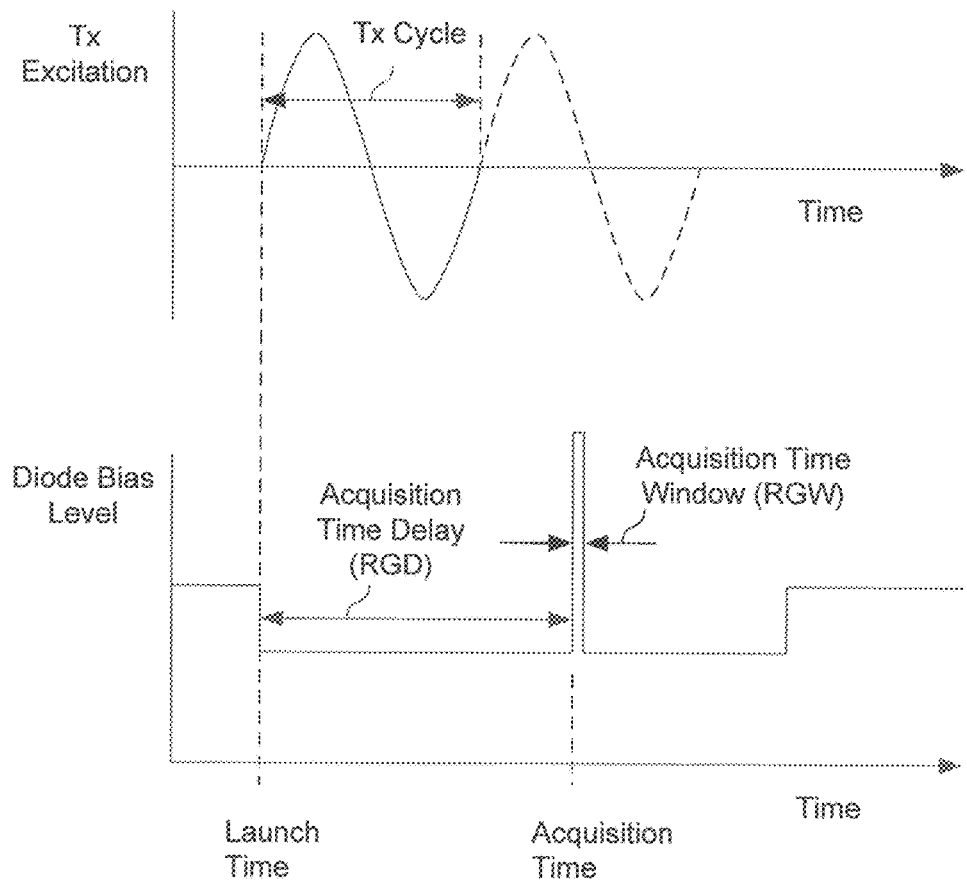
FIG. 8M graphically illustrates various cycles of transmitter excitation signals provided to an ultrasonic transmitter (upper graph) and various bias levels applied to a diode bias electrode of an ultrasonic sensor array (lower graph).

FIG. 8M graphically illustrates various cycles (upper graph) of transmitter excitation signals provided to an ultrasonic transmitter and various bias levels (lower graph) applied to a diode bias electrode of an ultrasonic sensor array. One or more cycles of an ultrasonic transmitter excitation signal at a predetermined frequency and scan rate may be applied to the transmitter (Tx), as shown in the top portion of the figure and as described above with respect to FIG. 8A. During the transmission of the outgoing ultrasonic wave, a control signal may be applied to the diode bias electrode 510 of the ultrasonic sensor array 102 corresponding to a block mode where the bias level is set to a block value. The reflected ultrasonic signals may be captured during a sample mode, when the bias level of the control signal applied to the diode bias electrode 510 is set to a sample value. To prevent detection of unwanted internal reflections, the bias level applied to the diode bias electrode 510 may be brought back to a block value for a short period of time. During a hold mode where the bias level applied to the diode bias electrode 510 is brought to a hold value, the signals stored in each sensor pixel of the ultrasonic sensor array 102 may be clocked out. Referring again to FIG. 8M, a first transmitter excitation signal may be applied to the ultrasonic transmitter 20 and the bias level of the sensor array 102 set to a block value at a launch time. After an acquisition time delay, also referred to as a range-gate delay (RGD), the bias level may be brought to a sample value and held there for a duration corresponding to an acquisition time window, also referred to as a range-gate window (RGW). Note that the acquisition time delay may correspond to a time interval longer than or equal to the period of a transmitter excitation cycle or shorter than a transmitter excitation cycle. After a time interval corresponding to the acquisition time window, the bias level applied to the diode bias electrode 510 may be brought back to the block value. After another time interval, the bias level may be brought to a hold value to allow clocking out of the pixel output signals. Operation of the diode bias voltages and timing applied to the diode bias electrode 510 to acquire pixel output signals may be quite similar to the voltages and timing applied to the receiver bias electrode 39, as described above with respect to FIG. 8A and elsewhere although the polarities and magnitude of the voltages may be different between them. In some implementations, the ultrasonic sensor array 102 may be operated in either or both modes for ultrasonic imaging, as desired.

Figure 9:
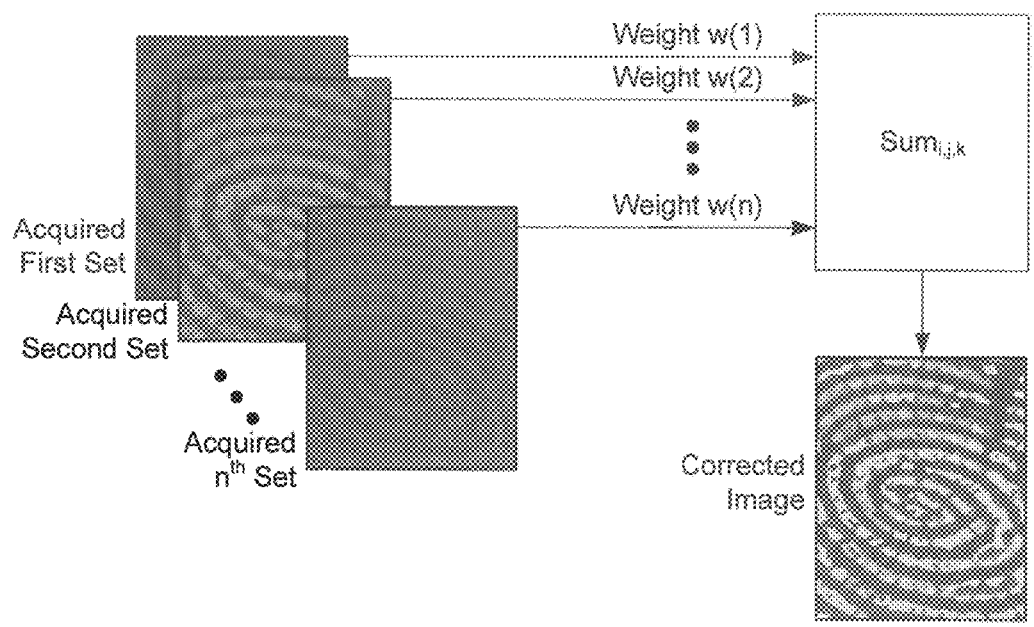
FIG. 9 illustrates the generation of an image of a target object positioned on a platen surface based on corrected output signals for a plurality of pixels in an ultrasonic sensor array.

FIG. 9 illustrates the generation of an image of a target object 70 positioned on a platen surface 40 based on corrected output signals for a plurality of pixels in an ultrasonic sensor array 102. Each of two or more sets of pixel output signals may be combined with pixel-wise arithmetic weighting of the ultrasonic image information. The corrected output signal for each pixel may be generated by weighting the subsequently acquired sets of pixel output signals with the initially acquired pixel output signal, and combining the results for each pixel together and optionally normalized to form a combined representation or image information set. Using pixel-wise weighting of the pixel output signals for each selected pixel with weighted combinations of pixel output signals from neighboring pixels, the local magnitudes of the reflected ultrasonic wave from various sets of pixel output signals at different range-gate delays, range-gate windows, and excitation frequencies may be multiplied by their respective phase-corrected and amplitude-corrected weights, added together, and optionally normalized to generate an image information set representing an image of a target object 70 positioned on the platen surface based on corrected output signals for a plurality of selected pixels.

In some implementations, the generation of an image of a target object 70 positioned on a platen surface 40 may be based on corrected output signals for a plurality of selected pixels in an ultrasonic sensor array 102. The plurality of pixels may include each pixel in the ultrasonic sensor array 102, or a subset thereof. For example, an image may be generated from the corrected output values at each and every pixel in the active area of the sensor array, or in a smaller block of pixels within the array such as a region where a friction ridge of a finger is identified to avoid extensive calculations in regions where no finger is placed and to reduce latency.

Corrected output signals for one or more selected pixels in the sensor pixel array may be generated by applying a series of operations to one or more sets of pixel output signals. The various sets of pixel output signals (such as the first set of pixel output signals, the second set of pixel output signals, and/or the third set of pixel output signals) may be obtained, for example, with different range-gate delays, range-gate windows, and excitation frequencies. In some implementations, corrected output signals for one or more selected pixels in the sensor pixel array may be generated by first acquiring ultrasonic sensor data with a high sampling clock frequency such as 64 MHz or 128 MHz that allows fine gradations in the width of the range-gate window (e.g., 7.8 ns increments for a 128-MHz clock frequency). The range-gate delay may be determined by the distance between the ultrasonic transmitter and the sensor pixels, which may be based in part on the thickness of the overlying platen and the speed of sound in the platen. Range-gate delays may be on the order of 0.65 to 1.0 microseconds for an approximately 400-um thick glass platen. In various implementations of platens that are thicker or thinner, or made of different materials, typical range-gate delays may vary between about 0.2 microseconds and about 2.0 microseconds. A set of pixel output signals may be acquired at a first acquisition time that is equivalent to the range-gate delay. The sampling window may be an integral number of sampling clock periods long, such as 7 clock cycles for an acquisition time window of approximately 54 microseconds. Other sampling window sizes may be used with a duration that may be shorter than the period of the transmitted/reflected ultrasonic wave or with a duration that is at least as long as one period of the transmitted/reflected ultrasonic wave. The pixel output signals may be averaged and the average value subtracted from each pixel output signal to cancel out any non-zero bias values and to obtain a modified set of pixel output signals with zero mean. A baseline set of pixel output signals (with no target object) may be acquired and subtracted from the modified set of pixel output signals and the resulting set may be normalized to subtract out any systematic background signals, to whiten the set of values, and to increase the dynamic range. The modified set of pixel output signals may be band-pass filtered to remove any mechanical or electrical noise, such as by multiplying the modified set by a value of $e^{(-i*2*pi*f_c*t_{rgd})}$ where $f_c$ is the center frequency of the transmitted ultrasonic signal and $t_{rgd}$ represents the acquisition time delay for the set of pixel output signals. Additional sets of acquired pixel output signals may be acquired with differing acquisition time delays $t_{rgd}$, modified as described above and filtered with the corresponding value of $t_{rgd}$. Acquisition time delays for additional sets of output signals may vary from the initial acquisition time delay by an integer increment of the sampling clock period (plus or minus). In other examples, the acquisition time delay may vary by some fraction of pi, such as pi/2, pi/4, pi/10 or pi/20 times the period of the center transmit frequency $f_c$. In other examples, the acquisition time delay may vary by an increment based on a characteristic dimension or width of a typical target object placed on the platen surface, such as the average ridge-to-ridge dimension of an average human finger or the characteristic ridge-to-ridge dimension of an enrollee. In other examples, the acquisition time delay may account for the mean distance between the selected pixel and the first set and additional sets of neighboring pixels near the selected pixel, such as by determining the difference in acoustic path length from the selected pixel to the platen surface and back compared to the acoustic path length from the selected pixel to the sets of neighboring pixels, then dividing by the speed of sound in the platen and taking an appropriate fraction of the result. In other examples, the acquisition time delays may differ to account for a difference in phase between the reflected ultrasonic waves arriving at the selected pixel and the sets of neighboring pixels, such as by dividing the difference in acoustic path length by the wavelength of the transmitted ultrasonic wave and multiplying the result by 2*pi. In some implementations, the center frequency of the launched ultrasonic waves may be based on a characteristic width of the target object.

In the next operation, the time-domain values may be transformed into frequency-domain values, then into wave-number domain values, and then into spatial-domain values. For example, the spatial-domain values may be obtained by scaling the time-domain values by the group velocity of the ultrasonic wave at each transmitter frequency for linear systems. In situations with narrow band excitation and minimal dispersion (e.g., little change in the speed of sound through the platen materials over the frequencies of interest), the time-domain values may be transformed into the frequency domain using, for example, a discrete Fourier transform (DFT). The frequency-domain values may be transformed into the wave number domain, and then transformed into the spatial domain using an inverse discrete Fourier transform. Other transformations and their respective inverses may be used, such as a Fast Fourier Transform (FFT), a discrete cosine transform (DCT), a Laplace transform (LT), or other suitable transform. For nonlinear systems where the behavior of sound at ultrasonic frequencies is dependent on the transmission frequency and the medium is dispersive or in the presence of harmonics, both the group velocity and the phase velocity along with nonlinear dependencies may be used to transform the time-domain values into the spatial-domain values.

The corrected output signal for a selected pixel may be a weighted sum of the output signal from the selected pixel and correction signals from sets of neighboring pixels, such as a first set of neighboring pixels, a second set of neighboring pixels, and additional sets of neighboring pixels near the selected pixel. The first-level correction signals and other levels of correction signals may be weighted differently than the output signal from the selected pixel. For example, the spatial-domain values described above for each acquired set of pixel output signals may be summed with a weighting that is dependent on the geometrical distance or the acoustic distance from the selected pixel to the neighboring pixels, such as a Gaussian weighting method. In some implementations, the weighting may be limited to a small array of sensor pixels near each selected pixel, such as a 5×5 square array or an 11×11 array centered about the selected pixel, to name a few examples. The sum may comprise transformed values from the selected pixel from a first acquired set and values from nearby pixels for subsequently acquired sets, as shown in FIG. 9. In some implementations, the weighting coefficients may be deconvolved and obtained empirically, for example, by the measurement and deconvolution of pixel output signals for various firings of the ultrasonic transmitter with a sharp pin or tip of a stylus pressed against the platen surface. In other implementations, the weighting coefficients may be determined based on a simulation of pixel output signals for various firings of the ultrasonic transmitter with a simulated point source at the platen surface. Various firings, as used herein, is understood to refer to multiple launches and acquires of an ultrasonic plane wave from a plane wave generator toward a platen surface where output signals acquired at each launch and acquire may have a different acquisition time delay or range gate delay.

In some implementations, receive-side beamforming may be obtained for each pixel in a fingerprint image by applying a phase shift and an amplitude correction from multiple neighboring sensor pixels. In general, the information for generating corrected output signals may be obtained from neighboring pixels in an n×m area including each selected pixel. While implementations described so far have assumed n and m to be equal, in some implementations, it may be useful to generate corrected output signals based on an n×m area surrounding each selected pixel, where n and m are different. For example, at or near an edge of an ultrasonic sensor, it can be useful in some implementations to use information from more neighboring pixels in one dimension along the sensor array than in another dimension. In one such implementation, a rectangular n×m area surrounding a selected pixel at or near an edge of the ultrasonic sensor could include a greater number of pixels in a dimension perpendicular to the edge compared to a number of pixels in a dimension parallel to the edge. After various firings of the ultrasonic transmitter and acquiring sets of pixel output signals, the corrected output signal for a given selected pixel (sp) may be obtained by summing the values for each set of pixel output signals for the pixels in the n×m area after multiplying each value by an appropriate weighting coefficient, according to the equation below.

$$P'_{sp} = D_{sp} e^{i(\varphi+\theta_{sp})} P_{sp} + \Sigma_{first\ set\ of\ neighbors} D_j e^{i(\varphi+\theta_j)} P_j + \ldots$$

As expressed above, in some implementations, generating the corrected output signal for the selected pixel ($P'_{sp}$) includes computing a weighted summation of the output signal of the selected pixel ($P_{sp}$) and the first-level correction signals from the first set of neighboring pixels ($P_j$). The ellipsis above expresses the possibility of including second-level correction signals and even higher-level correction signals in the summation using weights similar to those shown in the equation above. The equation above is expressed in a form of a first term based on the output signal of the selected pixel plus a second term based on a summation of first-level correction signals (with the possibility of a third term based on a second set of neighbors, fourth term based on a third set of neighbors, etc.).

The first term includes the product of the acquired amplitude at the selected pixel measured at a first launch and acquire of the ultrasonic plane wave and a pixel-dependent weight, $D_{sp}e^{i(\varphi+\theta_{sp})}$. In the pixel-dependent weight, $D_{sp}$ represents a calibration factor for the selected pixel to account for pixel-to-pixel variations, $\varphi$ represents a phase of the reflected ultrasonic wave at the selected pixel, and $\theta_{sp}$ represents a geometrical phase factor for the selected pixel. The calibration factor, in some implementations, is determined in one or more calibration steps performed after fabrication of the ultrasonic sensor and can account for manufacturing based variations from pixel to pixel. The phase of the reflected ultrasonic wave at the selected pixel can be, in some implementations, determined once based on empirical measurement and deconvolution or based on simulation. The geometric phase factor is related to the acoustic path from the selected pixel, to the platen and back to the selected pixel. In the case of simulation, $\varphi$ and $\theta_{sp}$ can be independently computed, however when determined based on empirical measurement and deconvolution, the computed term is generally related to the sum $\varphi+\theta_{sp}$, although analytic computations or approximations of one or the other, or both, of $\varphi$ and $\theta_{sp}$ are also possible.

The second term includes the product of the acquired amplitude at each of the first set of neighbors, $P_j$, measured at a second launch and acquire of the ultrasonic plane wave with a pixel-dependent weight, $D_j e^{i(\varphi+\theta_j)}$. In the second, summation term, j represents an index for identifying each of a first set of neighbors. In the pixel-dependent weight, $D_j$ represents the pixel-dependent calibration factor for each of the first set of neighbors, $\varphi$ represents a phase of the reflected ultrasonic wave at the selected pixel, and $\theta_j$ represents a geometrical phase factor for each of the first set of neighbors. In implementations where the acoustic path length between the selected pixel and the first set of neighbors is equal, the geometrical phase factor will be the same for each of the first set of neighbors. The geometrical phase factor can be based upon the acoustic path from the selected pixel to the neighboring pixel times $2*pi*f_c$ divided by the speed of sound in the platen. For platens with multiple layers, in some implementations, to a given degree of accuracy, the geometric phase factor can be based upon the thickness of each platen layer k, $\tau_k$, and the speed of sound in each platen layer, $C_k$. From these parameters, an effective time of flight, $TOF_{eff}$, can be computed by a summation of terms, each term including the thickness of each platen layer divided by the speed of sound in the each platen layer, for example, $$TOF_{eff} = \sum_{k=1}^{m} \frac{\tau_k}{C_k},$$

where m is the total number of layers in the platen. From the effective time of flight, an effective speed of sound in the platen, $C_{eff}$, can be computed by taking the total thickness of the platen, $\tau_{total}$, divided by the $TOF_{eff}$, $$C_{eff} = \frac{\tau_{total}}{TOF_{eff}},$$

The effective speed of sound in the platen can be used to compute an effective wavelength in the platen, $\lambda_{eff}$, by dividing the effective speed of sound in the platen, $C_{eff}$, by the frequency of the launched ultrasonic wave, $f_c$, $$\lambda_{eff} = \frac{C_{eff}}{f_c}.$$

The geometric phase factor for a given pixel j, $\theta_j$, among, for example, the first, second, third, etc., sets of neighbors, in one expression of the term in some implementations, can be based upon the acoustic path from the selected pixel to the given pixel j divided by $\lambda_{eff}$, for example $$\theta_j \sim 2\pi\left(\frac{r_j - \tau_{total}}{\lambda_{eff}}\right),$$

where $r_j$ can be computed from the distance or pitch between the selected pixel and the given pixel, $x_j$, by $r_j = \sqrt{\tau_{total}^2 + x_j^2}$. It is noted that for j=0, the expression for $\theta_j$ above will reduce to $\theta_{sp}$ with $x_0$ being equal to 0. It is further noted that $r_j$ for j=1, 2, 3, 4, ..., n is illustrated with reference to FIG. 6F. It is understood that in other implementations, and to greater or lesser degrees of accuracy, the geometric phase factor can be computed or expressed in other forms or ways, for example, as noted above, using empirical and/or simulation methods or in other analytical expressions.

The corrected output signals may be used to generate an image of the target object or otherwise processed to match fingerprints, for example, with or without generating an actual image. An image of the target object may be generated, for example, by displaying the corrected pixel output signals from a plurality of selected pixels on a screen.

FIGS. 10A-10C show acquired ultrasonic images of a stylus tip positioned on a platen surface without correction (FIG. 10A), with filtering (e.g., local averaging and smoothing of pixel output data) (FIG. 10B) and with receive-side beamforming (FIG. 10C). A raw image from an ultrasonic sensor array with an attached platen and a stylus tip in contact with the platen surface is shown in FIG. 10A. Filtering on a pixel-by-pixel basis provides the result shown in FIG. 10B. Use of beam-forming coefficients applied to sets of pixel output signals from neighboring pixels with different acquisition time delays and short acquisition time windows reveals the stylus tip in the beam-formed image of FIG. 10C.

Figure 11A:
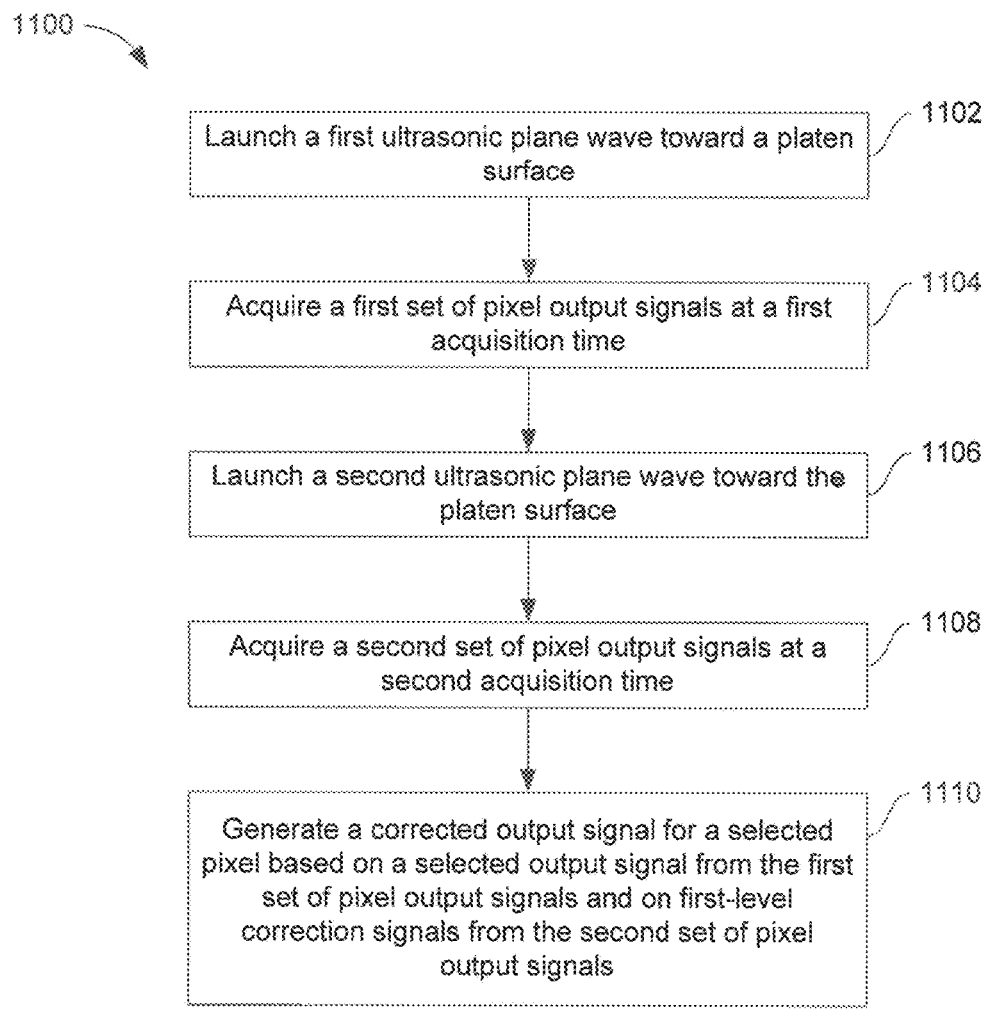
FIGS. 11A-11C are flow charts illustrating methods of generating an ultrasonic image of a target object based on output signals from selected pixels and correction signals from neighboring pixels.
Figure 11B:
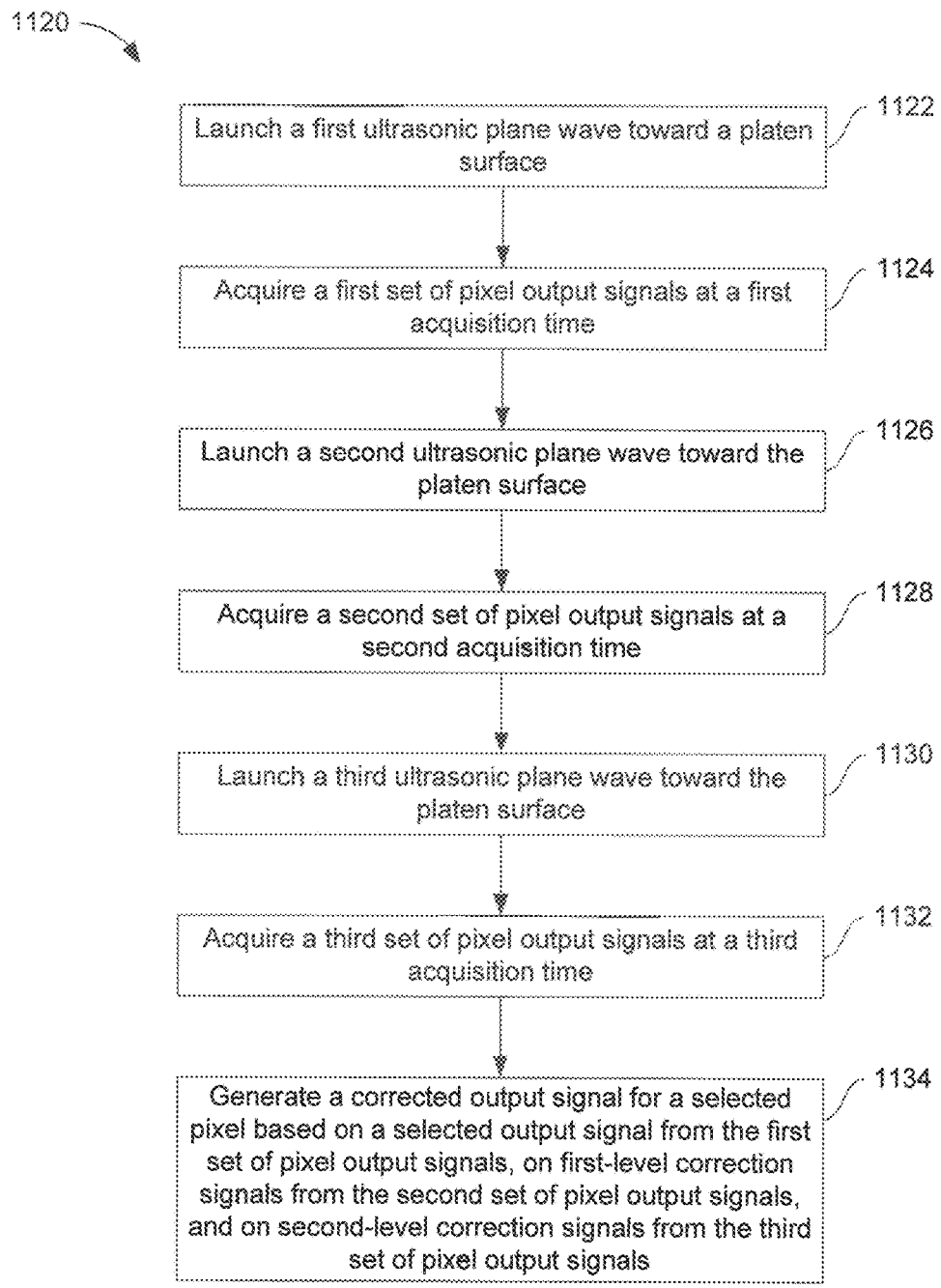
Figure 11C:
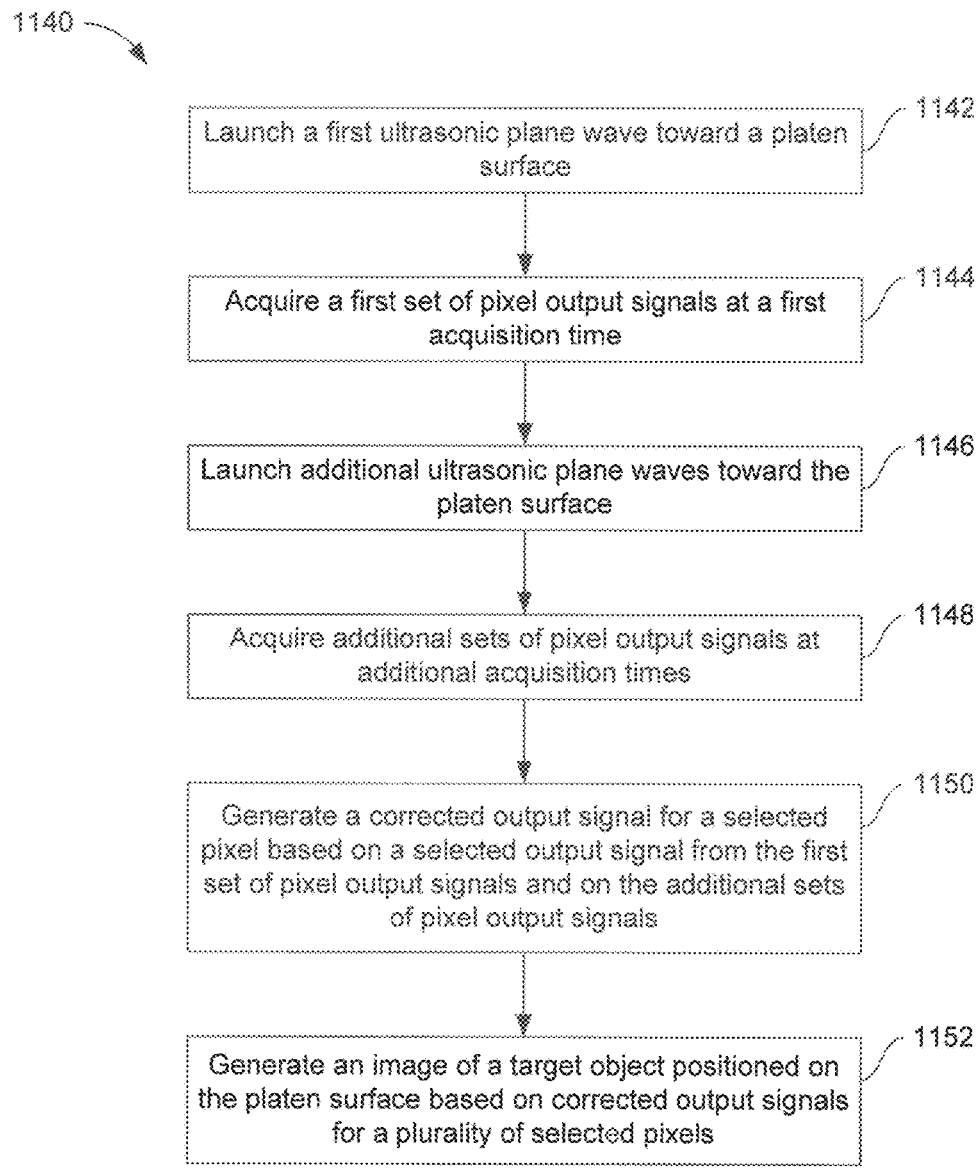

FIGS. 11A-11C are flow charts illustrating methods of generating an ultrasonic image of a target object based on output signals from selected pixels and correction signals from neighboring pixels. According to the method depicted in FIG. 11A, a first ultrasonic plane wave may be launched 1102 toward a platen surface, and a first set of pixel output signals may be acquired 1104 at a first acquisition time. A second ultrasonic plane wave may be launched 1106 toward the platen surface, and a second set of pixel output signals may be acquired 1108 at a second acquisition time. A corrected output signal may be generated 1110 for a selected pixel, and that corrected output signal may be generated from a selected output signal from the first set of pixel output signals, as well as on first-level correction signals from the second set of pixel output signals. An image may be generated of a target object positioned on the platen surface by using the corrected output signals from a plurality of the pixels.

According to the method depicted in FIG. 11B, a first ultrasonic plane wave may be launched 1122 toward a platen surface, and a first set of pixel output signals may be acquired 1124 at a first acquisition time. A second ultrasonic plane wave may be launched 1126 toward the platen surface, and a second set of pixel output signals may be acquired 1128 at a second acquisition time. A third ultrasonic plane wave may be launched 1130 toward the platen surface, and a third set of pixel output signals may be acquired 1132 at a third acquisition time. A corrected output signal may be generated 1134 for a selected pixel, and that corrected output signal may be generated from a selected output signal from the first set of pixel output signals, as well as on first-level correction signals from the second set of pixel output signals and on second-level correction signals from the third set of pixel output signals. An image may be generated of a target object positioned on the platen surface by using the corrected output signals from a plurality of pixels.

According to the method depicted in FIG. 11C, a first ultrasonic plane wave may be launched 1142 toward a platen surface, and a first set of pixel output signals may be acquired 1144 at a first acquisition time. Additional ultrasonic plane waves may be launched 1146 toward the platen surface, and additional sets of pixel output signals may be acquired 1148 at additional acquisition times. A corrected output signal may be generated 1150 for a selected pixel, and that corrected output signal may be generated from a selected output signal from the first set of pixel output signals as well as on additional sets of pixel output signals. An image may be generated 1152 of a target object positioned on the platen surface.

Figure 12A:
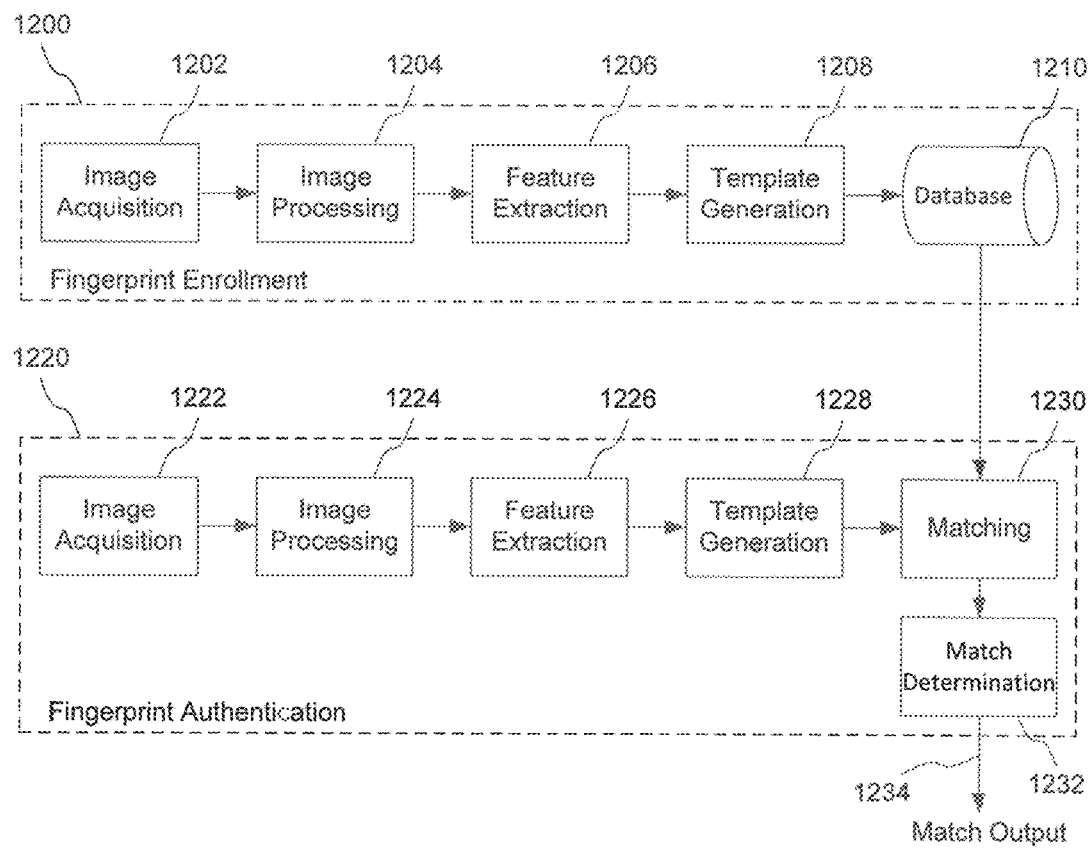
FIG. 12A illustrates generalized flows for using an ultrasonic sensor array for fingerprint enrollment and/or authentication of a user, according to aspects of the present disclosure.

FIG. 12A illustrates generalized flows for using an ultrasonic sensor array for fingerprint enrollment and/or authentication of a user according to aspects of the present disclosure. In this example, block 1200 describes the enrollment process and block 1220 describes the verification/authentication process. During enrollment 1200, an acquired image may be processed to generate a template (e.g. template information, template data, biometric reference data, or reference) that may be stored in a local or external database 1210. Note that a reference may include one or more templates, models, or raw images. In some implementations, the enrollment process may include image acquisition 1202, image processing 1204, feature extraction 1206, template generation 1208, and data storage in a database 1210. The verification/authentication process 1220 may include image acquisition 1222, image processing 1224, feature extraction 1226, template generation 1228, fingerprint matching 1230 using information stored in the database 1210, and match determination 1232 to determine and provide a match output signal 1234. In the identification/verification/authentication stage, each acquired image may be processed to generate a template and the generated templates may be used for matching. The fingerprint verification/authentication block 1220 may provide a match output signal 1234 indicating whether a match has occurred.

Figure 12B:
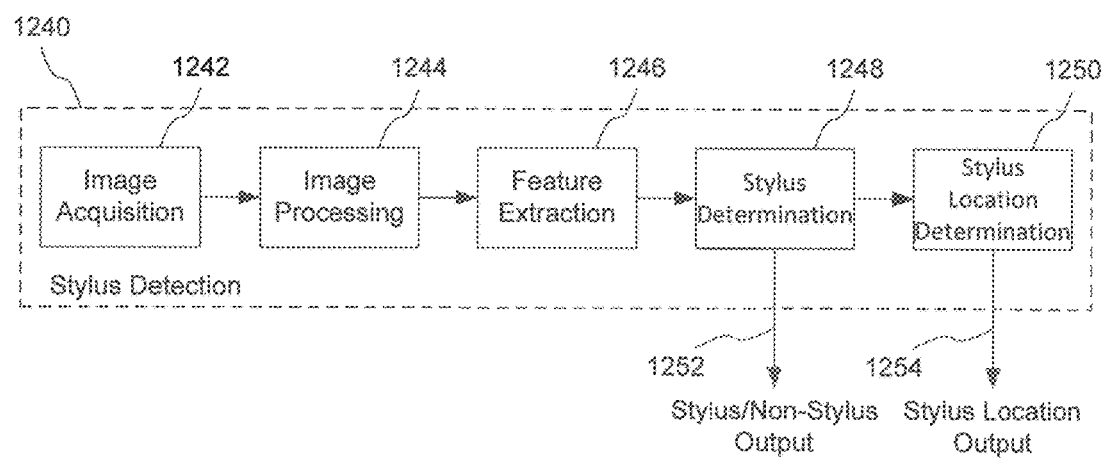
FIG. 12B illustrates generalized flows for using an ultrasonic sensor array for stylus detection and position determination, according to aspects of the present disclosure.

FIG. 12B illustrates generalized flows for using an ultrasonic sensor array for stylus detection and position determination, according to aspects of the present disclosure. In this example, block 1240 describes the stylus detection and position determination process. The stylus detection/determination process 1240 may include image acquisition 1242, image processing 1244, feature extraction 1246, stylus determination 1248, and stylus location determination 1250. A binary stylus/non-stylus output signal 1252 may be provided as an output from the stylus determination block 1248. A stylus location output 1254 such as x-y coordinates on a fingerprint-enabled touchscreen or a dedicated fingerprint sensor may be provided as an output from the stylus location determination block 1250.

Figure 13A:
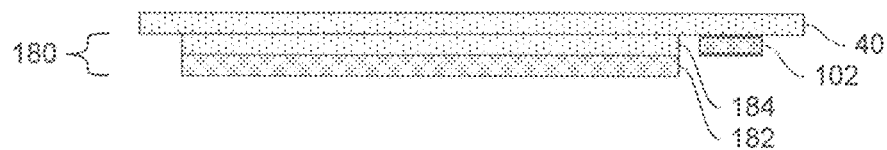
FIGS. 13A-13D illustrate various configurations of an ultrasonic sensor array with a display device.
Figure 13B:
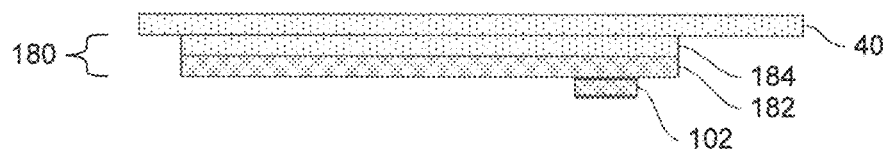
Figure 13C:
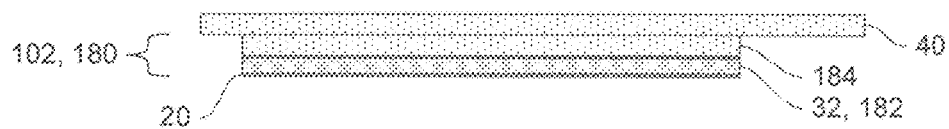
Figure 13D:
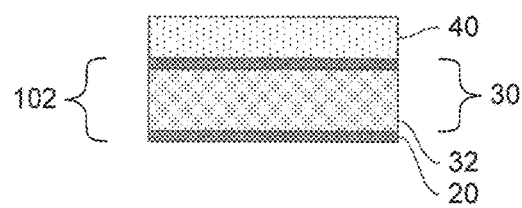

FIGS. 13A-D illustrate various configurations of an ultrasonic sensor array such as an ultrasonic fingerprint sensor with a display device. For example, an ultrasonic sensor array 102 may have separate or common TFT substrates for a display 180 and the ultrasonic sensor array 102. The ultrasonic sensor array 102 may serve as a fingerprint sensor and in some implementations serve as an ultrasonic touchscreen or touchpad. A common cover glass or touchscreen may be shared between elements of the ultrasonic sensor array 102 and the display, and serve as a platen 40 or coating layer 42 (see FIG. 6B) for the ultrasonic sensor array 102. In alternative configurations, the ultrasonic sensor array 102 with an optional coating layer 42 may be positioned on a bezel, on the side, or on the back of a mobile device enclosure. In some implementations, the ultrasonic sensor array 102 may be placed above or positioned as part of an ultrasonic button. The ultrasonic button may be mechanical or non-mechanical. For example, the ultrasonic button may be mechanically coupled to an electromechanical switch. The ultrasonic button may be authenticating or non-authenticating. In some implementations, the ultrasonic sensor array 102 may be peripheral to the active area of the display, which may include a display color filter glass 184 and a display TFT substrate 182. In the example shown in FIG. 13A, the ultrasonic sensor array 102 is positioned beneath a common cover layer that may serve as a platen 40 for the ultrasonic sensor array 102 and as a touchscreen or cover glass for the display 180. In another example, the ultrasonic sensor array 102 may be situated separately from the display, such as in a bezel region, a sidewall or a backside of a mobile device enclosure (not shown). In another example shown in FIG. 13B, the ultrasonic sensor array 102 may be situated beneath or behind elements of the display 180, such as display color filter glass 184 and display TFT substrate 182. In another example shown in FIG. 13C, portions or all of the ultrasonic sensor array 102 may be integrated within the display TFT substrate 182. The ultrasonic sensor array 102 may be integrated with the display TFT substrate, sharing common TFT substrates with the active area of the ultrasonic sensor array 102 covering some, none, or all of the active area of the display. In some implementations, the ultrasonic sensor array 102 may include part of or all of the active area of the display 180. FIG. 13D shows a cutaway view of an ultrasonic sensor array 102 having an ultrasonic transmitter 20 and an ultrasonic receiver 30 including a TFT substrate 32, with a cover layer serving as a platen 40 positioned above the ultrasonic sensor array 102.

Figure 14:
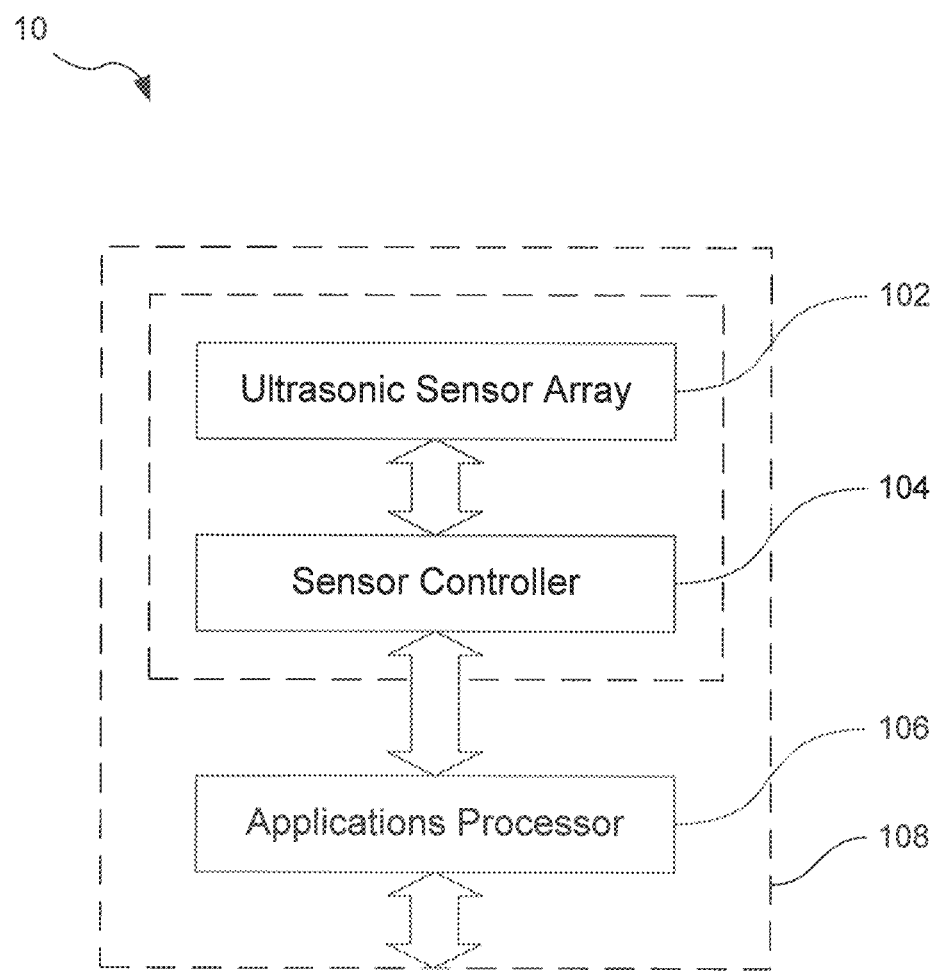
FIG. 14 illustrates a generalized block diagram of an ultrasonic sensor system.

FIG. 14 illustrates a generalized block diagram of an ultrasonic sensor system 10. Ultrasonic sensor system 10 may include an ultrasonic sensor array 102 and a sensor controller 104. Ultrasonic sensor array 102 may include one or more arrays of sensor pixels. The ultrasonic sensor system 10 may include at least one ultrasonic sensor array 102. In some implementations, components of the ultrasonic sensor array 102 may be similar to components of a touch sensor system that are described below with reference to FIGS. 15A-15B. In some implementations, the ultrasonic sensor array 102 and the sensor controller 104 may be configured differently. For example, the ultrasonic sensor system 10 and the ultrasonic sensor array 102 may be part of a touch sensor system associated with a display device, depending on the particular implementation.

The sensor controller 104 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The sensor controller 104 also may include (and/or be configured for communication with) one or more memory devices, such as one or more random access memory (RAM) devices, read-only memory (ROM) devices, etc. The sensor controller 104 may be capable of receiving and processing fingerprint sensor image information from the ultrasonic sensor array 102. In some implementations, some or all of the functions of the sensor controller 104 may reside in or be performed by an applications processor of a mobile device.

Figure 15A:
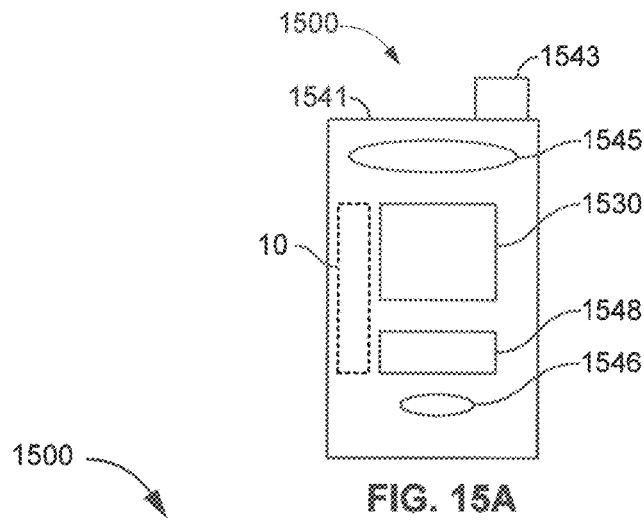
FIGS. 15A-15B show examples of system block diagrams illustrating a display device that includes an ultrasonic sensor system as described herein.
Figure 15B:
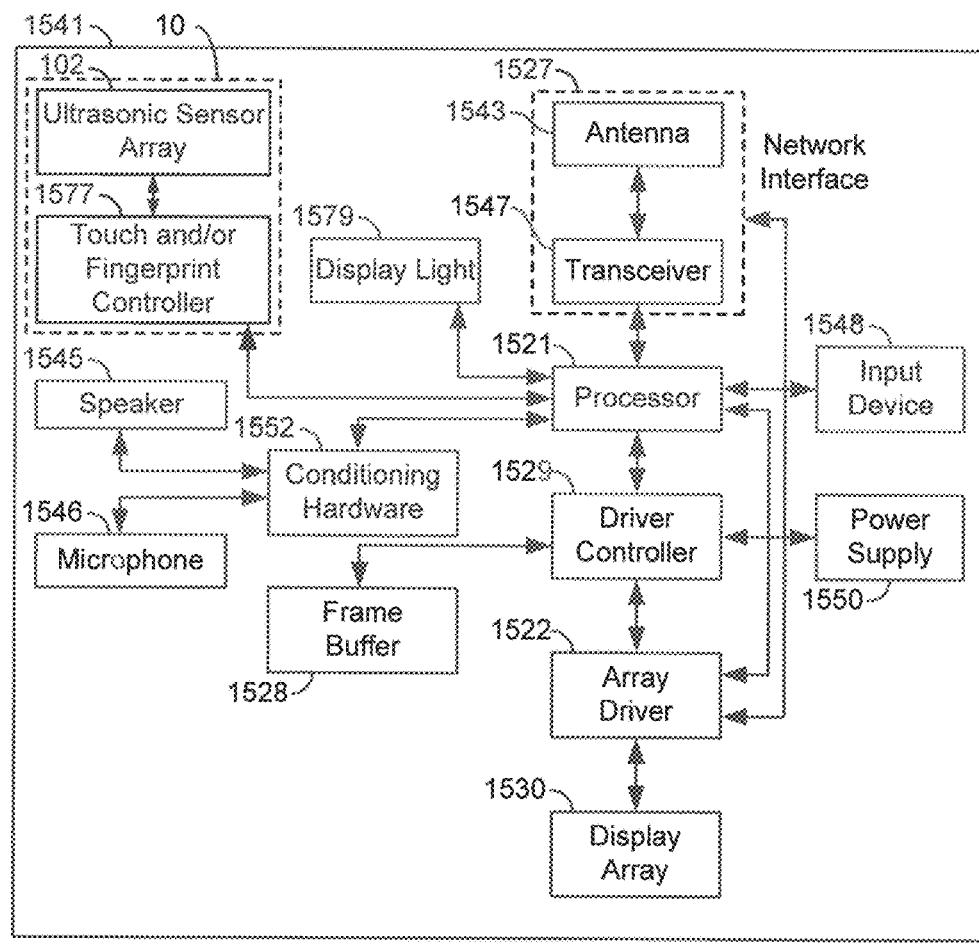

FIGS. 15A and 15B show examples of system block diagrams illustrating a display device that includes a fingerprint sensing system as described herein. The display device 1500 may be, for example, mobile display device such as a smart phone, a cellular or mobile telephone, etc. However, the same components of the display device 1500 or slight variations thereof are also illustrative of various types of display devices such as televisions, computers, tablet computers, e-readers, hand-held devices and portable media devices.

In this example, the display device 1500 may include a housing 1541, a display 1530, an ultrasonic sensor system 10 (a portion of which may be part of or separated from the visual display 1530), an antenna 1543, a speaker 1545, an input device 1548 and a microphone 1546. In some implementations, the input device 1548 may include an ultrasonic sensor array 102 that may serve as part of an ultrasonic fingerprint sensor, touchpad, or touchscreen. The housing 1541 may be formed from any of a variety of manufacturing processes, including injection molding and vacuum forming. In addition, the housing 1541 may be made from any of a variety of materials, including, but not limited to plastic, metal, glass, sapphire, rubber, ceramic, or a combination thereof. The housing 1541 may include removable portions (not shown) that may be interchanged with other removable portions of different color, or containing different logos, pictures, or symbols.

The display 1530 may be any of a variety of displays, including a flat-panel display, such as plasma, organic light-emitting diode (OLED) or liquid crystal display (LCD), or a non-flat-panel display, such as a cathode ray tube (CRT) or other tube device. In addition, the display 1530 may include an interferometric modulator (IMOD)-based display or a micro-shutter based display.

The components of one example of a display device 1500 are schematically illustrated in FIG. 15B. Here, the display device 1500 may include a housing 1541 and may include additional components at least partially enclosed therein. For example, the display device 1500 may include a network interface 1527 with one or more antennas 1543 which may be coupled to one or more transceivers 1547. The network interface 1527 may be a source for image information that may be displayed on the display device 1500. Accordingly, the network interface 1527 is one example of an image source module, but the processor 1521 and the input device 1548 also may serve as an image source module. The transceiver 1547 may be connected to a processor 1521, which may be connected to conditioning hardware 1552. The conditioning hardware 1552 may be capable of conditioning a signal (such as applying a filter or otherwise manipulating a signal). The conditioning hardware 1552 may be connected to a speaker 1545 and a microphone 1546. The processor 1521 also may be connected to an input device 1548 and a driver controller 1529. The driver controller 1529 may be coupled to a frame buffer 1528, and to an array driver 1522, which in turn may be coupled to a display array 1530. One or more elements in the display device 1500, including elements not specifically depicted in FIG. 15B, may be capable of functioning as a memory device and be capable of communicating with the processor 1521 or other components of a control system. In some implementations, a power supply 1550 may provide power to substantially all components in the particular display device 1500 design.

In this example, the display device 1500 may include a touch and/or fingerprint controller 1577. The touch and/or fingerprint controller 1577 may, for example, be a part of an ultrasonic sensor system 10 such as that described above. For example, the touch and/or fingerprint controller 1577 may include the functionality of and serve as the sensor controller 104 as described above. Accordingly, in some implementations the touch and/or fingerprint controller 1577 (and/or other components of the ultrasonic sensor system 10) may include one or more memory devices. In some implementations, the ultrasonic sensor system 10 also may include components such as the processor 1521, the array driver 1522 and/or the driver controller 1529 shown in FIG. 15B. The touch and/or fingerprint controller 1577 may be capable of communicating with the ultrasonic sensor system 10, e.g., via routing wires, and may be capable of controlling the ultrasonic sensor system 10. The touch and/or fingerprint controller 1577 may be capable of determining a location and/or movement of one or more objects, such as fingers, on or proximate the ultrasonic sensor system 10. In some implementations, the processor 1521 (or another part of the ultrasonic sensor system 10) may be capable of providing some or all of the functionality of the touch and/or fingerprint controller 1577, the ultrasonic sensor system 10 and/or the sensor controller 104 as described above.

The touch and/or fingerprint controller 1577 (and/or another element of the ultrasonic sensor system 10) may be capable of providing input for controlling the display device 1500 according to one or more touch locations. In some implementations, the touch and/or fingerprint controller 1577 may be capable of determining movements of one or more touch locations and providing input for controlling the display device 1500 according to the movements. Alternatively, or additionally, the touch and/or fingerprint controller 1577 may be capable of determining locations and/or movements of objects that are proximate the display device 1500. Accordingly, the touch and/or fingerprint controller 1577 may be capable of detecting finger or stylus movements, hand gestures, etc., even if no contact is made with the display device 1500. The touch and/or fingerprint controller 1577 may be capable of providing input for controlling the display device 1500 according to such detected movements and/or gestures.

As described elsewhere herein, the touch and/or fingerprint controller 1577 (or another element of the ultrasonic sensor system 10) may be capable of providing one or more fingerprint detection operational modes. Accordingly, in some implementations the touch and/or fingerprint controller 1577 (or another element of the ultrasonic sensor system 10) may be capable of producing fingerprint images. In some implementations, such as when an ultrasonic sensor array 102 of the ultrasonic sensor system 10 is physically separated from the visual display 1530, the controller for the ultrasonic sensor system 10 may be separate from and operate largely independent of the touch controller.

In some implementations, the ultrasonic sensor system 10 may include an ultrasonic receiver 30 and/or an ultrasonic transmitter 20 such as described elsewhere herein. According to some such implementations, the touch and/or fingerprint controller 1577 (or another element of the ultrasonic sensor system 10) may be capable of receiving input from the ultrasonic receiver 30 and powering on or "waking up" the ultrasonic transmitter 20 and/or another component of the display device 1500.

The network interface 1527 may include the antenna 1543 and the transceiver 1547 so that the display device 1500 may communicate with one or more devices over a network. The network interface 1527 also may have some processing capabilities to relieve, for example, data processing requirements of the processor 1521. The antenna 1543 may transmit and receive signals. In some implementations, the antenna 1543 transmits and receives radio frequency (RF) signals according to the Institute of Electrical and Electronics Engineers (IEEE) 16.11 standard, including IEEE 16.11(a), (b), or (g), or the IEEE 802.11 standard, including IEEE 802.11a, b, g, n, ac, ad, and further implementations thereof. In some implementations, the antenna 1543 may transmit and receive RF signals according to the Bluetooth® standard. In the case of a cellular telephone, the antenna 1543 may be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 1547 may pre-process the signals received from the antenna 1543 so that they may be received by and further manipulated by the processor 1521. The transceiver 1547 also may process signals received from the processor 1521 so that they may be transmitted from the display device 1500 via the antenna 1543.

In some implementations, the transceiver 1547 may be replaced by a receiver. In addition, in some implementations, the network interface 1527 may be replaced by an image source, which may store or generate image information to be sent to the processor 1521. The processor 1521 may control the overall operation of the display device 1500. The processor 1521 may receive data, such as compressed image information from the network interface 1527 or an image source, and process the data into raw image information or into a format that may be readily processed into raw image information. The processor 1521 may send the processed data to the driver controller 1529 or to the frame buffer 1528 for storage. Raw data typically refers to the information that identifies the image characteristics at each location within an image. For example, such image characteristics may include color, saturation and gray-scale level.

The processor 1521 may include a microcontroller, CPU, or logic unit to control operation of the display device 1500. The conditioning hardware 1552 may include amplifiers and filters for transmitting signals to the speaker 1545, and for receiving signals from the microphone 1546. The conditioning hardware 1552 may be discrete components within the display device 1500, or may be incorporated within the processor 1521 or other components.

The driver controller 1529 may take the raw image information generated by the processor 1521 either directly from the processor 1521 or from the frame buffer 1528 and may re-format the raw image information appropriately for high speed transmission to the array driver 1522. In some implementations, the driver controller 1529 may re-format the raw image information into a data flow having a raster-like format, such that it has a time order suitable for scanning across the display array 1530. The driver controller 1529 may send the formatted information to the array driver 1522. Although a driver controller 1529, such as an LCD controller, is often associated with the system processor 1521 as a stand-alone integrated circuit (IC), such controllers may be implemented in many ways. For example, controllers may be embedded in the processor 1521 as hardware, embedded in the processor 1521 as software, or fully integrated in hardware with the array driver 1522.

The array driver 1522 may receive the formatted information from the driver controller 1529 and may re-format the video data into a parallel set of waveforms that are applied many times per second to the hundreds, and sometimes thousands (or more), of leads coming from the display's x-y matrix of display elements.

In some implementations, the driver controller 1529, the array driver 1522, and the display array 1530 are appropriate for any of the types of displays described herein. For example, the driver controller 1529 may be a conventional display controller or a bi-stable display controller. Additionally, the array driver 1522 may be a conventional driver or a bi-stable display driver. Moreover, the display array 1530 may be a conventional display array or a bi-stable display. In some implementations, the driver controller 1529 may be integrated with the array driver 1522. Such an implementation may be useful in highly integrated systems, for example, mobile phones, portable electronic devices, watches or small-area displays.

In some implementations, the input device 1548 may be capable of allowing, for example, a user to control the operation of the display device 1500. The input device 1548 may include a keypad, such as a QWERTY keyboard or a telephone keypad, a button, a switch, a rocker, a touch-sensitive screen, a touch-sensitive screen integrated with the display array 1530, a pressure- or heat-sensitive membrane, an ultrasonic fingerprint sensor, an ultrasonic touchpad, or an ultrasonic touchscreen. The microphone 1546 may be capable of functioning as an input device for the display device 1500. In some implementations, voice commands through the microphone 1546 may be used for controlling operations of the display device 1500.

The power supply 1550 may include a variety of energy storage devices. For example, the power supply 1550 may be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery may be wirelessly chargeable. The power supply 1550 also may be a renewable energy source, a capacitor, or a solar cell, including a plastic solar cell or solar-cell paint. The power supply 1550 also may be capable of receiving power from a wall outlet.

In some implementations, control programmability may reside in the driver controller 1529, which may be located in several places in the electronic display system. In some implementations, control programmability may reside in the array driver 1522. The above-described optimization may be implemented in any number of hardware and/or software components and in various configurations.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module, which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A method of generating an image, comprising:
launching a first ultrasonic plane wave from a plane wave generator toward a platen surface;
acquiring a first set of pixel output signals at a first acquisition time that is delayed from the launch of the first ultrasonic plane wave by a first acquisition time delay, each pixel output signal from the first set of pixel output signals representing a local magnitude at a sensor pixel array of the first ultrasonic plane wave reflected from the platen surface;
launching a second ultrasonic plane wave from the plane wave generator toward the platen surface;
acquiring a second set of pixel output signals at a second acquisition time that is delayed from the launch of the second ultrasonic plane wave by a second acquisition time delay, each pixel output signal from the second set of pixel output signals representing a local magnitude at the sensor pixel array of the second ultrasonic plane wave reflected from the platen surface; and
generating a corrected output signal for a selected pixel of the sensor pixel array based on a selected output signal from the first set of pixel output signals and on first-level correction signals from the second set of pixel output signals, wherein the selected output signal corresponds to the selected pixel and the first-level correction signals correspond to a first set of neighboring pixels near the selected pixel.

2. The method of claim 1, wherein the first acquisition time delay accounts for a distance between the selected pixel and the platen surface.

3. The method of claim 1, wherein the second acquisition time delay accounts for a mean distance between the selected pixel and the first set of neighboring pixels near the selected pixel.

4. The method of claim 1, wherein generating the corrected output signal for the selected pixel includes weighting the first-level correcting signals differently than the selected output signal.

5. The method of claim 1, wherein generating the corrected output signal for the selected pixel includes computing a weighted summation of the output signal of the selected pixel and the first-level correction signals from the first set of neighboring pixels with pixel-dependent weights that include a combination of a calibration factor and a geometrical phase factor.

6. The method of claim 1, wherein the first acquisition time delay and the second acquisition time delay differ so as to account for a difference in phase between the reflected first ultrasonic plane wave arriving at the selected pixel and the reflected second ultrasonic plane wave arriving at the first set of neighboring pixels.

7. The method of claim 1, wherein acquiring the first set of pixel output signals includes detecting an amplitude that represents the local magnitude of the reflected first ultrasonic plane wave during a first acquisition time window.

8. The method of claim 7, wherein the first acquisition time window has a duration selected from one of shorter than a period of the reflected first ultrasonic plane wave or at least one period of the reflected first ultrasonic plane wave.

9. The method of claim 1, wherein acquiring the second set of pixel output signals includes detecting an amplitude that represents the local magnitude of the reflected second ultrasonic plane wave during a second acquisition time window.

10. The method of claim 1, wherein acquiring the first set or second set of pixel output signals includes applying a sampling voltage to the sensor pixel array at the first acquisition time or the second acquisition time, respectively.

11. The method of claim 10, wherein the sampling voltage is applied to a receiver bias electrode of the sensor pixel array.

12. The method of claim 10, wherein the sampling voltage is applied to a diode bias electrode of the sensor pixel array.

13. The method of claim 1, wherein the first ultrasonic plane wave or the second ultrasonic plane wave includes one or more cycles.

14. The method of claim 1, wherein a frequency of the first ultrasonic plane wave or the second ultrasonic plane wave is based on a distance from the sensor array to the platen surface.

15. The method of claim 1, wherein a frequency of the first ultrasonic plane wave or the second ultrasonic plane wave is based on a width of a target object positioned on the platen surface.

16. The method of claim 1, further comprising:
launching a third ultrasonic plane wave from the plane wave generator toward the platen surface;
acquiring a third set of pixel output signals at a third acquisition time that is delayed from the launch of the third ultrasonic plane wave by a third acquisition time delay, each pixel output signal from the third set of pixel output signals representing a local magnitude at the sensor pixel array of the third ultrasonic plane wave reflected from the platen surface, and wherein generating the corrected output signal for the selected pixel is further based on a weighted sum of the selected output signal, the first-level correction signals, and second-level correction signals from the third set of pixel output signals, wherein the second-level correction signals correspond to a second set of neighboring pixels near the selected pixel, the second set of neighboring pixels having a mean distance from the selected pixel that is different than a mean distance of the first set of neighboring pixels from the selected pixel.

17. The method of claim 1, further comprising:
generating an image of a target object positioned on the platen surface based on corrected output signals for a plurality of selected pixels.

18. An ultrasonic sensor system, comprising:
an ultrasonic sensor array including a sensor pixel array, each pixel configured to generate a pixel output signal in response to a received ultrasonic wave;
a platen fixed to the sensor pixel array, the platen having a platen surface;
an ultrasonic plane wave generator; and
one or more processors in communication with the sensor pixel array, the processor(s) configured to:
launch a first ultrasonic plane wave from the plane wave generator toward the platen surface;
acquire a first set of pixel output signals at a first acquisition time that is delayed from the launch of the first ultrasonic plane wave by a first acquisition time delay, each pixel output signal from the first set of pixel output signals representing a local magnitude at the sensor pixel array of the first ultrasonic plane wave reflected from the platen surface;
launch a second ultrasonic plane wave from the plane wave generator toward the platen surface;
acquire a second set of pixel output signals at a second acquisition time that is delayed from the launch of the second ultrasonic plane wave by a second acquisition time delay, each pixel output signal from the second set of pixel output signals representing a local magnitude at the sensor pixel array of the second ultrasonic plane wave reflected from the platen surface; and
generate a corrected output signal for a selected pixel from the sensor pixel array based on a selected output signal from the first set of pixel output signals and on first-level correction signals from the second set of pixel output signals, wherein the selected output signal corresponds to the selected pixel and the first-level correction signals correspond to a first set of neighboring pixels near the selected pixel.

19. The system of claim 18, wherein the corrected output signal corrects for diffraction of reflected ultrasonic plane waves from a target object positioned on the platen surface.

20. The system of claim 19, wherein the target object includes ridges of a finger or a tip of a stylus.

21. The system of claim 18, wherein the first set of neighboring pixels are equidistant from the selected pixel.

22. The system of claim 18, wherein the processor(s) configured to generate the corrected output signal comprises the processor(s) configured to generate the corrected output signal based on a weighted sum of the selected output signal and the first-level correction signals.

23. The system of claim 18, wherein each pixel in the sensor pixel array is electrically coupled to a local oscillator configured to provide a phase-locked signal during acquisition of the first set of pixel output signals and the second set of pixel output signals.

24. The system of claim 23, wherein the phase-locked signal used during the acquisition of the second set of pixel output signals has substantially a same amplitude, but a different phase, compared to the phase-locked signal used during the acquisition of the first set of pixel output signals.

25. The system of claim 23, wherein the phase-locked signal used during the acquisition of the second set of pixel output signals has a different amplitude and a different phase compared to the phase-locked signal used during acquisition of the first set of pixel output signals.

26. The system of claim 18, wherein the plane wave generator is coupled to the sensor pixel array.

27. The system of claim 18, wherein the platen includes a coating layer having a coating surface, the coating surface serving as the platen surface.

28. The system of claim 18, the processor(s) further configured to:
generate an image of a target object positioned on the platen surface based on corrected output signals for a plurality of selected pixels in the sensor pixel array.

29. A system for generating an image, comprising:
means for launching a first ultrasonic plane wave toward a platen surface;
means for acquiring a first set of pixel output signals at a first acquisition time that is delayed from the launch of the first ultrasonic plane wave by a first acquisition time delay, each pixel output signal from the first set of pixel output signals representing a local magnitude of the first ultrasonic plane wave reflected from the platen surface;

means for launching a second ultrasonic plane wave toward the platen surface;

means for acquiring a second set of pixel output signals at a second acquisition time that is delayed from the launch of the second ultrasonic plane wave by a second acquisition time delay, each pixel output signal from the second set of pixel output signals representing a local magnitude of the second ultrasonic plane wave reflected from the platen surface; and means for generating a corrected output signal for a selected pixel based on a selected output signal from the first set of pixel output signals and on first-level correction signals from the second set of pixel output signals, wherein the selected output signal corresponds to the selected pixel and the first-level correction signals correspond to a first set of neighboring pixels near the selected pixel.

30. A non-transitory, computer-readable storage medium comprising one or more computer programs of computer readable instructions for execution by one or more processors in communication with a plane wave generator and a sensor pixel array to perform a method of generating an image, the computer program(s) comprising instructions for:

launching a first ultrasonic plane wave from the plane wave generator toward a platen surface;

acquiring a first set of pixel output signals at a first acquisition time that is delayed from the launch of the first plane wave by a first acquisition time delay, each pixel output signal from the first set of pixel output signals representing a local magnitude at the sensor pixel array of the first ultrasonic plane wave reflected from the platen surface;

launching a second ultrasonic plane wave from the plane wave generator toward the platen surface;

acquiring a second set of pixel output signals at a second acquisition time that is delayed from the launch of the second plane wave by a second acquisition time delay, each pixel output signal from the second set of pixel output signals representing a local magnitude at the sensor pixel array of the second ultrasonic plane wave reflected from the platen surface; and generating a corrected output signal for a selected pixel from the sensor pixel array based on a selected output signal from the first set of pixel output signals and on first-level correction signals from the second set of pixel output signals, wherein the selected output signal corresponds to the selected pixel and the first-level correction signals correspond to a first set of neighboring pixels near the selected pixel.

* * * * *